(12) United States Patent
Ishii

(10) Patent No.: US 8,113,077 B2
(45) Date of Patent: Feb. 14, 2012

(54) DUAL CLUTCH TRANSMISSION

(75) Inventor: Norihiro Ishii, Amagasaki (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 573 days.

(21) Appl. No.: 12/342,585

(22) Filed: Dec. 23, 2008

(65) Prior Publication Data

US 2009/0165584 A1    Jul. 2, 2009

(30) Foreign Application Priority Data

Dec. 28, 2007   (JP) ................................ 2007-341257

(51) Int. Cl.
*F16H 59/00* (2006.01)
*F16H 3/08* (2006.01)
*B60W 10/00* (2006.01)

(52) U.S. Cl. ................. 74/335; 74/331; 477/79

(58) Field of Classification Search .............. 74/329, 74/330, 331, 335, 340, 665 F, 665 G, 665 GA, 74/15.4, 15.63, 15.66; 477/79, 174, 180
See application file for complete search history.

(56) References Cited

U.S. PATENT DOCUMENTS

| | | | | |
|---|---|---|---|---|
| 7,409,886 B2 * | 8/2008 | Gitt | ................................ | 74/342 |
| 7,958,798 B2 * | 6/2011 | Hasegawa | ...................... | 74/325 |
| 2005/0284243 A1 * | 12/2005 | Carlsson | ........................ | 74/331 |
| 2006/0219033 A1 * | 10/2006 | Gitt | ................................ | 74/330 |
| 2007/0220999 A1 * | 9/2007 | Hatori et al. | ................... | 74/330 |

FOREIGN PATENT DOCUMENTS

| | | |
|---|---|---|
| JP | 2007-218277 | 8/2007 |
| JP | 2008095749 A * | 4/2008 |

* cited by examiner

*Primary Examiner* — Roger Pang
(74) *Attorney, Agent, or Firm* — Sterne, Kessler, Goldstein & Fox PLLC

(57) ABSTRACT

A dual clutch transmission includes odd-numbered forward traveling speed drive trains to be activated by engaging a first clutch, even-numbered forward traveling speed drive trains to be activated by engaging a second clutch, and a plurality of backward traveling speed drive trains including at least one backward traveling train to be activated by engaging either the first or second clutch. While a reverse mode is set and when a reverser operation means is shifted between a forward traveling position and a backward traveling position, the first and second clutches are alternately engaged/disengaged for a forward/backward traveling speed shift between a backward traveling speed set by at least one backward traveling speed drive train and a forward traveling speed set by any one forward traveling speed drive train activated by engaging the first or second clutch which is different from the first or second clutch adapted to be engaged for activating the at least one backward traveling speed drive train.

18 Claims, 20 Drawing Sheets

Fig. 4

| Speed | | Clutches | | Clutch Sliders | | | |
|---|---|---|---|---|---|---|---|
| | | C 1 | C 2 | 83a,84a | 81a | 82a | 89a |
| Forward | F8 | OFF | ON | H | - | f4 | N |
| | F7 | ON | OFF | | f3 | - | - |
| | F6 | OFF | ON | | - | f2 | N |
| | F5 | ON | OFF | | f1 | - | - |
| | F4 | OFF | ON | L | - | f4 | N |
| | F3 | ON | OFF | | f3 | - | - |
| | F2 | OFF | ON | | - | f2 | N |
| | F1 | ON | OFF | | f1 | - | - |
| Back | R1 | OFF | ON | L | - | N | r |
| | R2 | | | H | | | |

Fig. 7

| Speed Group | Speed Selection | | Application | |
|---|---|---|---|---|
| | Forward(Fs) | Backward | CWC | ECC |
| HF | F8 | | NO | NO |
| HF | F7 | R2 | YES | NO |
| HF | F6 | | NO | NO |
| HF | F5 | | YES | YES |
| LF | F4 | | NO | NO |
| LF | F3 | R1 | YES | NO |
| LF | F2 | | NO | NO |
| LF | F1 | | YES | YES |

CWC: Criss Wave Control

ECC: Engine Cooperation Control

If not ECC, $V(F5) < V(R2) < V(F6)$
$V(F1) < V(R1) < V(F2)$

Fig. 17

| Speed | | Clutch | | Clutch Slider | | | | |
|---|---|---|---|---|---|---|---|---|
| | | C1 | C2 | 83a,84a | 81a | 82a | 89a | 240a |
| F | F8 | OFF | ON | H | – | f4 | N | – |
| | F7 | ON | OFF | | f3 | – | – | N |
| | F6 | OFF | ON | | – | f2 | N | – |
| | F5 | ON | OFF | | f1 | – | – | N |
| | F4 | OFF | ON | L | – | f4 | N | – |
| | F3 | ON | OFF | | f3 | – | – | N |
| | F2 | OFF | ON | | – | f2 | N | – |
| | F1 | ON | OFF | | f1 | – | – | N |
| R | R1 | OFF | ON | L | – | N | ra | – |
| | R2 | ON | OFF | | N | – | – | rb |
| | R3 | OFF | ON | H | – | N | ra | – |
| | R4 | ON | OFF | | N | – | – | rb |

Fig. 18

| Speed Group | Speed Selection | | Application | |
|---|---|---|---|---|
| | Forward(Fs) | Backward | CWC | ECC |
| HF | F8 | R4 | YES | NO |
| | | R3 | NO | NO |
| | F7 | R4 | NO | NO |
| | | R3 | YES | NO |
| | F6 | R4 | YES | YES |
| | | R3 | NO | NO |
| | F5 | R4 | NO | NO |
| | | R3 | YES | YES |
| RF | F4 | R2 | YES | NO |
| | | R1 | NO | NO |
| | F3 | R2 | NO | NO |
| | | R1 | YES | NO |
| | F2 | R2 | YES | YES |
| | | R1 | NO | NO |
| | F1 | R2 | NO | NO |
| | | R1 | YES | YES |

CWC: Cross Wave Control
ECC: Engine Cooperation Control
If not ECC, $V(F5) < V(R3) < V(F6) < V(R4)$
$V(F1) < V(R1) < V(F2) < V(R2)$

DUAL CLUTCH TRANSMISSION

BACKGROUND OF THE INVENTION

1. Field of the Invention

The present invention relates to a dual clutch transmission to be equipped on a vehicle, the dual clutch transmission comprising: a first clutch to be engaged for activating each of odd-numbered speed drive trains for setting respective odd-numbered speeds; and a second clutch to be engaged for activating each of even-numbered speed drive trains for setting respective even-numbered speeds.

2. Related Art

As disclosed in JP 2007-218277, there is a well-known conventional dual clutch transmission which receives power from a prime mover and is automatically gearshifted to change the speed of the output rotation thereof to be transmitted to an axle of a vehicle. The dual clutch transmission comprises a group of odd-numbered speed gear trains, a group of even-numbered speed gear trains, a first clutch, and a second clutch. When one of the odd-numbered speed gear trains is selected to be activated, the selected odd-numbered speed gear train is activated by engaging the first clutch, i.e., receives power from the prime mover through the engaged first clutch. When one of the even-numbered speed gear trains is selected to be activated, the selected even-numbered speed gear train is activated by engaging the second clutch, i.e., receives power from the prime mover through the engaged second clutch.

During the gearshift of the dual transmission between odd and even numbered speeds, a next speed gear train is selected while a current speed gear train still remains engaged, i.e., the current speed gear train and the next speed gear train are simultaneously selected to be driven, and then one of the first and second clutches having been engaged for activating the current speed gear train is disengaged while the other of the first and second clutches is engaged so as to activate the next speed gear train, i.e., the engagement and disengagement of the first and second clutches overlap, thereby ensuring gearshift without intermittence of power transmission.

Further, in the above reference, a reverser clutch unit including a forward traveling clutch and a backward traveling clutch is provided downstream of the dual clutch transmission, so as to select whether the output rotation of the dual clutch transmission in the direction for forward traveling or backward traveling. However, the addition of the reverser clutch unit to the first and second clutches of the dual clutch transmission means increase of the number of expensive clutches.

Further, even if a working vehicle equipped with the dual clutch transmission has to be used for a work, such as a loading-and-unloading work or a cultivating work, requiring frequent reversing of forward/backward traveling direction, the gearshift of the conventional dual clutch transmission for reversing the traveling direction takes a long time which spoils the workability and requires this vehicle to travel a long distance because the forward traveling speed is gradually shifted down one speed by one speed to the neutral state before realizing the backward traveling speed. Further, the reverser clutch unit must have a power transmission torque for receiving the output power from the dual clutch transmission, thereby increasing the capacity thereof and costs.

Then, the alternate and overlapping engagement/disengagement function of the first and second clutches of the dual clutch transmission is desired to be utilized for such a work requiring frequent reversing of forward/backward traveling direction, so as to realize the half-clutch state of the first and second clutches during the forward/backward traveling direction shift, thereby requiring no shift down of speed to the neutral state. Here, if the vehicle is an agricultural tractor or the like, the dual clutch transmission of the vehicle is configured to provide many forward traveling speeds, and therefore, a plurality of backward traveling speeds are desired to be provided in correspondence to the many forward traveling speeds.

SUMMARY OF THE INVENTION

An object of the invention is to provide a dual clutch transmission which enables swift and smooth forward/backward traveling direction shift of a vehicle and enables to provide a plurality of backward traveling speeds.

To achieve the object, a dual clutch transmission according to the invention comprises an odd-numbered forward traveling speed drive train group, an even-numbered forward traveling speed drive train, a plurality of backward traveling speed drive trains, a first clutch, a second clutch, a reverse mode setting means, and a reverser operation means. The odd-numbered forward traveling speed drive train group includes at least one odd-numbered forward traveling speed drive train for setting an odd-numbered forward traveling speed. The even-numbered forward traveling speed drive train group includes at least one even-numbered forward traveling speed drive train for setting an even-numbered forward traveling speed. The plurality of backward traveling speed drive trains are provided for setting respective backward traveling speeds. The first clutch is adapted to be engaged so as to activate the odd-numbered forward traveling speed drive train group. The second clutch is adapted to be engaged so as to activate the even-numbered forward traveling speed drive train group. The reverse mode setting means is provided for setting a reverser mode. The reverser operation means is provided for shifting a forward/backward traveling direction of a vehicle, and is shiftable between a forward traveling position and a backward traveling position. At least one of the first and second clutches is adapted to be engaged so as to activate at least one of the plurality of backward traveling speed drive trains. While the reverse mode is set by the reverse mode setting means and the reverser operation means is shifted between the forward traveling position and the backward traveling position, the first and second clutches are alternately engaged/disengaged for a forward/backward traveling speed shift between the backward traveling speed set by the at least one backward traveling speed drive train and a forward traveling speed set by any one forward traveling speed drive train of the odd-numbered or even-numbered forward traveling speed drive train group activated by engaging the first or second clutch which is different from the first or second clutch adapted to be engaged for activating the at least one backward traveling speed drive train so that, during the alternate engagement/disengagement shift of the first and second clutches, an engagement action of one of the first and second clutches overlaps a disengagement action of the other of the first and second clutches.

Therefore, due to the alternate and overlapping engagement/disengagement function of the first and second clutches, the vehicle equipped with the dual clutch transmission ensures swift and smooth forward/backward traveling direction shift between the backward traveling speed set by the at least one backward traveling speed drive train and a forward traveling speed set by any one forward traveling speed drive train of the odd-numbered or even-numbered forward traveling speed drive train group activated by engaging the first or second clutch which is different from the first or second clutch adapted to be engaged for activating the at least one backward traveling speed drive train.

Preferably, the first and second clutches are disposed upstream of the odd-numbered forward traveling speed drive train group, the even-numbered forward traveling speed drive train group and the plurality of backward traveling speed drive trains.

Therefore, the first and second clutches can be reduced in capacity and cost because they receive power from a prime mover before the power is transmitted to any of the odd-numbered and even-numbered forward traveling speed drive train groups and the plurality of backward traveling speed drive trains.

Preferably, the at least one odd-numbered forward traveling speed drive train is a first forward traveling speed drive train for setting the lowest forward traveling speed. The at least one backward traveling speed drive train is adapted to be activated by engaging the second clutch. When the reverse mode is set, a speed shift between the lowest forward traveling speed and the backward traveling speed set by the at least one backward traveling speed drive train is the forward/backward traveling speed shift realized by the alternate engagement/disengagement shift of the first and second clutches.

Therefore, the swift and smooth forward/backward traveling direction shift in the reverse mode due to the alternate and overlapping engagement/disengagement function of the first and clutches can be applied for a working vehicle traveling forward with the maximum output torque of the dual clutch transmission set at the lowest forward traveling speed, thereby preventing the vehicle from having lack of torque when it travels forward along with the forward/backward traveling direction shift.

Preferably, all the plurality of backward traveling speed drive trains are adapted to be activated by engaging one of the first and second clutches. The forward/backward traveling speed shift realized by the alternate engagement/disengagement shift of the first and second clutches is a speed shift between a backward traveling speed set by one of all the plurality of backward traveling speed drive trains and a forward traveling speed set by one forward traveling speed drive train activated by engaging the first or second clutch which is different from the first or second clutch adapted to be engaged for activating all the backward traveling speed drive trains.

Therefore, the swift and smooth forward/backward traveling direction shift by setting the reverse mode is adapted for all the backward traveling speeds of the dual clutch transmission. Further, the position for arrangement of the plurality of backward traveling speed drive trains can be limited so as to simplify and miniaturize the dual clutch transmission.

Alternatively, the at least one backward traveling speed drive train is a first backward traveling speed drive train adapted to be activated by engaging the second clutch, and another of the plurality of backward traveling speed drive trains is a second backward traveling speed drive train adapted to be activated by engaging the first clutch. The forward/backward traveling speed shift realized by the alternate engagement/disengagement shift of the first and second clutches is a speed shift between the odd-numbered forward traveling speed set by the at least one odd-numbered forward traveling speed drive train and a backward traveling speed set by the first backward traveling speed drive train, or between the even-numbered forward traveling speed set by the at least one even-numbered forward traveling speed drive train and a backward traveling speed set by the second backward traveling speed drive train.

Therefore, the swift and smooth forward/backward traveling direction shift by setting the reverse mode is adapted for all the backward traveling speeds of the dual clutch transmission. Further, even if any forward traveling speed belonging to either the odd-numbered or even-numbered traveling speed drive train group is currently realized, the swift and smooth forward/backward traveling shift by setting the reverse mode is adapted for this currently realized forward traveling speed. Thus, the currently realized forward traveling speed does not have to be shifted to another forward traveling speed before start of operation of the first and second clutches for the forward/backward traveling direction shift, thereby further accelerating the forward/backward traveling direction shift.

Preferably, as a first aspect of the dual clutch transmission, all the forward traveling speed drive trains belonging to the odd-numbered and even-numbered forward traveling speed drive train groups are classified between a low forward traveling speed drive train group and a high forward traveling speed drive train group. At least one of the plurality of backward traveling speed drive trains is a low backward traveling speed drive train corresponding to the low forward traveling speed drive train group, and at least one of the plurality of backward traveling speed drive trains is a high backward traveling speed drive train corresponding to the high forward traveling speed drive train group. When the reverser operation means is shifted between the forward traveling position and the backward traveling position, either a low forward/backward traveling speed shift between a forward traveling speed set by one forward traveling speed drive train belonging to the low forward traveling speed drive train group and a backward traveling speed set by the low backward traveling speed drive train or a high forward/backward traveling speed shift between a forward traveling speed set by one forward traveling speed drive train belonging to the high forward traveling speed drive train group and a backward traveling speed set by the high backward traveling speed drive train is realized. At least one speed shift, which is either the low forward/backward traveling speed shift or the high forward/backward traveling speed shift, is the forward/backward traveling speed shift realized the alternate engagement/disengagement shift of the first and second clutches.

Therefore, even whether the currently realized forward traveling speed is either high or low, a backward traveling speed is selected among the plurality of backward traveling speeds so as to correspond to the currently realized forward traveling speed when the forward/backward traveling direction shift is performed. Further, at least one forward/backward traveling direction shift can be swift and smooth due to the alternate and overlapping engagement/disengagement function of the first and second clutches when setting the reverse mode.

In the first aspect, preferably, each forward traveling speed drive train belonging to the high forward traveling speed drive train group has a deceleration ratio not more than an average of deceleration ratios of all the forward traveling speed drive trains, and each forward traveling speed drive train belonging to the low forward traveling speed drive train group has a deceleration ratio not less than the average.

Therefore, the high forward traveling speed drive train group and the low forward traveling speed drive train group are equal to each other with regard to the number of forward traveling speed drive trains belonging thereto.

In the first aspect, preferably, the at least one odd-numbered forward traveling speed drive train is a first forward traveling speed drive train for setting the lowest forward traveling speed. The low backward traveling speed drive train is adapted to be activated by engaging the second clutch. When the reverse mode is set, a speed shift between the lowest forward traveling speed and the backward traveling speed set by the low backward traveling speed drive train is the forward/backward traveling speed shift realized by the alternate engagement/disengagement shift of the first and second clutches.

Therefore, the swift and smooth forward/backward traveling direction shift in the reverse mode due to the alternate and overlapping engagement/disengagement function of the first and clutches can be applied for a working vehicle traveling forward with the maximum output torque of the dual clutch transmission set at the lowest forward traveling speed, thereby preventing the vehicle from having lack of torque when it travels forward along with the forward/backward traveling direction shift.

In the first aspect, preferably, the dual clutch transmission further comprises a first high/low speed selection means for the odd-numbered forward traveling speed drive train group, a second high/low speed selection means for the even-numbered forward traveling speed drive train group, and a common backward traveling drive train part shared between the high backward traveling speed drive train and the low backward traveling speed drive train. The first high/low speed selection means is shiftable between a high speed position and a low speed position. Each odd-numbered forward traveling speed drive train of the odd-numbered forward traveling speed drive train group serves as a high odd-numbered forward traveling speed drive train by setting the first high/low speed selection means at the high speed position, and also serves as a low odd-numbered forward traveling speed drive train by setting the first high/low speed selection means at the low speed position. The second high/low speed selection means is shiftable between a high speed position and a low speed position. Each even-numbered forward traveling speed drive train of the even-numbered forward traveling speed drive train group serves as a high even-numbered forward traveling speed drive train by setting the second high/low speed selection means at the high speed position, and also serves as a low even-numbered forward traveling speed drive train by setting the second high/low speed selection means at the low speed position. The high and low odd-numbered forward speed drive trains and the high and low even-numbered forward traveling speed drive trains are classified between the high forward traveling speed drive train group and the low forward traveling speed drive train group. The common backward traveling drive train part serves as either the high backward traveling speed drive train or the low backward traveling speed drive train depending on whether one of the first and second high/low speed selection means is shifted to the high speed position or to the low speed position.

Therefore, the number of forward traveling speed drive trains belonging to the odd-numbered and even-numbered forward traveling speed drive train groups can be reduced while providing the dual clutch transmission with many forward traveling speeds.

Further preferably, the first and second high/low speed selection means are synchronously interlocked with each other so that the first and second high/low speed selection means are simultaneously shifted to the respective high speed positions, and are simultaneously shifted to the respective low speed positions.

Therefore, for example, when each forward traveling speed drive train belonging to the odd-numbered forward traveling speed drive train group serves as the low odd-numbered forward traveling speed drive train, each forward traveling speed drive train belonging to the even-numbered forward traveling drive train group serves as the low even-numbered forward traveling speed drive train, thereby enabling shift among forward traveling speeds set by the respective forward traveling speed drive trains belonging to the low forward traveling speed drive train group without shift of either the first or second high/low speed selection means. The situation is not realized that one of the first and second high/low speed selection means is set at the high speed position while the other of the first and second high/low speed selection means is set at the low speed position, thereby preventing an unexpected speed shift between a low forward traveling speed set by a low forward traveling speed drive train and a high forward traveling speed set by a high forward traveling speed drive train causing an expected sudden change of vehicle traveling speed.

Preferably, as a second aspect of the dual clutch transmission, the dual clutch transmission further comprises a rated forward traveling speed setting means for setting a rated forward traveling speed which is set by any one forward traveling speed drive train of the odd-numbered and even-numbered forward traveling speed drive train groups. When the first or second clutch to be engaged for activating the forward traveling speed drive train for setting the rated forward traveling speed set by the rated forward traveling speed setting means is different from the first or second clutch to be engaged for activating the at least one backward traveling speed drive train, the forward/backward traveling speed shift by the alternate engagement/disengagement shift of the first and second clutches is performed between the rated forward traveling speed and the backward traveling speed set by the at least one backward traveling speed drive train. When the first or second clutch to be engaged for activating the forward traveling speed drive train for setting the rated forward traveling speed set by the rated forward traveling speed setting means is the same as the first or second clutch to be engaged for activating the at least one backward traveling speed drive train, the rated forward traveling speed is shifted down to a lower forward traveling speed by one speed before the first and second clutches are operated for the forward/backward traveling speed shift, and the forward/backward traveling speed shift by the alternate engagement/disengagement shift of the first and second clutches is performed between the lower forward traveling speed and the backward traveling speed set by the at least one backward traveling speed drive train.

Therefore, in the reverse mode, a vehicle traveling speed suited for a work is realized by optionally selecting a forward traveling speed as the rated forward traveling speed. Even if any forward traveling speed is selected as the rated forward traveling speed, the swift and smooth forward/backward traveling direction shift due to the alternate and overlapping engagement/disengagement of the first and second clutches can be realized.

In the second aspect, preferably, a vehicle equipped with the dual clutch transmission is further equipped with a prime mover for driving the dual clutch transmission and with an accelerator operation means for controlling an output speed of the prime mover. When the reverser operation means is shifted from the forward traveling position to the backward traveling position, the prime mover is controlled so that a maximum accelerated backward vehicle traveling speed when setting the backward traveling speed set by the at least one backward traveling speed drive train and when setting a maximum output rotary speed of the prime mover by operating the accelerator operation means becomes not more than a maximum accelerated forward vehicle traveling speed when setting the rated forward traveling speed and when setting a maximum output rotary speed of the prime mover by operating the accelerator operation means.

Therefore, the backward vehicle traveling speed after the forward/backward traveling direction shift is prevented from being unexpectedly suddenly increased. That is, the feeling for operating the accelerator operation means for backward traveling after the forward/backward traveling direction shift is prevented from being suddenly changed.

In the second aspect, preferably, when an overload on a prime mover driving the dual clutch transmission is detected during forward traveling of a vehicle equipped with the dual clutch transmission, the rated forward traveling speed is shifted down to a lower forward traveling speed one speed by one speed until the overload is eliminated. When the first or second clutch to be engaged for activating a forward traveling speed drive train for setting the lower forward traveling speed is different from the first or second clutch to be engaged for activating the at least one backward traveling speed drive train, the forward/backward traveling speed shift by the alternate engagement/disengagement shift of the first and second clutches is performed between the lower forward traveling speed and the backward traveling speed set by the at least one backward traveling speed drive train. When the first or second clutch to be engaged for activating the forward traveling speed drive train for setting the lower forward traveling speed is the same as the first or second clutch to be engaged for activating the at least one backward traveling speed drive train, the lower forward traveling speed is shifted down to a further lower forward traveling speed by one speed before the first and second clutches are operated for the forward/backward traveling speed shift, and the forward/backward traveling speed shift by the alternate engagement/disengagement shift of the first and second clutches is performed between the further lower forward traveling speed and the backward traveling speed set by the at least one backward traveling speed drive train.

Therefore, even if a forward traveling speed unsuitable to the load on the prime mover during traveling of the vehicle is optionally selected as the rated forward traveling speed or even if an unexpected load is applied on the prime mover during forward traveling of the vehicle, the shift down of forward traveling speed prevents the prime mover from being overloaded, thereby ensuring forward traveling of the vehicle without cease of power transmission. Further, the swift and smooth forward/backward traveling direction shift by the alternate and overlapping engagement/disengagement function of the first and second clutches is ensured regardless of whether this shift down of forward traveling speed is performed or not.

Further preferably, the at least one odd-numbered forward traveling speed drive train is a first forward traveling speed drive train for setting the lowest forward traveling speed. The at least one backward traveling speed drive train is adapted to be activated by engaging the second clutch. When the reverse mode is set, a speed shift between the lowest forward traveling speed and the backward traveling speed set by the at least one backward traveling speed drive train is the forward/backward traveling speed shift realized by the alternate engagement/disengagement shift of the first and second clutches.

Therefore, the swift and smooth forward/backward traveling direction shift in the reverse mode due to the alternate and overlapping engagement/disengagement function of the first and clutches can be applied for a working vehicle traveling forward with the maximum output torque of the dual clutch transmission set at the lowest forward traveling speed, thereby preventing the vehicle from having lack of torque when it travels forward along with the forward/backward traveling direction shift. This effect can be obtained when the lowest forward traveling speed is selected at the rated forward traveling speed, and the effect can also be obtained due to the shift down even when a second forward traveling speed set a second forward traveling speed belonging to the even-numbered forward traveling speed drive train group is selected as the rated forward traveling speed.

Preferably, as a third aspect of the dual clutch transmission, the dual clutch transmission further comprises a manual forward traveling speed selection operation means for manually selecting any one of all the forward traveling speeds, and a manual backward traveling speed selection operation means for manually selecting any one of all the backward traveling speeds. When a forward traveling speed is manually selected by the forward traveling speed selection operation means and a backward traveling speed is manually selected by the backward traveling speed selection operation means, and when the reverser operation means is shifted between the forward traveling position and the backward traveling position, a forward/backward traveling speed shift between the selected forward traveling speed and the selected backward traveling speed is realizing by engagement/disengagement of at least one of the first and second clutches. If the first or second clutch to be engaged for activating the selected backward traveling speed is different from the first or second clutch to be engaged for activating the selected forward traveling speed, the alternate engagement/disengagement shift of the first and second clutches is performed for the forward/backward traveling speed shift between the selected forward traveling speed and the selected backward traveling speed.

Therefore, any combination of forward and backward traveling speeds to be adapted for the forward/backward traveling direction shift can be selected freely from whether the first or second clutch is engaged for activating each of drive trains for setting the respective selected forward and backward traveling speeds, freely from whether the forward traveling speed drive train for setting the selected forward traveling speed belongs to the high or low forward traveling speed drive train group, or freely from the selection of rated forward traveling speed. If the first or second clutch to be engaged for activating the forward traveling speed drive train for setting the manually selected forward traveling speed is the same as that to be engaged for activating the backward traveling speed drive train for setting the manually selected backward traveling speed, this first or second clutch has to be disengaged for the forward/backward traveling direction shift, thereby resulting in that the first and second clutches have to be simultaneously completely disengaged. However, as mentioned above, the swift and smooth forward/backward traveling direction shift by the alternate and overlapping engagement/disengagement of the first and second clutches is enabled if the first or second clutch to be engaged for activating the forward traveling speed drive train for setting the manually selected forward traveling speed is different from that to be engaged for activating the backward traveling speed drive train for setting the manually selected backward traveling speed.

In the third aspect, preferably, a vehicle equipped with the dual clutch transmission is further equipped with a prime mover for driving the dual clutch transmission and with an accelerator operation means for controlling an output speed of the prime mover. When the reverser operation means is shifted from the forward traveling position to the backward traveling position, the prime mover is controlled so that a maximum accelerated backward vehicle traveling speed when setting the backward traveling speed selected by the backward traveling speed selection operation means and when setting a maximum output rotary speed of the prime mover by operating the accelerator operation means becomes not more than a maximum accelerated forward vehicle traveling speed when setting the forward traveling speed selected by the forward traveling speed selection operation means and when setting a maximum output rotary speed of the prime mover by operating the accelerator operation means.

Therefore, even if the manually selected forward and backward traveling speeds essentially cause a considerably great difference between the forward vehicle traveling speed and the backward vehicle traveling speed, the control of the prime mover prevents the backward vehicle traveling speed after the forward/backward traveling direction shift from being unexpectedly suddenly increased. That is, the feeling for operating the accelerator operation means for backward traveling after the forward/backward traveling direction shift is prevented from being suddenly changed.

In the third aspect, preferably, when an overload on a prime mover driving the dual clutch transmission is detected during backward traveling of a vehicle equipped with the dual clutch transmission, the backward traveling speed selected by the backward traveling selection operation means is shifted down to a lower backward traveling speed.

Therefore, even if a wrong backward traveling speed, such as to cause the overload, is manually selected with the backward traveling speed selection operation means, or even if an unexpected load is applied on the prime mover during backward traveling of the vehicle, the shift down of backward traveling speed prevents the prime mover from being overloaded, thereby ensuring backward traveling of the vehicle without cease of power transmission.

In the third aspect, preferably, when another forward traveling speed is manually reselected by the forward traveling speed selection operation means, one of all the backward traveling speeds is automatically reselected to correspond to the reselected forward traveling speed. The forward/backward traveling speed shift by the alternate engagement/disengagement shift of the first and second clutches is performed between the reselected forward traveling speed and the reselected backward traveling speed.

Therefore, once an operator reselects another forward traveling speed with the forward traveling speed selection operation means, an optimal backward traveling speed is automatically reselected so that the operator does not have to consider the reselection of backward traveling speed or to manually operate the backward traveling speed selection operation means for selecting the backward traveling speed, and afterward, the swift and smooth forward/backward traveling direction shift by the alternate and overlapping engagement/disengagement of the first and second clutches is ensured.

These and other objects, features and advantages will appear more fully in the following detailed description with reference to attached drawings.

BRIEF DESCRIPTION OF THE DRAWINGS

FIG. 4 is a table indicating engagement/disengagement states of first and second clutches C1 and C2 and positions of clutch sliders 81a, 82a, 83a, 84a and 89a in correspondence to each speed of dual clutch transmission 2.

FIG. 7 is a table indicating selection of backward traveling speeds corresponding to rated forward traveling speeds, application of cross wave control, and application of engine cooperation control when dual clutch transmission 2 is set in an automatic reverse mode.

FIG. 17 is a table indicating engagement/disengagement states of first and second clutches C1 and C2 and positions of clutch sliders 81a, 82a, 83a, 84a, 89a and 240a in correspondence to each speed of dual clutch transmission 2C.

FIG. 18 is a table indicating selections of speeds, the cross wave control, and an engine cooperation control when dual clutch transmission 2C is set in an automatic reverse mode.

DETAILED DESCRIPTION OF THE INVENTION

Figure 1:
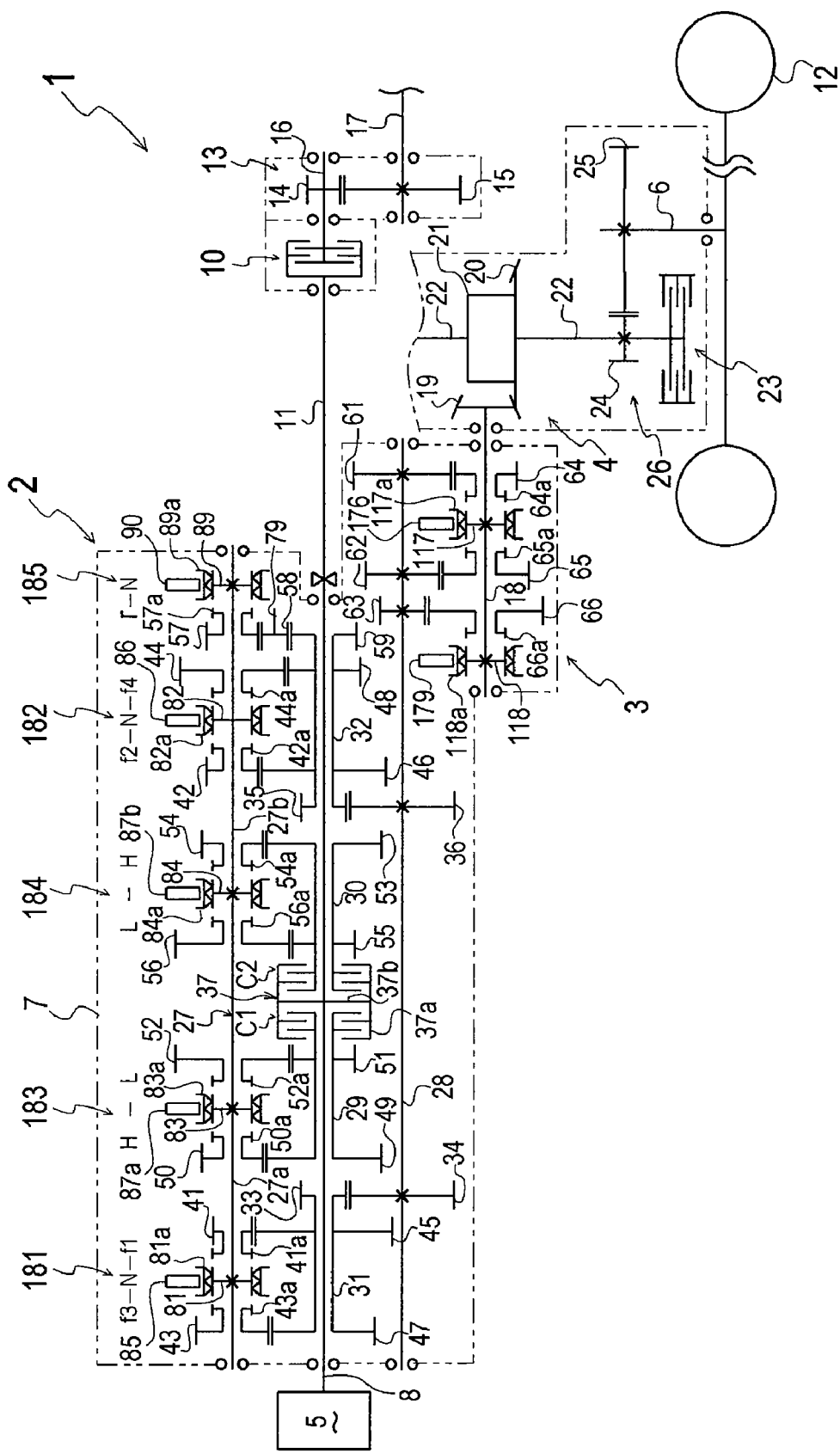
FIG. 1 is a skeleton diagram of a power transmission system of a vehicle 1 equipped with a dual clutch transmission 2.

Referring to FIG. 1, description will be given of a general structure of a working vehicle 1 equipped with a dual clutch transmission 2. For example, a four-wheel drive agricultural tractor serves as vehicle 1. Vehicle 1 is equipped with an engine 5 on a front portion thereof, and with a transmission casing 7 behind engine 5. A fore-and-aft horizontal input shaft 8 projects forward from transmission casing 7 so as to be drivingly connected to engine 5 (e.g., through a flywheel) and is journalled in transmission casing 7 so as to distribute its power between a traveling power train and a PTO power train.

The PTO power train is provided for driving a PTO shaft 17, and includes a PTO clutch input shaft 11, a PTO clutch 10, a PTO clutch output shaft 16 and a PTO deceleration gear train 13. PTO clutch input shaft 11 is coaxially and rotatably integrally connected at a front end thereof to a rear end of input shaft 8, and is connected at a rear end thereof to an input side of PTO clutch 10. PTO clutch output shaft 16 is disposed coaxially to PTO clutch input shaft 11, and is connected at a front end thereof to an output side of PTO clutch 10. PTO shaft 17 is journalled in transmission casing 7 in parallel to PTO output shaft 16, and projects rearward from a rear end of transmission casing 7 so as to be drivingly connected to a working machine attached to a rear portion of vehicle 1 serving as a tractor. PTO deceleration gear train 13 includes mutually meshing gears 14 and 15 in transmission casing 7. Gear 14 is diametrically smaller than gear 15, and is fixed on PTO clutch output shaft 16, and gear 15 is fixed on PTO shaft 17.

The traveling power train is provided for driving right and left wheels 12. In transmission casing 7, the traveling power train includes dual clutch transmission 2, a sub transmission 3, a differential gear train 4, right and left axle deceleration gear trains 26 and right and left axles 6. Dual clutch transmission 2 is driven by input shaft 8 so as to drive sub transmission 3. Differential gear train 4 includes an input gear 20 meshing with a final pinion 19 serving as an output gear of sub transmission 3 so as to be driven by sub transmission 3, and differentially connects right and left differential output shafts 22 to each other.

Right and left axles 6 are journalled by transmission casing 7, and project laterally outward from transmission casing 7 so as to be fixedly provided on outer ends thereof with respective (rear) wheels 12. Right axle deceleration gear train 26 is interposed between right differential output shaft 22 and right axle 6, and left axle deceleration gear train 26 between left differential output shaft 22 and left axle 6. Each axle deceleration gear train 26 includes mutually meshing gears 24 and 25. Gear 24 is diametrically smaller than gear 25 and is fixed on differential output shaft 22, and gear 25 is fixed on axle 6. Right and left brake devices 23 are provided on outer end portions of right and left differential output shafts 22, respectively. The traveling power train can branch its power to unshown (front) wheels other than wheels 12 so that vehicle 1 can drive by four wheels.

Dual clutch transmission 2 will be described with reference to FIGS. 1 and 2. As shown in FIG. 1, in transmission casing 7, input shaft 8 is relatively rotatably provided thereon with hollow shafts 29, 30, 31 and 32 of dual clutch transmission 2. First speed change shaft 31 and first clutch output shaft 29 are provided on a front portion of input shaft 8, and second clutch output shaft 30 and second speed change shaft 32 are provided on a rear portion of input shaft 8. A dual clutch unit 37 is provided around input shaft 8 between first and second clutch output shafts 29 and 30. Dual clutch unit 37 includes a clutch housing 37a, a first clutch C1 and a second clutch C2. An axial central boss portion of clutch housing 37a is fixed on input shaft 8. Clutch housing 37a is formed therein with front and rear chambers, and is formed with a partition 37b radically expanded from the central boss portion between the front and rear clutch chambers. First clutch C1 is disposed in the front clutch chamber formed in clutch housing 37a so as to be interposed between clutch housing 37a and first clutch output shaft 29. Second clutch C2 is disposed in the rear clutch chamber formed in clutch housing 37a so as to be interposed between clutch housing 37a and second clutch output shaft 30.

Figure 2:
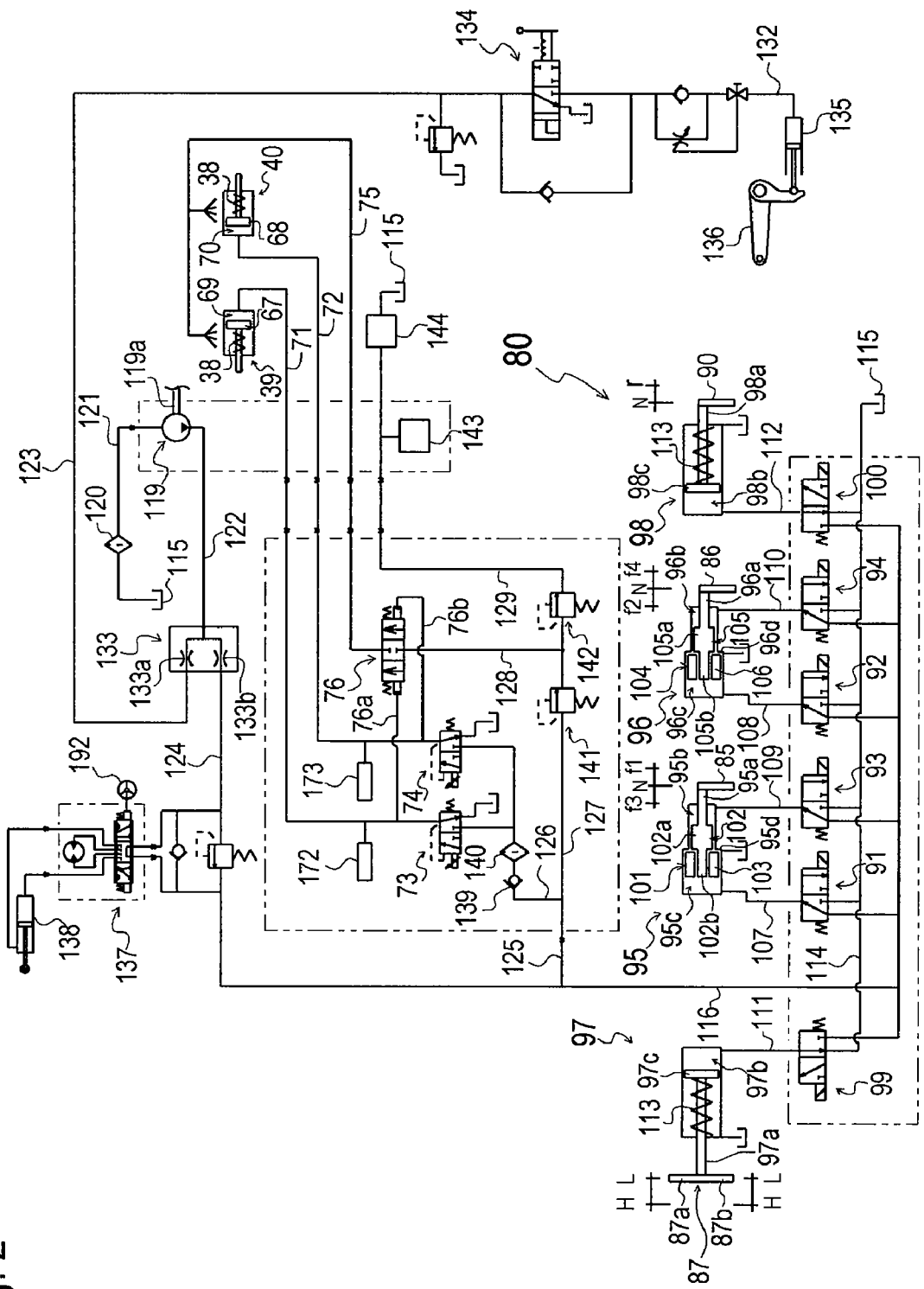
FIG. 2 is a hydraulic circuit diagram for controlling dual clutch transmission 2 and others in vehicle 1.

Referring to FIG. 2, the front clutch chamber of first clutch C1 is diagrammed as a cylinder 39 with a piston 67 therein, and the rear clutch chamber of second clutch C2 is diagrammed as a cylinder 40 with a piston 68 therein. In clutch C1, first piston 67 is axially slidably provided in cylinder 39, and friction elements (e.g., discs) relatively unrotatably and axially slidably fitted to clutch housing 37a and friction elements (e.g., discs) relatively unrotatably and axially slidably fitted to first clutch output shaft 29 are alternately aligned in cylinder 39. A spring 38 is disposed in cylinder 39 so as to bias the friction elements to separate one another in the direction for disengaging first clutch C1. When pressurized fluid is supplied to a fluid chamber 69 between first piston 67 and partition 37b, the pressure of the fluid pushes first piston 67 so as to press the friction elements against one another, thereby engaging clutch C1. Similar to first clutch C1, second clutch C2 is provided with friction elements, second piston 68 and a spring 38, and is actuated by second piston 68 pushed by pressurized fluid supplied to a fluid chamber 70 between second piston 68 and partition 37b of clutch housing 37a.

Referring to FIG. 2, two proportional reducing solenoid valves are provided in or on transmission casing 7 so as to serve as a first clutch control valve 73 for controlling the supply of clutch pressure fluid to fluid chamber 69 of first clutch C1 through a fluid passage 71, and a second clutch control valve 74 for controlling the supply of clutch pressure fluid to fluid chamber 70 of second clutch C2 through a fluid passage 72. A switching valve is provided in or on transmission casing 7 so as to serve as a lubricating fluid control valve 76 for controlling a supply of lubricating fluid to dual clutch unit 37 through a fluid passage 75.

Figure 3:
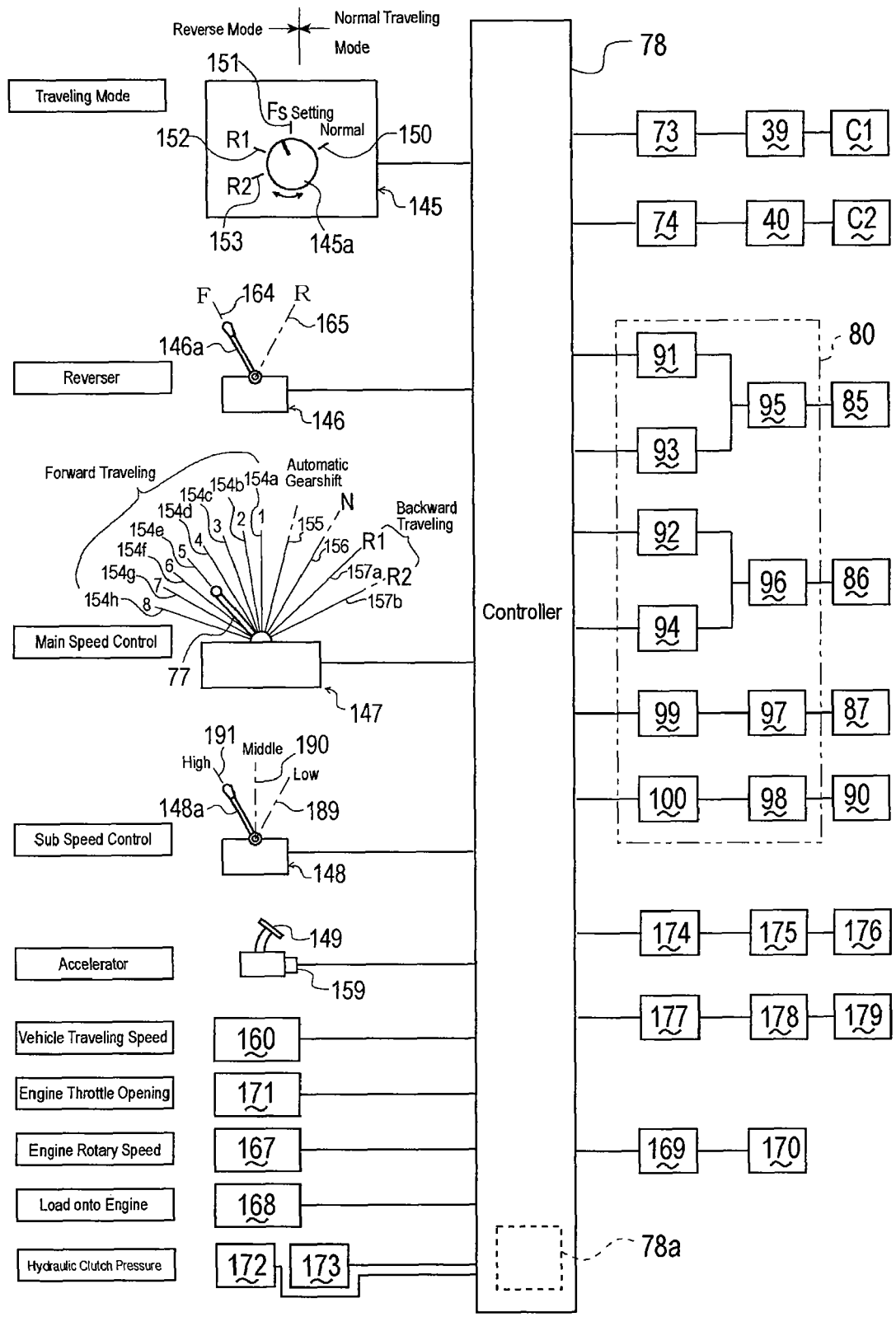
FIG. 3 is a block diagram of an electric control system for controlling dual clutch transmission 2, a sub transmission 3 and an engine 5, showing a controller 78 and elements electrically connected to controller 78.

Referring to FIG. 3, vehicle 1 is provided with a controller 78 for controlling transmissions 2 and 3. To control clutches C1 and C2, valves 73 and 74 are electrically connected to controller 78 so as to be controlled by controller 78 based on signals from later-discussed input means electrically connected to controller 78 and based on programs in controller 78, thereby controlling the clutch pressure fluid supply to fluid chambers 69 and 70 of first and second valves C1 and C2.

Figure 5:
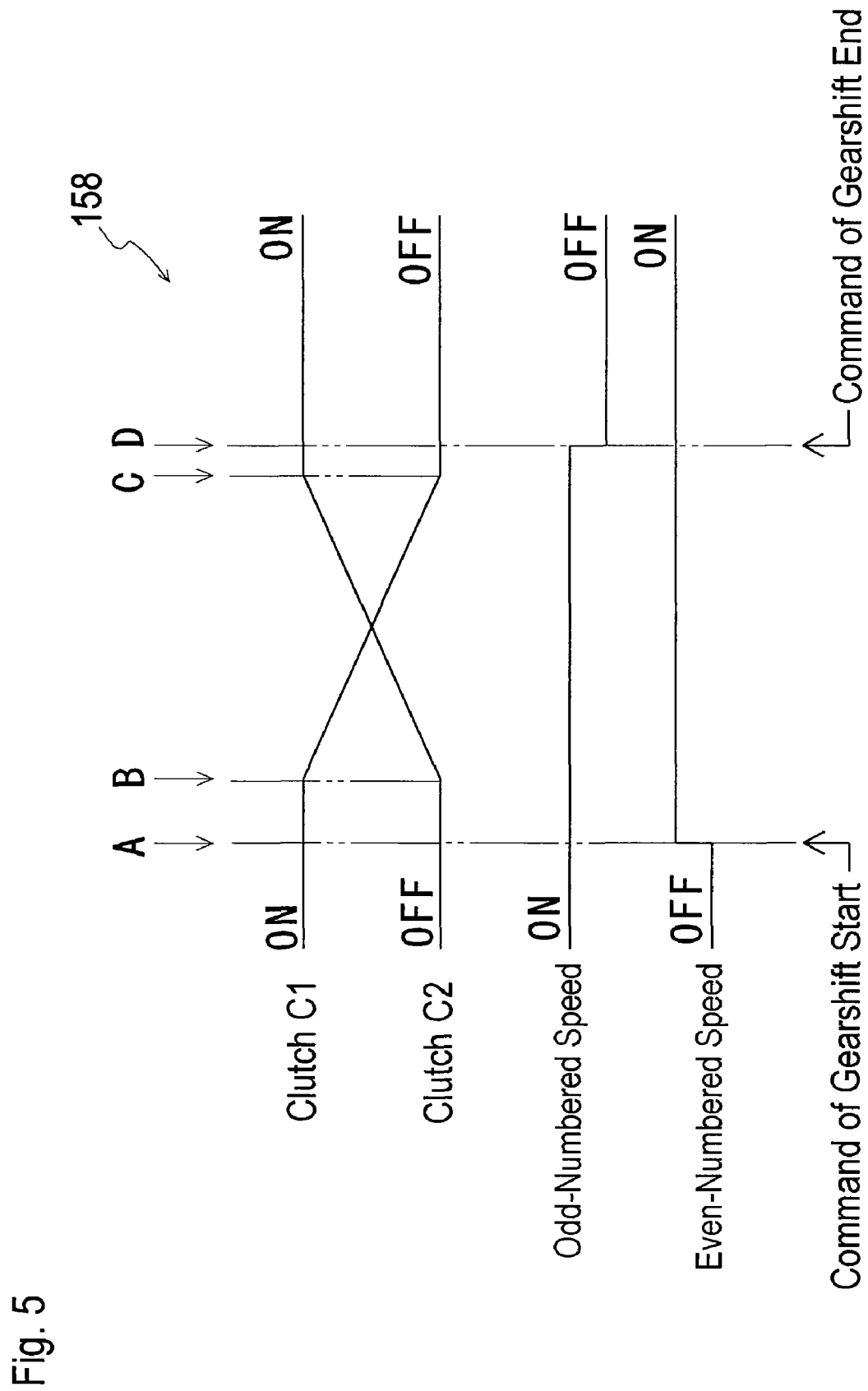
FIG. 5 is a time chart indicating a process of speed change from an odd-numbered forward traveling speed to an even-numbered forward traveling speed as a representative automatic speed change of dual clutch transmission 2 along with a cross wave control of clutches C1 and C2.

First clutch C1 is engaged for activating selected one speed gear train of a later-discussed odd-numbered forward traveling speed gear train group of dual clutch transmission 2, and second clutch C2 is engaged for activating selected one speed gear train of a later-discussed even-numbered forward traveling speed gear train group of dual clutch transmission 2. Referring to FIG. 5, while a later-discussed automatic gearshift mode is set, during a gearshift of dual clutch transmission 2 between an odd-numbered forward traveling speed and an even-numbered forward traveling speed, valves 73 and 74 are controlled to gradually increase a clutch pressure (referred to as the hydraulic pressure of the fluid supplied to fluid chamber 69 or 70) of one clutch C1 or C2 and gradually reduce a clutch pressure of the other clutch C2 or C1 (for a period between timings B and C in FIG. 5), so as to engage one clutch C1 or C2 and disengage the other clutch C2 or C1. In this regard, controller 78 controls valves 73 and 74 so that the increase of clutch pressure of one clutch C1 or C2 to be engaged overlaps the reduction of clutch pressure of the other clutch C2 or C1 to be disengaged, i.e., so that the engagement action of disengaged clutch C1 or C2 overlaps the disengagement action of engaged clutch C2 or C1.

Incidentally, FIG. 5 illustrates a representative process of forward traveling speed shift from an odd-numbered speed to an even-numbered speed, however, it also suggests the process of forward traveling speed shift from an even-numbered speed to an odd-numbered speed, if the references to clutches C1 and C2 are interchanged for each other and the references to odd-numbered and even-numbered speeds.

This alternate and overlapping engagement/disengagement control of first and second clutches C1 and C2 realized based on the above-mentioned clutch pressure control during gearshift between the odd-numbered forward traveling speed and the even-numbered forward traveling speed is referred to as a "cross wave control". The cross wave control is advantageous for ensuring smooth and swift gearshift because it realizes a half-clutch state without cease of power transmission while both an odd-numbered forward traveling speed gear train and an even-numbered forward traveling speed gear train are simultaneously selected to be activated before engagement of either clutch C1 or C2.

The cross wave control of clutches C1 and C2 is also utilized for gearshift between an odd-numbered forward traveling speed and a backward traveling speed when a later-discussed reverse mode is set. In this regard, in the reverse mode, the cross wave control of clutches C1 and C2 is performed while an odd-numbered forward traveling speed gear train and a backward traveling speed gear train are simultaneously selected to be activated. In this regard, FIG. 5 also suggests the process of shift from odd-numbered forward traveling speed to backward traveling speed if the reference to "even-numbered speed" is replaced with a reference to "backward traveling speed".

In some gearshift cases, e.g., the typical gearshift between an even-numbered forward traveling speed and a backward traveling speed, both clutches C1 and C2 are completely disengaged before a target speed gear train is selected to be activated, because the target speed gear train is activated by engaging the same clutch C1 or C2 as the clutch which is engaged to activate the last activated speed gear train. This control of clutches C1 and C2 is referred to as a "clutch-off control". The clutch-off control of clutches C1 and C2 is applied in a later-discussed manual reverse mode.

Incidentally, as shown in FIGS. 2 and 3, a pressure sensor 172 is provided for detecting a pressure of fluid flowing in passage 71 so as to detect the clutch pressure of clutch C1 as the hydraulic pressure of fluid supplied into fluid chamber 69. A pressure sensor 173 is provided for detecting a pressure of fluid flowing in passage 72 so as to detect the clutch pressure of clutch C2 as the hydraulic pressure of fluid supplied into fluid chamber 70. Pressure sensors 172 and 173 are electrically connected to controller 78. Therefore, valves 73 and 74 accurately control the clutch pressures of clutches C1 and C2 based on the pressures detected by sensors 172 and 173.

In each gearshift of dual clutch transmission 2, either the "cross wave control" or "clutch-off control" of clutches C1 and C2 is performed along with shift of speed gear trains of dual clutch transmission 2. The configuration of the speed gear trains of dual clutch transmission 2 will be described. Referring to FIG. 1, dual clutch transmission 2 includes a main transmission shaft 27 journalled in transmission casing 7 parallel to input shaft 8. A front portion 27a of main transmission shaft 27 is disposed forward of dual clutch unit 37 on input shaft 8, and is relatively rotatably provided thereon with gears 43, 41, 50 and 52. A rear portion 27b of main transmission shaft 27 is disposed rearward of dual clutch unit 37 on input shaft 8, and is relatively rotatably provided thereon with gears 56, 54, 42, 44 and 57. Therefore, gears 43, 41, 50, 52, 56, 54, 42, 44 and 57 are coaxially aligned rearward in this order.

An odd-numbered forward traveling speed shifter unit 181 including gears 43 and 41 is configured on main transmission shaft 27. In shifter unit 181, gears 43 and 41 are formed with respective clutch-toothed portions 43a and 41a facing each other, a spline hub 81 is fixed on main transmission shaft 27 between gears 43 and 41, and a clutch slider 81a is relatively unrotatably and axially slidably spline-fitted on spline hub 81 so as to be shiftable among a third speed position f3, a neutral position N and a first speed position f1. Clutch slider 81a set at third speed position f3 meshes with clutch-toothed portion 43a of gear 43. Clutch slider 81a set at first speed position f1 meshes with clutch-toothed portion 41a of gear 41. Clutch slider 81a set at neutral position N meshes with neither clutch-toothed portion 43a nor clutch-toothed portion 41a.

A first high/low speed shifter unit 183 including gears 50 and 52 is configured on main transmission shaft 27. In shifter unit 183, gears 50 and 52 are formed with respective clutch-toothed portions 50a and 52a facing each other, a spline hub 83 is fixed on main transmission shaft 27 between gears 50 and 52, and a clutch slider 83a is relatively unrotatably and axially slidably spline-fitted on spline hub 83 so as to be shiftable between a high speed position H and a low speed position L. Clutch slider 83a set at high speed position H meshes with clutch-toothed portion 50a of gear 50. Clutch slider 83a set at low speed position L meshes with clutch-toothed portion 52a of gear 52.

A second high/low speed shifter unit 184 including gears 56 and 54 is configured on main transmission shaft 27. In shifter unit 184, gears 56 and 54 are formed with respective clutch-toothed portions 56a and 54a facing each other, a spline hub 84 is fixed on main transmission shaft 27 between gears 56 and 54, and a clutch slider 84a is relatively unrotatably and axially slidably spline-fitted on spline hub 84 so as to be shiftable among a low speed position L and a high speed position H. Clutch slider 84a set at low speed position L meshes with clutch-toothed portion 56a of gear 56. Clutch slider 84a set at high speed position H meshes with clutch-toothed portion 54a of gear 54.

As discussed later, clutch sliders 83 and 84a are synchronously interlocked with each other so that they are simultaneously shifted to respective high speed positions H, and are simultaneously shifted to respective low speed positions L.

In FIG. 2, for convenience, each of clutch sliders 83a and 84a is illustrated as being separated from any clutch-toothed portion. However, this does not mean that each of clutch sliders 83a and 84a is shiftable to a neutral position to disengage from any clutch-toothed portion. The fact is that each of clutch sliders 83a and 84a is shiftable between the two positions L and H, as mentioned above. The same thing is adapted for clutch sliders 83a and 84a illustrated in each of FIGS. 11, 13, 14, 19 and 20.

An even-numbered forward traveling speed shifter unit 182 including gears 42 and 44 is configured on main transmission shaft 27. In shifter unit 182, gears 42 and 44 are formed with respective clutch-toothed portions 42a and 44a facing each other, a spline hub 82 is fixed on main transmission shaft 27 between gears 42 and 44, and a clutch slider 82a is relatively unrotatably and axially slidably spline-fitted on spline hub 82 so as to be shiftable among a second speed position f2, a neutral position N and a fourth speed position f4. Clutch slider 82a set at second speed position f2 meshes with clutch-toothed portion 42a of gear 42. Clutch slider 82a set at fourth speed position f4 meshes with clutch-toothed portion 44a of gear 44. Clutch slider 82a set at neutral position N meshes with neither clutch-toothed portion 42a nor clutch-toothed portion 44a.

A backward traveling shifter unit 185 including gear 57 is configured on main transmission shaft 27. In shifter unit 185, gear 57 is formed on a rear end thereof with a clutch-toothed portion 57a, a spline hub 89 is fixed on main transmission shaft 27 rearward of gear 57, and a clutch slider 89a is relatively unrotatably and axially slidably spline-fitted on spline hub 89 so as to be shiftable between a backward traveling position r and a neutral position N. Clutch slider 89a set at backward traveling position r meshes with clutch-toothed portion 57a of gear 57. Clutch slider 89a set at neutral position N does not mesh with clutch-toothed portion 57a.

In this way, shifter units 181, 183, 184, 182 and 185 are coaxially fore-and-aft aligned on main transmission shaft 27 so as to simplify dual clutch transmission 2 and facilitate maintenance of dual clutch transmission 2. Each clutch slider may be a synchromesh type slider.

Gears 47 and 45 are fixed on first speed change shaft 31, gear 47 meshes with gear 43, and gear 45 meshes with gear 41. Gears 49 and 51 are fixed on first clutch output shaft 29, gear 49 meshes with gear 50, and gear 51 meshes with gear 52. Gears 55 and 53 are fixed on second clutch output shaft 30, gear 55 meshes with gear 56, and gear 53 meshes with gear 54. Gears 46 and 48 are fixed on second speed change shaft 32, gear 46 meshes with gear 42, and gear 48 meshes with gear 44. An idle gear shaft 79 provided thereon with an idle gear 58 is extended in transmission casing 7 parallel to main transmission shaft 27 and input shaft 8. Gear 59 is fixed on second speed change shaft 32, and gear 59 meshes with gear 57 through idle gear 58.

Order in alignment of the speed gears and the shifter units in the axial direction of shaft 27 is not limited to that shown in FIG. 1. For example, while the arrangement of shifter unit 183 and gears 49, 50, 51 and 52 are kept as illustrated so that the front shift position of clutch slider 83*a* is high speed position H and the rear shift position thereof is low speed position L, the illustrated arrangement of shifter unit 184 and gears 55, 56, 53 and 54 may be inversed in the axial direction of shaft 27 so that the front shift position of clutch slider 84*a* is high speed position H and the rear shift position thereof is low speed position L, thereby being convenient for the synchronous interlocking of clutch sliders 83*a* and 84*a* (or later-discussed forks 87*a* and 87*b*). The same thing is adapted for later-discussed alternative dual clutch transmissions.

A fore-and-aft horizontal shaft 28 is journalled in transmission casing 7, so as to serve as an output shaft of dual clutch transmission 2, and as an input shaft of sub transmission 3. A gear 33 is fixed on a rear end of first speed change shaft 31, a gear 34 is fixed on shaft 28, and gears 33 and 34 mesh with each other to serve as a first deceleration gear train interposed between shafts 31 and 28. A gear 35 is fixed on a front end of second speed change shaft 32, a gear 36 is fixed on shaft 28, and gears 35 and 36 mesh with each other to serve as a second deceleration gear train interposed between shafts 32 and 28.

In this way, referring to FIG. 4, dual clutch transmission 2 provides eight forward traveling speeds F1, F2, F3, F4, F5, F6, F7 and F8 and two backward traveling speeds R1 and R2. In other words, dual clutch transmission 2 includes first to eighth forward traveling speed gear trains and first and second (i.e., low and high) backward traveling speed gear trains, which are interposed between dual clutch unit 37 and shaft 28. More specifically, the odd-numbered (i.e., first, third, fifth and seventh) forward traveling speed gear trains, to be activated by engaging first clutch C1, i.e., to be drivingly connected to input shaft 8 through engaged first clutch C1, are interposed between first clutch C1 and shaft 28 through shafts 27 and 31. The even-numbered (i.e., second, fourth, sixth and eighth) forward traveling speed gear trains and the two backward traveling speed gear trains, to be activated by engaging second clutch C2, i.e., to be drivingly connected to input shaft 8 through engaged second clutch C2, are interposed between second clutch C2 and shaft 28 through shafts 27 and 32.

The odd-numbered (i.e., first, third, fifth and seventh) forward traveling speed gear trains share first speed change shaft 31, gears 33 and 34 and shaft 28. Either first and fifth forward traveling speeds F1 and F5 or third and seventh forward traveling speeds F3 and F7 are selected depending on whether clutch slider 81*a* is set at first speed position f1 or third speed position f3, and either first and third forward traveling speeds F1 and F3 or fifth and seventh forward traveling speeds F5 and F7 are selected depending on whether clutch slider 83*a* is set at low speed position L or high speed position H.

Gears 51 and 52, shaft 27, gears 41 and 45, shaft 31, gears 33 and 34 and shaft 28 are interlocked with one another in series by setting clutch slider 83*a* at low speed position L and clutch slider 81*a* at first speed position f1, so as to serve as the first forward traveling speed gear train for setting first forward traveling speed F1, i.e., the lowest forward traveling speed of dual clutch transmission 2. Gears 51 and 52, shaft 27, gears 43 and 47, shaft 31, gears 33 and 34 and shaft 28 are interlocked with one another in series by setting clutch slider 83*a* at low speed position L and clutch slider 81*a* at third speed position f3, so as to serve as the third forward traveling speed gear train for setting third forward traveling speed F3.

Gears 49 and 50, shaft 27, gears 41 and 45, shaft 31, gears 33 and 34 and shaft 28 are interlocked with one another in series by setting clutch slider 83*a* at high speed position H and clutch slider 81*a* at first speed position f1, so as to serve as the fifth forward traveling speed gear train for setting fifth forward traveling speed F5. Gears 49 and 50, shaft 27, gears 43 and 47, shaft 31, gears 33 and 34 and shaft 28 are interlocked with one another in series by setting clutch slider 83*a* at high speed position H and clutch slider 81*a* at third speed position f3, so as to serve as the seventh forward traveling speed gear train for setting seventh forward traveling speed F3.

The even-numbered (i.e., first, third, fifth and seventh) forward traveling speed gear trains and the two (i.e., high and low) backward traveling speed gear trains share second speed change shaft 32, gears 35 and 36 and shaft 28. While clutch slider 89*a* is set at neutral position N, either second and sixth forward traveling speeds F2 and F6 or fourth and eighth forward traveling speeds F4 and F8 are selected depending on whether clutch slider 82*a* is set at second speed position f2 or fourth speed position f4, and either second and fourth forward traveling speeds F2 and F4 or sixth and eighth forward traveling speeds F6 and F8 are selected depending on whether clutch slider 84*a* is set at low speed position L or high speed position H. While clutch slider 82*a* is set at neutral position N and clutch slider 89*a* is set at backward traveling position r, either low backward traveling speed R1 or high backward traveling speed R2 is selected depending on whether clutch slider 84*a* is set at low speed position L or high speed position H.

Gears 55 and 56, shaft 27, gears 42 and 46, shaft 32, gears 35 and 36 and shaft 28 are interlocked with one another in series by setting clutch slider 84*a* at low speed position L, clutch slider 82*a* at second speed position f2, and clutch slider 89*a* at neutral position N, so as to serve as the second forward traveling speed gear train for setting second forward traveling speed F2. Gears 55 and 56, shaft 27, gears 44 and 48, shaft 32, gears 35 and 36 and shaft 28 are interlocked with one another in series by setting clutch slider 84*a* at low speed position L, clutch slider 82*a* at fourth speed position f4, and clutch slider 89*a* at neutral position N, so as to serve as the fourth forward traveling speed gear train for setting fourth forward traveling speed F4.

Gears 53 and 54, shaft 27, gears 42 and 46, shaft 32, gears 35 and 36 and shaft 28 are interlocked with one another in series by setting clutch slider 84*a* at high speed position H, clutch slider 82*a* at second speed position f2, and clutch slider 89*a* at neutral position N, so as to serve as the sixth forward traveling speed gear train for setting sixth forward traveling speed F6. Gears 53 and 54, shaft 27, gears 42 and 46, shaft 32, gears 35 and 36 and shaft 28 are interlocked with one another in series by setting clutch slider 84*a* at high speed position H, clutch slider 82*a* at fourth speed position f4, and clutch slider 89a at neutral position N, so as to serve as the eighth forward traveling speed gear train for setting eighth forward traveling speed F8, i.e., the maximum forward traveling speed of dual clutch transmission 2.

Gears 55 and 56, shaft 27, gears 57, 58 and 59, shaft 32, gears 35 and 36 and shaft 28 are interlocked with one another in series by setting clutch slider 84a at low speed position L, clutch slider 82a at neutral position N, and clutch slider 89a at backward traveling position r, so as to serve as the low backward traveling speed gear train for setting low backward traveling speed R1. Gears 53 and 54, shaft 27, gears 57, 58 and 59, shaft 32, gears 35 and 36 and shaft 28 are interlocked with one another in series by setting clutch slider 84a at high speed position H, clutch slider 82a at neutral position N, and clutch slider 89a at backward traveling position r, so as to serve as the high backward traveling speed gear train for setting high backward traveling speed R2.

As shown in FIG. 1, forks 85, 86, 87a, 87b and 90 are engaged on respective clutch sliders 81a, 82a, 83a, 84a and 89a. Forks 87a and 87b are synchronized (i.e., integrally movable) so that both clutch sliders 83a and 84a are simultaneously set to respective high speed positions H, and are simultaneously set to respective low speed positions L. Referring to FIG. 2, transmission casing 7 is provided therein or thereon with a hydraulic speed gear control system 80, including hydraulic actuators (cylinders) 95, 96, 97 and 98 and solenoid switching valves 91, 92, 93, 94, 99 and 100 for controlling these hydraulic cylinders, so as to control forks 85, 86, 87a, 87b and 90, i.e., clutch sliders 81a, 82a, 83a, 84a and 89a.

Double-acting first hydraulic cylinder 95 is stepped at an axially intermediate portion thereof so as to form axially opposite diametrically large and small portions and a shoulder 95d therebetween. Cylinder 95 is provided therein with a main piston 102 and a sub piston 103. Main piston 102 includes a diametrically large portion 102a and a diametrically small portion 102b, and is extended from diametrically large portion 102a axially opposite to diametrically small portion 102b and outward from cylinder 95 through the diametrically small portion of cylinder 95 so as to serve as a piston rod 95a connected to fork 85.

Diametrically large portion 102a of main piston 102 has an outer diameter such as to fluid-tightly fit to the diametrically small portion of cylinder 95. Cylindrical sub piston 103 is axially slidably fitted on diametrically small portion 102b of main piston 102. Sub piston 103 is disposed in the diametrically large portion of cylinder 95, and has an outer diameter larger than the outer diameter of diametrically large portion 102a of main piston 102, so as to fluid-tightly fit to the diametrically large portion of cylinder 95. Main piston 102 and sub piston 103 constitute a piston 101.

A space in the diametrically large portion of cylinder 95 defined by sub piston 103 and diametrically small portion 102b of main piston 102 is a fluid chamber 95c fluidly connected to valve 91 through a passage 107. A space in the diametrically small portion of cylinder 95 defined by diametrically large portion 102a of main piston 102 is a fluid chamber 95b fluidly connected to valve 93 through a passage 109. Further, a gap in the diametrically large portion of cylinder 95 between shoulder 95d and sub piston 103 is fluidly connected to a fluid tank 115 which may be a fluid sump in transmission casing 7.

Due to this structure, when solenoids of both valve 91 and 93 are unexcited, valves 91 and 93 supply fluid to both opposite fluid chambers 95b and 95c through respective fluid passages 107 and 109. In this state, since one side area of piston 101 receiving the hydraulic pressure of fluid chamber 95c is larger than the other side area of piston 101 receiving the hydraulic pressure of fluid chamber 95b, piston 101 is pushed toward fluid chamber 95b by the differential pressure between fluid chambers 95b and 95c so that an outer peripheral edge of sub piston 103 abuts against shoulder 95d, thereby accurately retaining piston 101, fork 85 and clutch slider 81a at neutral position N.

When the solenoid of valve 93 is excited and the solenoid of valve 91 is not excited, valve 93 drains fluid from fluid chamber 95b to tank 115, and piston 101 receives the hydraulic pressure of fluid in fluid chamber 95c supplied by valve 91, so that, while sub piston 103 is retained by shoulder 95d, main piston 102 slides and abuts against a distal end of fluid chamber 95b, thereby setting clutch slider 81a at first speed position f1. When the solenoid of valve 93 is not excited and the solenoid of valve 91 is excited, valve 91 drains fluid from fluid chamber 95c to tank 115, and piston 101 receives the hydraulic pressure of fluid in fluid chamber 95b supplied by valve 93, so that both main piston 102 and sub piston 103 slide and abut against a distal end of fluid chamber 95c, thereby engaging clutch slider 81a at third speed position f3.

Similar to first hydraulic cylinder 95, double-acting second hydraulic cylinder 96 is formed with shoulder 96d corresponding to shoulder 95d, and is provided therein with a piston 104 including a main piston 105 and a sub piston 106, corresponding to piston 101 including pistons 102 and 103. Main piston 105 is formed with a diametrically large portion 105a and a diametrically small portion 105b and is extended as a piston rod 96a, similar to main piston 102 including diametrically large portion 102a and diametrically small portion 102b and extended as piston rod 95a. Second hydraulic cylinder 96 is formed with fluid chambers 96c and 96b opposite to each other with respect to piston 104, similar to fluid chambers 95c and 95b. Fluid chamber 96c is fluidly connected to solenoid switching valve 92 through a fluid passage 108, and fluid chamber 96b is fluidly connected to solenoid switching valve 94 through a fluid passage 110. Piston 104, fork 86 and clutch slider 82a are retained at neutral position N by unexciting solenoids of both valves 92 and 94, are set at second speed position f2 by exciting the solenoid of valve 92, and are set at fourth speed position f4 by exciting the solenoid of valve 94.

Single-acting third hydraulic cylinder 97 is slidably and fluid-tightly provided therein with a piston 97c, from which a piston rod 97a is extended outward from cylinder 97 and is connected to a fork member 87 provided with integrally movable forks 87a and 87b. In cylinder 97, a spring 113 is wound around piston rod 97a. A space in cylinder 97 opposite to piston rod 97a with respect to piston 97c serves as a fluid chamber 97b fluidly connected to solenoid switching valve 99 through a fluid passage 111. When a solenoid of valve 99 is unexcited, fluid is drained from fluid chamber 97b to tank 115, and spring 113 biases piston 97c, so that piston 97c, forks 87a and 87b and clutch sliders 83a and 84a are set at respective low speed positions L. When the solenoid of valve 99 is excited, fluid is supplied into fluid chamber 97b against spring 113, so that piston 97c, forks 87a and 87b and clutch sliders 83a and 84a are set at respective high speed positions H.

Single-acting fourth hydraulic cylinder 98 is slidably and fluid-tightly provided therein with a piston 98c, from which a piston rod 98a is extended outward from cylinder 98 and is connected to fork 90. In cylinder 98, a spring 113 is wound around piston rod 98a. A space in cylinder 98 opposite to piston rod 98a with respect to piston 98c serves as a fluid chamber 98b fluidly connected to solenoid switching valve 100 through a fluid passage 112. When a solenoid of valve 100 is unexcited, fluid is drained from fluid chamber 98b to tank 115, and spring 113 biases piston 98c, so that piston 98c, fork 90 and clutch slider 89a are set at neutral position N. When the solenoid of valve 100 is excited, fluid is supplied into fluid chamber 98b against spring 113, so that piston 98c, fork 90 and clutch sliders 89a are set at backward traveling position r.

Referring to FIG. 3, valves 91, 93, 92, 94, 99 and 100 of hydraulic speed gear control system 80 for dual clutch transmission 2 are electrically connected to controller 78 so as to be controlled by controller 78.

Referring to a hydraulic circuit connected to hydraulic speed gear control system 80, as shown in FIG. 2, a hydraulic pump 119, whose drive shaft 119a is driven by input shaft 8 or the like, is provided in or on transmission casing 7. Pump 119 absorbs fluid from tank 115 through a filter 120 and a passage 121, and delivers the fluid to a distributor 133 through a passage 122. Distributor 133 includes throttles (or orifices) 133a and 133b so as to distribute fluid between throttles 133a and 133b. The fluid flow from throttle 133b is supplied to hydraulic speed gear control system 80, i.e., to hydraulic cylinders 95, 96, 97 and 98 through respective valves 91, 93, 92, 94, 99 and 100, and the fluid flow from throttle 133b to hydraulic speed gear control system 80 is partly branched to a hydraulic power steering system 137 through a passage 124. Power steering system 137 is provided to supply fluid to a power steering cylinder 138 for turning steerable wheels (e.g., unshown front wheels other than rear wheels 12) of vehicle 1 and includes a control valve operatively connected to a steering wheel 192 serving as a steering manipulator of vehicle 1. The fluid flow from throttle 133a is supplied through a passage 123, a control valve 134 and a passage 132 to a lift cylinder 135 which serves as an actuator for rotating a lift arm 136 of the tractor serving as vehicle 1 so as to raise or lower a working machine attached to lift arm 136.

The fluid flow between hydraulic power steering system 137 and hydraulic speed gear control system 80 is partly branched to a passage 125. The fluid in passage 125 is distributed between passages 126 and 127. The fluid in passage 126 is supplied through a check valve 139 and a filter 140 to first and second clutch control valves 73 and 74. As mentioned above, valve 73 is adapted to supply fluid through passage 71 to fluid chamber 69 in cylinder 39 so as to control piston 67 of first clutch C1, and valve 74 is adapted to supply fluid through passage 72 to fluid chamber 70 in cylinder 40 so as to control piston 68 of second clutch C2.

The fluid in passage 127 is supplied to a pressure regulating valve 141. A part of the fluid flowing through valve 141 is supplied through a passage 128 to valve 76 for controlling the supply of lubricating fluid to cylinders 39 and 40 of dual clutch unit 37. Valve 76 is controlled by opposite hydraulic pilot pressures of fluid flowing through respective pilot fluid passages 76a and 76b branched from respective passages 71 and 72. The other part of the fluid flowing through valve 141 is supplied to a bearing system 143 for supporting input shaft 8, and then is supplied to a lubrication circuit 144 formed in transmission casing 7 for lubricating gears and others, and is finally returned to tank 115.

Referring to FIG. 1, the configuration of sub transmission 3 will be described. As mentioned above, gears 34 and 36 fixed on a front portion of shaft 28 serving as both the main transmission output shaft and the sub transmission input shaft mesh with respective gears 33 and 35 fixed on respective first and second speed change shafts 31 and 32 so that shaft 28 can receive the output power from dual clutch transmission 2. Gears 63, 62 and 61 are fixed on a rear portion of shaft 28. Sub transmission 3 includes a sub transmission shaft 18 on which gears 66, 65 and 64 are relatively rotatably provided and mesh with respective gears 63, 62 and 61. Mutually meshing gears 63 and 66 serve as a sub low speed gear train, mutually meshing gears 62 and 65 serve as a sub middle speed gear train, and mutually meshing gears 61 and 64 serve as a sub high speed gear train.

Shaft 28 is fixedly provided thereon with a spline hub 118 in front of gear 66, and with a spline hub 117 between gears 65 and 64. Clutch sliders 118a and 117a are relatively unrotatably and axially slidably spline-fitted on respective spline hubs 118 and 117. Gear 66 is formed on a front end thereof with a clutch-toothed portion 66a. Gears 65 and 64 are formed with respective clutch-toothed portions 65a and 64a facing clutch slider 117a therebetween. One of low, middle and high speeds of sub transmission 3 is selected, i.e., one of the sub low, middle and high speed gear trains is selected to be activated, by meshing corresponding one of clutch-toothed portions 66a, 65a and 64a with either clutch slider 118a or 117a and separating the other clutch-toothed portions from clutch slider/sliders 118a or/and 117a. Clutch slider 117a is further shiftable to a neutral position to be separated from both clutch-toothed portions 65a and 64a so that it is set at the neutral position when clutch slider 118a meshes with clutch-toothed portion 66a. Forks 176 and 179 are engaged on respective clutch sliders 117 and 118.

Referring to FIG. 3, actuators 175 and 178 are provided for controlling respective forks 176 and 179, and electric control means 174 and 177 are electrically connected to controller 78 so as to control respective actuators 175 and 178. For example, actuators 175 and 178 are hydraulic cylinders, and control means 174 and 177 are solenoid valves.

Referring to FIG. 3, operation devices and sensors serving as input means for inputting operation or detection signals to controller 78 will be described. A main speed control lever 77, a reverser lever 146a and a traveling mode setting dial 145a are operation devices (manipulators) for controlling dual clutch transmission 2, i.e., for controlling valves 73, 74, 91, 92, 93, 94, 99 and 100. Main speed control lever 77 is shiftable among first to eighth forward traveling speed positions 154a, 154b, 154c, 154d, 154e, 154f, 154g and 154h corresponding to respective first to eighth forward traveling speeds F1, F2, F3, F4, F5, F6, F7 and F8, an automatic gearshift mode position 155, a neutral position 156, and low and high backward traveling speed positions 157a and 157b corresponding to respective low and high backward traveling positions R1 and R2. A lever position sensor 147 detects a position of lever 77, and issues a detection signal to controller 78. Reverser lever 146a is shiftable between a forward traveling position 164 and a backward traveling position 165. A lever position sensor 146 detects a position of lever 146a and issues a detection signal to controller 78. Traveling mode setting dial 145a is shiftable among a normal traveling mode position 150, an automatic reverse mode position 151, a low speed manual reverse mode position 152 and a high speed manual reverse mode position 153. A dial position detection sensor 145 detects a set position of dial 145a and issues a detection signal to controller 78.

Further, vehicle 1 is provided with an accelerator pedal 149 for setting a rotary speed of engine 5. Accelerator position sensor 159 for detecting a depression of accelerator pedal 149, a vehicle traveling speed sensor 160 for detecting an actual traveling speed of vehicle 1, an engine throttle sensor 171 for detecting an opening degree of a throttle 170 of engine 5, an engine speed sensor 167 for detecting an output rotary speed of engine 5, a load sensor 168 for detecting a load torque applied from the output side (wheels 12) of dual clutch transmission 2 and sub transmission 3 onto engine 5, and above-mentioned pressure sensors 172 and 173 are electrically connected to controller 78 so as to serve as sensors for automatic gearshift control of dual clutch transmission 2.

A sub speed control lever 148a is an operation device (manipulator) for controlling sub transmission 3, i.e., for controlling control means (e.g., valves) 174 and 177 so as to control clutch sliders 176 and 179. Sub speed control lever 148a is shiftable among a sub low speed position 189 for meshing clutch slider 117a with clutch-toothed portion 54a, a sub middle speed position 190 for meshing clutch slider 117a with clutch-toothed portion 55a, and a sub high speed position 191 for meshing clutch slider 118a with clutch-toothed portion 56a. A lever position sensor 148 detects a set position of lever 148a, and issues a detection signal to controller 78.

The mode or state variation of dual clutch transmission 2 based on the operation of levers 77, 146a and dial 145a will be described. While dial 145a is set at normal traveling mode position 150, and unless lever 77 is set at automatic gearshift mode position 155, i.e., while lever 77 is shifted among first to eighth forward traveling speed positions 154a, 154b, 154c, 154d, 154e, 154f, 154g and 154h, neutral position 156 and low and high backward traveling speed positions 157a and 157b, dual clutch transmission 2 is set in a manual gearshift mode. In the manual gearshift mode, controller 78 controls valves 73, 74, 91, 92, 93, 94, 99 and 100 so as to select any one forward or backward speed gear train to be activated in correspondence to the set position of lever 77. When lever 77 is set to neutral position 156, both clutches C1 and C2 are disengaged, and no speed gear train of dual clutch transmission 2 is selected to be activated. Once lever 77 is moved from any set position, both clutches C1 and C2 are completely disengaged before a target forward or backward traveling speed gear train is selected to be activated, because the target speed gear train may be activated by engaging the same clutch C1 or C2 as that engaged for the last set speed gear train. In other words, the above-mentioned clutch-off control of clutches C1 and C2 is performed for each gearshift in the manual gearshift mode.

Further, in the manual gearshift mode, either the forward or backward traveling direction is selected depending on whether lever 77 is set at any one of forward traveling speed positions 154a, 154b, 154c, 154d, 154e, 154f, 154g and 154h or any one of backward traveling speed positions 157a and 157b. Therefore, while the manual gearshift mode is set, controller 78 ignores the detection signals from sensor 146, and commands valves 73 and 74 of clutches C1 and C2 and the valves of hydraulic speed gear control system 80 univocally according to any one set position of lever 77 excluding automatic gearshift mode position 155.

While dial 145a is set at normal traveling mode position 150, dual clutch transmission 2 is set in the automatic gearshift mode by setting lever 77 at automatic gearshift mode position 155. While dual clutch transmission 2 is set in the automatic gearshift mode, various states of dual clutch transmission 2 can be realized based on the setting of reverser lever 146a and the detection by sensors 159, 160, 171, 167, 168, 172 and 173. The automatic gearshift mode is adapted for only forward traveling of vehicle 1 (i.e., it is adapted only when reverser lever 146a is set at forward traveling position 164 or regardless of whether reverser lever 146a is set at forward traveling position 164 or backward traveling position 165). Alternatively, the automatic gearshift mode may be also adapted for backward traveling so that, when reverser lever 146a is set at backward traveling position 165, a backward traveling speed can be automatically shifted based on an accelerator position, a vehicle traveling speed and so on as later discussed.

While the automatic gearshift mode is set, as mentioned above, the cross wave control of clutches C1 and C2 is performed for each forward traveling speed shift. Shift operation of clutch sliders 81a, 82a, 83a, 84a, 89a along with the cross wave control of clutches C1 and C2 for speed shift among forward traveling speeds in the automatic gearshift mode will be described with reference to FIG. 4. During the gearshift among first to fourth forward traveling speeds F1, F2, F3 and F4, clutch sliders 83a and 84a are held at low speed portion L. During the gearshift among fifth to eighth forward traveling speeds F5, F6, F7 and F8, clutch sliders 83a and 84a are held at high speed portion H. Valve 99 must be switched only when the speed of dual clutch transmission 2 is shifted between fourth and fifth forward traveling speeds F4 and F5.

While each of odd-numbered forward traveling speeds F1, F3, F5 and F7 is realized, as shown in FIG. 4, clutch slider 81a is set at either first or third speed position f1 or f3. For this while, referring to hyphens in FIG. 4, clutch sliders 82a and 89a are essentially set at respective neutral positions N, however, since second clutch C2 is disengaged, clutch slider 82a can be shifted to either second or fourth speed position f2 or f4 to be ready for shift up or down of forward traveling speed from the currently realized odd-numbered forward traveling speed, and clutch slider 89a can be shifted to backward traveling position r to be ready for forward-to-backward traveling speed shift.

While each of even-numbered forward traveling speeds F2, F4, F6 and F8 is realized, as shown in FIG. 4, clutch slider 82a is set at either second or fourth speed position f1 or f3, and clutch slider 89a is set at neutral position N. For this while, referring to hyphens in FIG. 4, clutch slider 81a is essentially set at neutral position N, however, since first clutch C1 is disengaged, clutch slider 81a can be shifted to either first or third speed position f1 or f3 to be ready for shift up or down of forward traveling speed from the currently realized even-numbered forward traveling speed.

While vehicle 1 travels forward in the automatic gearshift mode, the cross wave control of clutches C1 and C2 as shown in FIG. 5 is performed every shift from odd-numbered speed to even-numbered speed. In this regard, for example, during the shift up from first speed F1 to second speed F2 or the shift down from second speed F2 to first speed F1, the cross wave control of clutches C1 and C2 is performed under the situation that clutch sliders 81a, 82a, 83a, 84a and 89a are positioned to select both the first and second forward traveling speed gear trains to be activated. In other words, referring to FIG. 5, with regard to the speed shift from first speed F1 to second speed F2, clutch slider 82a is set to second speed position f2 at a timing A while keeping clutch slider 81a at first speed position f1 before the start of disengagement of engaged clutch C1 and engagement of disengaged clutch C2 at timing B. After the completion of engagement of clutch C2 and disengagement of clutch C1 at timing C, clutch slider 81a is set to neutral position N at a timing D so as to complete this speed shift. With regard to the speed shift from second speed F2 to first speed F1, vice versa. That is, the half-clutch state of clutches C1 and C2 is realized while both the first and second forward traveling speed gear trains are selected to be activated, thereby preventing shockingly sudden or intermittent speed change.

As mentioned above, FIG. 5 also suggests the process of forward traveling speed shift from an even-numbered speed to an odd-numbered speed. That is, a speed change process similar to the above-mentioned shift from first speed F1 to second speed F2 is performed every forward traveling speed shift between neighboring odd and even numbered speeds in the automatic gearshift mode. Incidentally, with regard to the speed shift between fourth speed F4 and fifth speed F5, the shift of clutch sliders 83a and 84a between low and high speed positions L and H is added to the shift of one of clutch sliders 81a and 82a to first or fourth speed position f1 or f4 while keeping the other clutch slider 82a or 81a at fourth or first speed position f4 or f1 before the start of disengagement of engaged clutch C2 or C1 and engagement of disengaged clutch C1 or C2.

Figure 6:
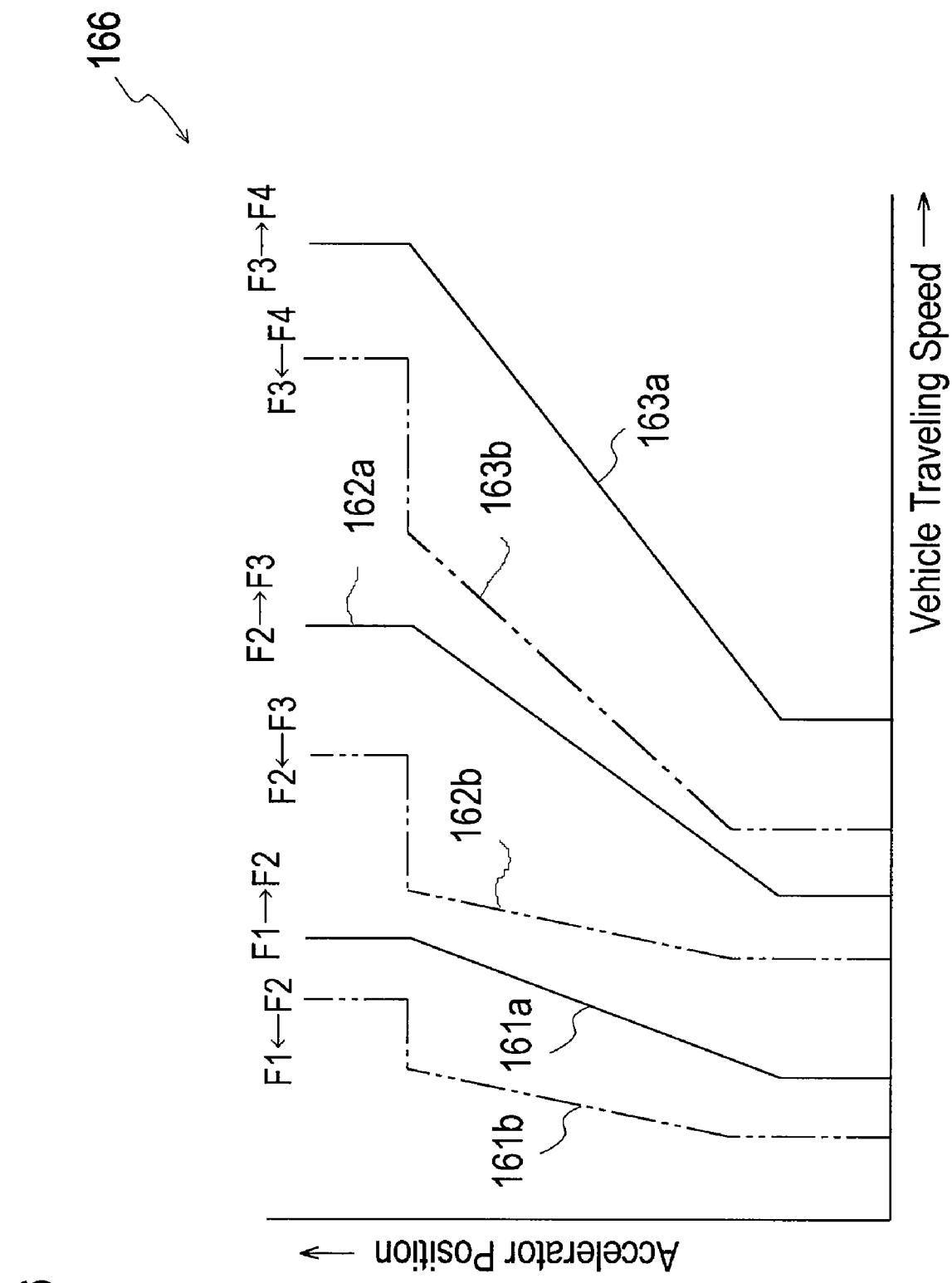
FIG. 6 is a correlation diagram of a gearshift map 166 for automatic gearshift programmed in controller 78.

Referring to FIGS. 3 and 6, for example, an automatic gearshift map 166 is programmed in a memory 78a of controller 78 so as to be used for the forward traveling speed shift in the automatic gearshift mode. Map 166 as a correlation of an accelerator position (or a throttle opening degree) to an actual vehicle traveling speed includes graphs 161a, 161b, 162a, 162b, 163a and 163b designating as gearshift start timing A shown in FIG. 5 for selecting a target forward traveling speed gear train of dual clutch transmission 2. Once controller 78 commands the valves of hydraulic speed gear control system 80 at timing A, the gearshift process along with the cross wave control of clutches C1 and C2 is performed until timing D as mentioned above referring to FIG. 5.

Automatic gearshift map 166 is either a low speed gearshift map for speed shift up and down among first to fourth forward traveling speeds F1, F2, F3 and F4 on the assumption that clutch sliders 83a and 84a are held at low speed position L, or a high speed gearshift map for speed shift up and down among fifth to eighth forward traveling speeds F5, F6, F7 and F8 on the assumption that clutch sliders 83a and 84a are held at high speed position H. Description will now be given on the assumption that map 166 is the low speed gearshift map. That is, 1-2 speed shift up graph 161a is provided for shift up from first speed F1 to second speed F2, 2-3 speed shift up graph 162a for shift up from second speed F2 to third speed F3, and 3-4 speed shift up graph 163a for shift up from third speed F3 to fourth speed F4. Further, 4-3 speed shift down graph 163b is provided for shift down from fourth speed F4 to third speed F3, 3-2 speed shift down graph 162b for shift down from third speed F3 to second speed F2, and 2-1 speed shift down graph 161a for shift down from second speed F2 to first speed F1.

Controller 78 recognizes the set accelerator position detected by accelerator sensor 159 (or the set throttle opening degree detected by engine throttle sensor 171) and the actual vehicle traveling speed detected by vehicle traveling speed sensor 160, computes a correlation point based on the detection values, and compares the point with graphs 161a, 161b, 162a, 162b, 163a and 163b in map 166, thereby detecting whether the current forward traveling speed should be kept or shifted up or down. For example, during forward traveling of vehicle 1 at first speed F1, if accelerator pedal 149 is further depressed to increase the vehicle traveling speed and the computed correlation point is recognized to be disposed between graphs 161a and 161b, controller 78 commands to move clutch slider 82a to second speed position f2 at timing A, then commands valves 73 and 74 to perform the cross wave control of clutches C1 and C2, and finally commands to move clutch slider 81a to neutral position N, thereby completing the forward traveling speed shift up from first speed F1 to second speed F2.

Incidentally, for example, the vehicle traveling speed designating 1-2 speed shift up graph 161a is higher than that designating 2-1 speed shift down graph 161b, thereby preventing dual clutch transmission 2 from being excessively frequently gearshifted between first and second speeds F1 and F2. The same thing is adapted to other gearshift between any neighboring numbered speeds of dual clutch transmission 2.

The reverse mode is set by setting dial 145a at any one of positions 151, 152 and 153. The reverse mode includes an automatic reverse mode set by setting dial 145a at automatic reverse mode position 151, and a manual reverse mode set by setting dial 145a at either low speed reverse mode position 152 or high speed reverse mode position 153. Shift operation of clutch sliders 81a, 82a, 83a, 84a, 89a along with the control of clutches C1 and C2 in the automatic reverse mode will be described with reference to FIGS. 2 to 5 and 7 to 9.

While dial 145a is set at position 151, main speed control lever 77 is set at any one of forward traveling speed positions 154a, 154b, 154c, 154d, 154e, 154f, 154g and 154h so as to determine one of first to eighth forward traveling speeds F1, F2, F3, F4, F5, F6, F7 and F8 as a rated forward traveling speed Fs. While reverser lever 146a is set at forward traveling position 164, vehicle 1 travels forward at the speed of dual clutch transmission 2 determined as rated forward traveling speed Fs. However, as discussed later, during forward traveling of vehicle 1, rated forward traveling speed Fs is sometimes shifted down to a lower forward traveling speed so as to be ready for the forward-to-backward traveling direction shift, or to prevent engine 5 from being overloaded. This speed shift down from rated forward traveling speed Fs in the automatic reverse mode is performed similar to the above-mentioned automatic forward traveling speed shift due to the cross wave control of clutches C1 and C2. In this regard, controller 78 controls valves 73 and 74 and the valves of hydraulic speed gear control system 80 so as to automatically control the speed of dual clutch transmission 2 among forward traveling speeds between first forward traveling speed F1 and rated forward traveling speed Fs. When lever 77 is set at first forward traveling speed position 154a, it results in that vehicle 1 travels forward constantly at first speed F1.

An average deceleration ratio of the first to eighth forward traveling speed gear trains is referred to as a standard deceleration ratio. The first to fourth forward traveling speed gear trains belong to a low forward traveling speed group LF (see FIG. 7) and have respective deceleration ratios larger than the standard deceleration ratio. The fifth to eighth forward traveling speed gear trains belong to a high forward traveling speed group HF (see FIG. 7) and have respective deceleration ratios smaller than the standard deceleration ratio. This classification of the forward traveling speed gear trains depending on whether the deceleration ratio is larger or smaller than the standard deceleration ratio is equivalent to the classification of forward traveling speeds depending on whether clutch sliders 83a and 84a are set at low speed positions L or high speed positions H.

Controller 78 selects either low backward traveling speed R1 or high backward traveling speed R2 in correspondence to which forward speed is rated forward traveling speed Fs as shown in FIG. 7. In FIG. 7, the later-discussed load control shift down is not considered. Basically, either low backward traveling speed R1 or high backward traveling speed R2 is selected depending on whether rated forward traveling speed Fs belongs to low forward traveling speed group LF or high forward traveling speed group HF, thereby preventing clutch sliders 83a and 84a from being shifted during the forward/backward traveling speed shift.

With regard to the application of cross wave control ("CWC") of clutches C1 and C2 shown in FIG. 7, each odd-numbered forward traveling speed determined as rated forward traveling speed Fs is referred to as "YES", which means the cross wave control of clutches C1 and C2 can be applied for the forward-to-backward traveling speed shift from this forward traveling speed to selected backward traveling speed R1 or R2, and for the backward-to-forward traveling speed shift from backward traveling speed R1 or R2 to this forward traveling speed as rated forward traveling speed Fs. Thus, if rated forward traveling speed Fs is an odd-numbered speed belonging to low forward traveling speed group LF, i.e., either first or third forward traveling speed F1 or F3, the forward/backward traveling direction shift is performed along with the cross wave control of clutches C1 and C2 between rated forward traveling speed Fs and low backward traveling speed R1. If rated forward traveling speed Fs is an odd-numbered speed belonging to high forward traveling speed group HF, i.e., either fifth or seventh forward traveling speed F5 or F7, the forward/backward traveling direction shift is performed along with the cross wave control of clutches C1 and C2 between rated forward traveling speed Fs and high backward traveling speed R2.

On the other hand, with regard to the application of cross wave control ("CWC") of clutches C1 and C2 shown in FIG. 7, each even-numbered forward traveling speed determined as rated forward traveling speed Fs is referred to as "NO", which means impossibility of the application of cross wave control of clutches C1 and C2 to the shift from this forward traveling speed to backward traveling speed R1 or R2 selected depending on whether rated forward traveling speed Fs belongs to low or high forward traveling speed group LF or HF. Thus, when rated forward traveling speed Fs is an even-numbered speed, rated forward traveling speed Fs is shifted down by one speed to a lower odd-numbered speed to be ready for the forward-to-backward traveling direction shift. For example, this shift down is performed the very moment reverser lever 146a is shifted to backward traveling position 165.

In this way, the odd-numbered forward traveling speed lower than rated forward traveling speed Fs by one speed becomes the last realized forward traveling speed before the forward-to-backward traveling speed shift along with the cross wave control of clutches C1 and C2. Further, this odd-numbered forward traveling speed becomes a target forward traveling speed of the backward-to-forward traveling speed shift along with the cross wave control of clutches C1 and C2. After this odd-numbered forward traveling speed is realized by the backward-to-forward traveling direction shift, this speed is shifted up to an even-numbered speed as rated forward traveling speed Fs by one speed. Consequently, if rated forward traveling speed Fs is an even-numbered speed belonging to low forward traveling speed group LF, i.e., either second or fourth forward traveling speed F2 or F4, the forward/backward traveling direction shift is performed along with the cross wave control of clutches C1 and C2 between odd-numbered forward traveling speed F1 or F3 lower than rated forward traveling speed Fs by one speed and low backward traveling speed R1. If rated forward traveling speed Fs is an even-numbered speed belonging to high forward traveling speed group HF, i.e., either sixth or eighth forward traveling speed F6 or F8, the forward/backward traveling direction shift is performed along with the cross wave control of clutches C1 and C2 between odd-numbered forward traveling speed F5 or F7 lower than rated forward traveling speed Fs by one speed and high backward traveling speed R2.

Further, referring to FIG. 3, in the automatic reverse mode, controller 78 controls an actuator 169 for throttle 170 of engine 5 based on the detection signals from engine rotary speed sensor 167, engine throttle sensor 171 and accelerator sensor 159, so as to control the rotary speed of engine 5, thereby preventing backward traveling vehicle 1 from being unexpectedly suddenly accelerated. This control of engine 5 is an engine cooperation control which is referred to as "ECC" in FIG. 7.

Figure 8:
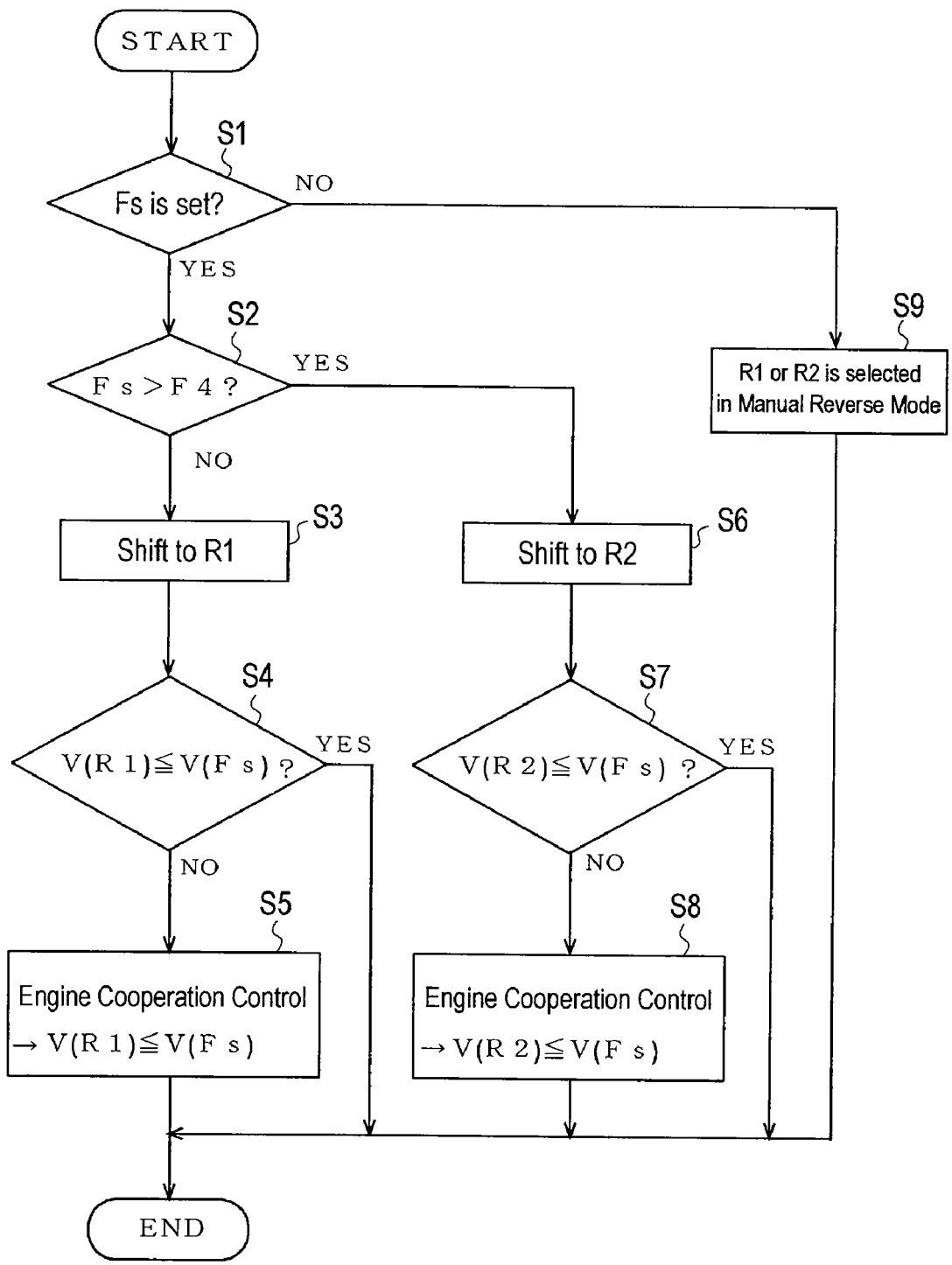
FIG. 8 is a flow chart of forward-to-backward traveling direction shift in the automatic reverse mode along with the engine cooperation control.

The engine cooperation control will be described with reference to a flow chart of FIG. 8. It is assumed that switch 145a is set at one of positions 151, 152 and 153 (i.e., in this description, normal traveling mode position 150 is out of account). At a first step S1, controller 78 monitors a signal from switch 145 so as to decide whether rated forward traveling speed Fs is determined or not. Unless rated forward traveling speed Fs is determined (step S1, NO), a later-discussed manual reverse mode is realized to manually decide either low backward traveling speed R1 or high backward traveling speed R2 (at a step S9). When rated forward traveling speed Fs is determined (step S1, YES), the automatic reverse mode is realized, and controller 78 monitors a signal from sensor 147 so as to decide whether rated forward traveling speed Fs belongs to low forward traveling speed group LF or high forward traveling speed group HF (at a step S2).

When rated forward traveling speed Fs is not higher than four forward traveling speed F4, belongs to low forward traveling speed group LF (step S2, NO), i.e., belongs to low forward traveling speed group LF (step S2, NO), the forward-to-backward traveling speed shift to low backward traveling speed R1 is performed according to shift of reverser lever 146a to backward traveling position 165 (at a step S3). Then, a vehicle traveling speed corresponding to a maximum accelerator position (i.e., a deepest depression of accelerator pedal 149), when setting low backward traveling speed R1, is referred to as a maximum accelerated vehicle traveling speed V(R1). A vehicle traveling speed corresponding to the maximum accelerator position, when setting each of forward and backward traveling speeds F1 to F8 and R2 and rated forward traveling speed Fs, is similarly referred to as a maximum accelerated vehicle traveling speed V(F1), V(F2), ..., V(F8), V(R2) or V(Fs). Each maximum accelerated vehicle traveling speed may be memorized in memory 78a or may be calculated based on the signal from vehicle traveling speed sensor 160. Maximum accelerated vehicle traveling speed V(R1) is compared with maximum accelerated vehicle traveling speed V(Fs) at a step S4.

When V(R1) is more than V(Fs) (step S4, NO), controller 78 performs the engine cooperation control designated as a step S5. That is, the rate of increase of engine throttle opening degree (detected by engine throttle sensor 171) relative to accelerator position (detected by accelerator sensor 159) is reduced, or another manner is performed, so as to reduce the rate of increase of engine rotary speed (detected by engine rotary speed sensor 167) relative to accelerator position, thereby resulting in that V(R1) does not exceed V(Fs). Unless V(R1) is more than V(Fs) (step S4, YES), the engine cooperation control is not performed.

On the other hand, when rated forward traveling speed Fs is higher than fourth forward traveling speed F4 (step S2, YES), i.e., belongs to high forward traveling speed group HF, the forward-to-backward traveling speed direction shift to high backward traveling speed R2 is performed according to the shift of reverser lever 146a to backward traveling position 165 (at a step S6), and then (at a step S7), maximum accelerated vehicle traveling speed V(R2) is compared with maximum accelerated vehicle traveling speed V(Fs). When V(R2) is more than V(Fs) (step S7, NO), controller 78 performs the engine cooperation control designated as a step S8, so as to reduce the rate of increase of engine rotary speed relative to accelerator position, thereby resulting in that V(R2) does not exceed V(Fs). Unless V(R2) is more than V(Fs) (step S7, YES), the engine cooperation control is not performed.

Incidentally, the above-mentioned shift down from rated forward traveling speed Fs and the later-discussed load controlling shift down are omitted in FIG. 8, however, they may be performed between step S2 and step S3 or S6.

Referring to an example of comparison of maximum accelerated vehicle speeds in FIG. 7, it is assumed that maximum accelerated vehicle traveling speed V(R2) is more than maximum accelerated vehicle traveling speed V(F5) and is less than maximum accelerated vehicle traveling speed V(F6). When fifth forward traveling speed F5 belonging to high forward traveling speed group HF is selected as rated forward traveling speed Fs, high backward traveling speed R2 is selected for backward traveling of vehicle 1, however, maximum accelerated vehicle traveling speed V(R2) exceeds maximum accelerated vehicle traveling speed V(Fs) so that backward traveling vehicle 1 may be unexpectedly suddenly accelerated. Therefore, when reverser lever 146a is shifted to backward traveling position 165, the engine cooperation control is performed so as to reduce the acceleration rate of engine 5 to increase of depression of accelerator pedal 149. Due to the engine cooperation control, the actual acceleration of backward traveling vehicle 1 is moderated so as to obtain a vehicle traveling speed equal to or less than the level of the vehicle traveling speed obtained by setting fifth forward traveling speed F5 before the shift of lever 146a to position 165.

Referring to another example of comparison of maximum accelerated vehicle traveling speeds in FIG. 7, it is assumed that maximum accelerated vehicle traveling speed V(R1) is more than maximum accelerated vehicle traveling speed V(F1) and is less than maximum accelerated vehicle traveling speed V(F2). When fourth forward traveling speed F4 belonging to low forward traveling speed group LF is determined as rated forward traveling speed Fs, low backward traveling speed R1 is selected for backward traveling of vehicle 1, and maximum accelerated vehicle traveling speed V(R1) is less than maximum accelerated vehicle traveling speed V(Fs). Therefore, when reverser lever 146a is shifted to backward traveling position 165, backward traveling vehicle 1 is accelerated without the engine cooperation control.

The load controlling shift down of forward traveling speed in the automatic reverse mode will now be described. When an overload on engine 5 is detected during forward traveling of vehicle 1 at rated forward traveling speed Fs, rated forward traveling speed Fs is shifted down to a lower forward traveling speed one speed by one speed until the overload is eliminated. Further, if the lower forward traveling speed as the result of this shift down is an even-numbered speed, this forward traveling speed is further shifted down to an odd-numbered speed by one speed so as to be ready for the forward-to-backward traveling direction shift along with the cross wave control of clutches C1 and C2. This shift down of forward traveling speed for eliminating the overload and for the forward-to-backward traveling direction shift is referred to as the load controlling shift down.

The load controlling shift down will be described with reference to a flow chart of FIG. 9. First, dial 145a is set at automatic reverse mode position 151, and lever 77 is set at one of positions 154a, 154b, 154c, 154d, 154e, 154f, 154g and 154h so as to determine rated forward traveling speed Fs, and a currently realized forward traveling speed F is set to be rated forward traveling speed Fs (at a step S10), i.e., vehicle 1 travels forward at rated forward traveling speed Fs. Here, a threshold load on engine 5 during forward traveling of vehicle 1 (hereinafter referred to as a threshold load Ls) is memorized in memory 78a of controller 78. Controller 78 monitors an actual load on engine 5 during forward traveling of vehicle 1 (hereinafter referred to as a traveling load Lo), and compares traveling load Lo with threshold load Ls at a step S11. In this regard, traveling load Lo is detected by engine load sensor 168 as shown in FIG. 3. Alternatively, traveling load Lo may be calculated based on the detection values from accelerator sensor 159, engine throttle sensor 171 and vehicle traveling speed sensor 160, or the like.

When traveling load Lo is less than threshold load Ls (step S11, NO), i.e., unless engine 5 is overloaded, currently realized forward traveling speed F is kept as it is, i.e., it is kept to be rated forward traveling speed Fs (at a step S12). When traveling load Lo is not less than threshold load Ls (step S11, YES), i.e., when engine 5 is overloaded, forward traveling speed F is shifted down from rated forward traveling speed Fs by one speed (at a step S13). Then, if traveling load Lo is still equal to or more than threshold load Ls (at step S12, NO), forward traveling speed F is further shifted down by one speed (at step S13). That is, forward traveling speed F is shifted down one speed by one speed until traveling load Lo becomes less than threshold load Ls, i.e., until the overload is eliminated. While lever 146a is set at forward traveling position 164 (a step S14, NO), controller 78 keeps monitoring traveling load Lo and repeats the judgment whether the load controlling shift down is needed or not.

After it is ascertained that engine 5 is free from overload, i.e., traveling load Lo is less than threshold load Ls, when lever 146a is shifted to backward traveling position 165 (step S14, YES), controller 78 decides whether currently realized forward traveling speed F, which is either rated forward traveling speed Fs or a speed as the result of load controlling shift down, is one of odd-numbered forward traveling speeds F1, F3, F5 and F7 or not (at a step S15). If currently realized forward traveling speed F is one of the odd-numbered forward traveling speeds (step S15, YES), forward traveling speed F is not further changed before the control of hydraulic speed gear control system 80 and the cross wave control of clutches C1 and C2 are started for speed shift to a corresponding backward traveling speed R which is either low or high backward traveling speed R1 or R2 (referred to as "F-to-R shift") (at a step S17). Here, either low or high backward traveling speed R1 or R2 is selected as backward traveling speed R corresponding to forward traveling speed F depending on whether currently realized odd-numbered forward traveling speed F belongs to low or high forward traveling speed group LF or HF (at a step S18), referring to FIG. 7.

When lever 146a is shifted to backward traveling position 165 (step S14, YES), if currently realized forward traveling speed F is one of even-numbered forward traveling speeds F2, F4, F6 and F8 (step S15, NO), forward traveling speed F is further shifted down to a lower odd-numbered forward traveling speed by one speed, i.e., to the maximum odd-numbered forward traveling speed lower than even-numbered forward traveling speed F (at a step S16) before the control of hydraulic speed gear control system 80 and the cross wave control of clutches C1 and C2 are started for speed shift to corresponding backward traveling speed R (referred to as "F-to-R shift") (at step S17). Here, either low or high backward traveling speed R1 or R2 is selected as backward traveling speed R corresponding to forward traveling speed F depending on whether the odd-numbered forward traveling speed as the result of the further shift down from the last realized even-numbered forward traveling speed belongs to low or high forward traveling speed group LF or HF (at step S18), referring to FIG. 7.

In this way, while both the low and high backward traveling speed gear trains are adapted to be activated by engaging second clutch C2, any one odd-numbered forward traveling speed gear train adapted to be activated by engaging first clutch C1 must be selected immediately before the gearshift to low or high backward traveling speed R1 or R2, thereby constantly realizing the cross wave control of clutches C1 and C2 during forward-to-backward traveling direction shift, ensuring non-intermittent torque for preventing engine 5 from being overloaded.

Figure 9:
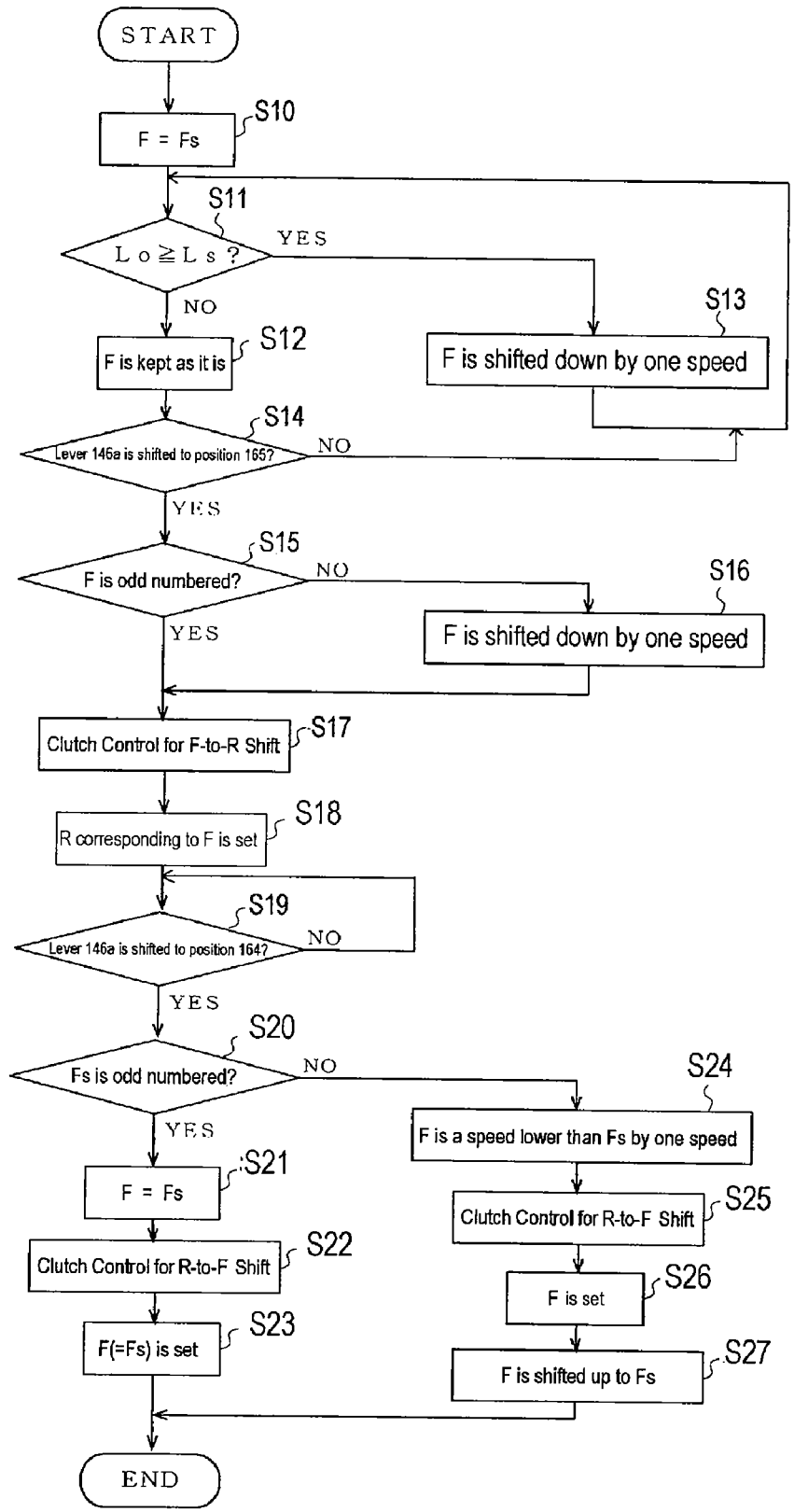
FIG. 9 is a flow chart of forward/backward traveling direction shift in the automatic reverse mode along with a load controlling shift down.

Referring to FIG. 9, when reverser lever 146a is shifted to forward traveling position 164 (a step S19, YES), it is judged whether rated forward traveling speed Fs is an odd-numbered speed or not (at a step S20). However, actually, during backward traveling of vehicle 1, a forward traveling speed gear train for realizing a forward traveling speed F is selected to be activated so as to be ready for a later speed shift from currently realized backward traveling speed R to forward traveling speed F. Here, if rated forward traveling speed Fs is an odd-numbered forward traveling speed, the forward traveling speed gear train corresponding to rated forward traveling speed Fs is selected to be activated so as to realize forward traveling speed F that is odd-numbered rated forward traveling speed Fs (at a step S21). If rated forward traveling speed Fs is an even-numbered speed, the forward traveling speed gear train corresponding to forward traveling speed F that is an odd-numbered forward traveling speed lower than even-numbered rated forward traveling speed Fs, i.e., the maximum odd-numbered forward traveling speed lower than even-numbered rated forward traveling speed Fs, is selected to be activated (at a step S24).

Thus, when reverser lever 146a is shifted to forward traveling position 164 (at step S19), the cross wave control of clutches C1 and C2 is performed for the backward-to-forward traveling speed shift (referred to as "R-to-F shift") (at a step S22 or S25). The odd-numbered forward traveling speed gear train for setting odd-numbered forward traveling speed F that is odd-numbered rated forward traveling speed Fs or to the maximum odd-numbered forward traveling speed lower than even-numbered rated forward traveling speed Fs, is activated, i.e., odd-numbered forward traveling speed F is realized (at a step S23 or S26), as soon as first clutch C1 is engaged, because the forward traveling speed gear train is previously selected to be activated. Afterward, if rated forward traveling speed Fs is an even-numbered speed and realized odd-numbered forward traveling speed F is lower than even-numbered rated forward traveling speed Fs by one speed, forward traveling speed F is shifted up to rated forward traveling speed Fs by one speed (at a step S27) unless engine 5 is overloaded. Afterward, during forward traveling of vehicle 1, realized forward traveling speed F is kept as rated forward traveling speed Fs unless engine 5 is overloaded (while traveling load Lo is less than threshold load Ls). When engine 5 is overloaded, the above-mentioned load controlling shift down is performed.

For example, it is assumed that seventh forward traveling speed F7 is selected as rated forward traveling speed Fs. When traveling load Lo exceeding threshold load Ls is detected during forward traveling of vehicle at rated forward traveling speed Fs, the forward traveling speed is shifted down one speed by one speed from seventh speed F7 so as to reduce traveling load Lo, until reduced traveling load Lo becomes less than threshold load Ls. For example, if reduced traveling load Lo becomes less than threshold load Ls at the first time by shift down to fourth forward traveling speed F4, afterward, vehicle 1 travels forward keeping fourth forward traveling speed F4. However, reverser lever 146a is shifted to backward traveling position 165, fourth forward traveling speed F4 is shifted down to third forward traveling speed F3 before start of the selection of the low backward traveling speed gear train and start of the cross wave control of clutches C1 and C2 for realizing low backward traveling speed R1.

Incidentally, dual clutch transmission 2 set at first forward traveling speed F1 serving as the lowest forward traveling speed provides its highest torque so as to mostly solve the overload on engine 5. Thus, the cross wave control of clutches C1 and C2 for F-to-R shift is desired to be surely performed when vehicle 1 travels forward at first forward traveling speed F1. This is the reason why the low and high backward traveling speed gear trains are adapted to be activated by engaging second clutch C2 while the first forward traveling speed gear train is adapted to be activated by engaging first clutch C1.

The manual reverse mode will be described with reference to a flow chart of FIG. 10. At a first step S31, dial 145a is set at either position 152 or 153 so as to manually select an optional backward traveling speed R that is either low or high backward traveling speed R1 or R2, and lever 77 is set at one of forward traveling speed positions 154a, 154b, 154c, 154d, 154e, 154f, 154g and 154h so as to manually select an optional forward traveling speed F that is one of forward traveling speeds F1, F2, F3, F4, F5, F6, F7 and F8. Then, gearshift between selected forward traveling speed F and selected backward traveling speed R is performed according to shift of lever 146a between positions 164 and 165. The forward/backward traveling direction shift is realized by the cross wave control of clutches C1 and C2 if selected forward traveling F is odd-numbered, and it is realized by the clutch-off control of clutches C1 and C2 if selected forward traveling speed F is even-numbered. Alternatively, the forward/backward traveling direction shift may be realized by the clutch-off control of clutches C1 and C2 regardless of whether selected forward traveling speed F is odd-numbered or even-numbered.

Figure 10:
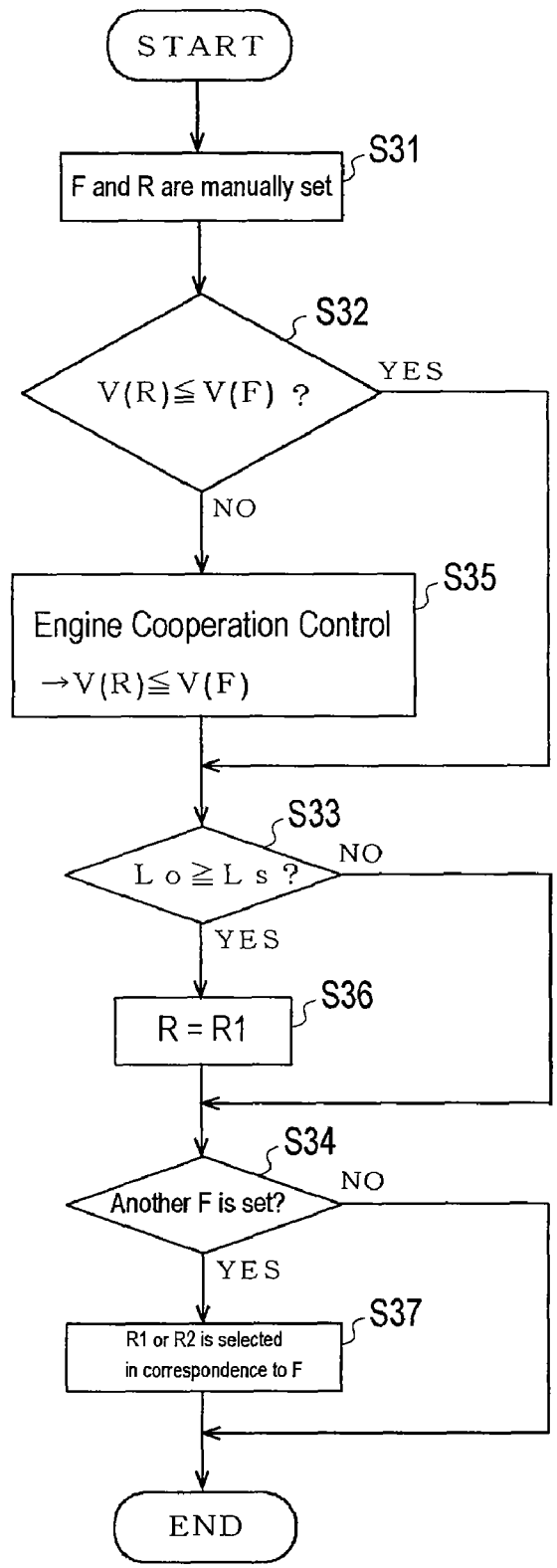
FIG. 10 is a flow chart of forward/backward traveling direction shift in a manual reverse mode along with the engine cooperation control and the load controlling shift down.

Further, referring to FIG. 10, the engine cooperation control is employed for F-to-R shift in the manual reverse mode, and the load controlling shift down is employed during backward traveling of vehicle 1 set in the manual reverse mode. In this regard, as mentioned above, maximum accelerated vehicle traveling speeds V(F1), V(F2), . . . , V(F8), V(R1) and V(R2) are memorized in memory 78a of controller 78. When one of forward traveling speeds F, F2, . . . and F8 is selected as optional forward traveling speed F and either low or high backward traveling speed R1 or R2 is selected as optional backward traveling speed R (at step S31), a maximum accelerated vehicle traveling speed V(F) corresponding to selected forward traveling speed F is compared with a maximum accelerated vehicle traveling speed V(R) corresponding to selected backward traveling speed R (at a step S32). Alternatively, an actual vehicle traveling speed detected by vehicle traveling speed sensor 160 may be compared with memorized vehicle speed V(R).

When V(R) is more than V(F) (step S32, NO), the engine cooperation control is performed when reverser lever 146a is shifted to backward traveling position 165, so that the rate of increase of engine throttle opening degree to accelerator position is reduced so as to reduce the increase of engine rotary speed to accelerator position, so that reduced V(R) becomes not more than V(F) (at a step S35), thereby moderating acceleration of backward traveling vehicle 1. Unless V(R) is more than V(F) (step S32, YES), the engine cooperation control is not performed or is finished. In other words, even while a depression of accelerator pedal 149 is maintained, the actual backward vehicle traveling speed after the shift of lever 146a to position 165 is less than (or equal to) the actual forward vehicle traveling speed before the shift of lever 146a to position 165 (i.e., while setting lever 146a at position 164).

If traveling mode setting dial 145a is set at high speed reverse mode position 153, the load controlling shift down can be performed during backward traveling of vehicle 1. In this regard, while vehicle 1 travels backward at high backward traveling speed R2, traveling load Lo is compared with threshold load Ls (at a step S33). While traveling load Lo is less than threshold load Ls (step S33, NO), selected high backward traveling speed R2 is maintained, i.e., clutch sliders 83a and 84a are held at high speed positions H. If traveling load Lo is not less than threshold load Ls (step S33, YES), clutch sliders 83a and 84a are automatically shifted from high speed positions H to low speed positions L so as to perform the shift down from high backward traveling speed R2 to the low backward traveling speed R1 (at a step S36), thereby preventing engine 5 from being overloaded.

Further, while dial 145a is set at either manual reverse mode position 152 or 153, if lever 77 is shifted to another position of forward traveling positions 154a, 154b, . . . and 154h so as to reselect another forward traveling speed F (a step S34, YES), either low or high backward traveling speed R1 or R2 is reselected in correspondence to reselected forward traveling speed F, i.e., depending on whether reselected forward traveling speed F belongs to low or high forward traveling speed group LF or HF (at a step S37). In this regard, even while dial 145a is set at high speed reverse mode position 153 for selecting high backward traveling speed R2, low backward traveling speed R1 is reselected if lever 77 is shifted to one of low forward traveling speed positions 154a, 154b, 154c and 154d so as to reselect forward traveling speed F of low forward traveling speed group LF. If the shift of lever 77 to another forward traveling speed position is performed while vehicle 1 travels backward, the automatic shift down to low backward traveling speed R1 similar to the above-mentioned load controlling shift down is performed. On the other hand, even while dial 145a is set at low speed reverse mode position 152 for selecting low backward traveling speed R1, high backward traveling speed R2 is reselected if lever 77 is shifted to one of high forward traveling speed positions 154e, 154f, 154g and 154h so as to reselect forward traveling speed F of high forward traveling speed group HF. If the shift of lever 77 to another forward traveling speed position is performed while vehicle 1 travels backward, an automatic shift up to high backward traveling speed R2 is performed by shifting clutch sliders 83a and 84a from low speed position L to high speed position H.

As mentioned above, in the manual reverse mode, even if an operator selects a wrong combination of forward traveling speed F and backward traveling speed R such as to cause an unexpected sudden acceleration of backward vehicle traveling speed or to cause lack of torque during backward traveling of vehicle 1, occurrence of these problems is prevented due to the engine cooperation control, the load controlling shift down, and the automatic reselection of backward traveling speed.

The above-mentioned manual gearshift mode, automatic gearshift mode, automatic reverse mode, manual reverse mode, engine cooperation control, load controlling shift down, and automatic reselection of backward traveling speed are also adapted to control of later-discussed dual clutch transmissions 2A, 2B, 2C, 2D and 2E unless a different control pattern is referred to.

Figure 11:
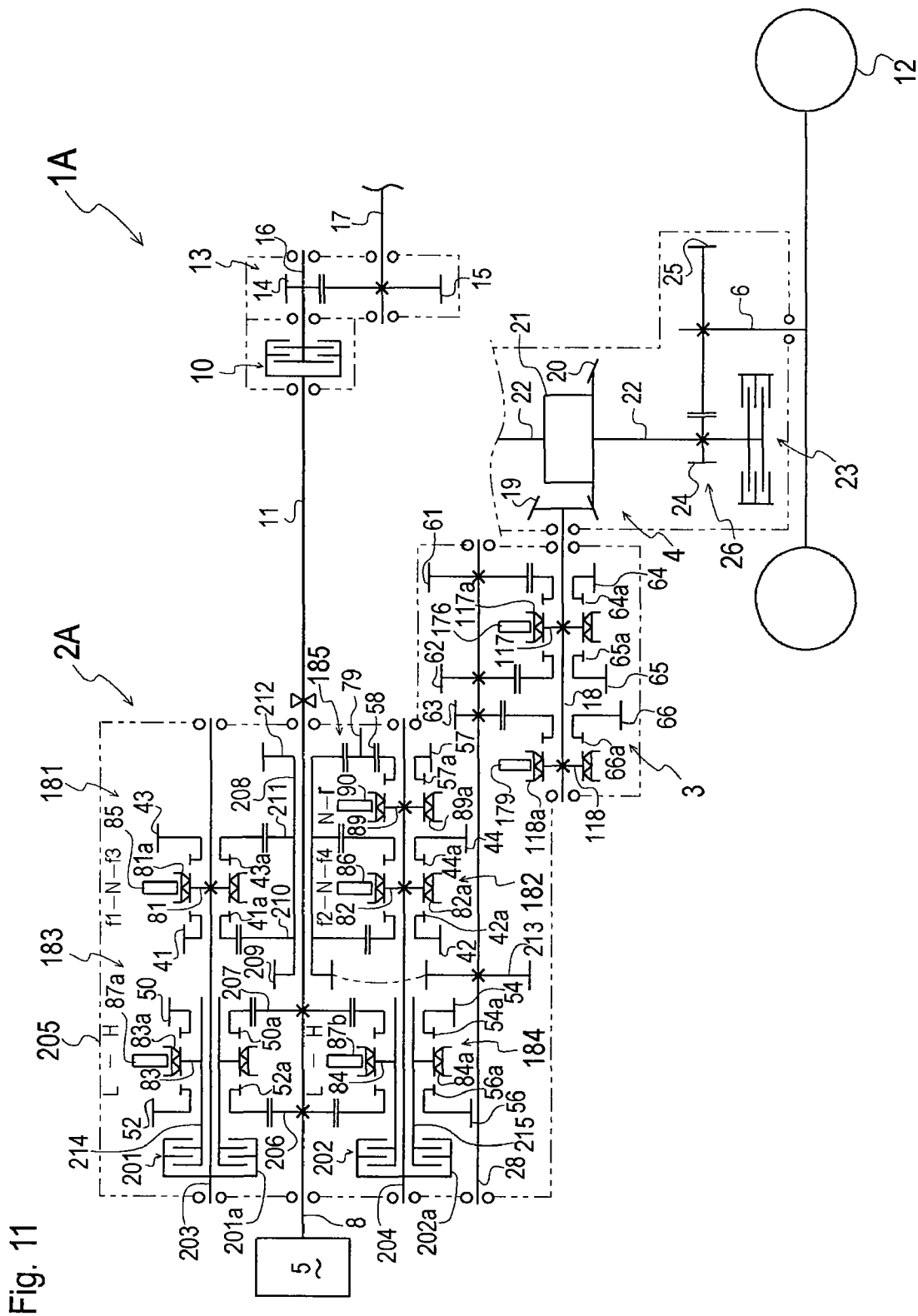
FIG. 11 is a skeleton diagram of a power transmission system of a vehicle 1A equipped with a dual clutch transmission 2A.
Figure 12:
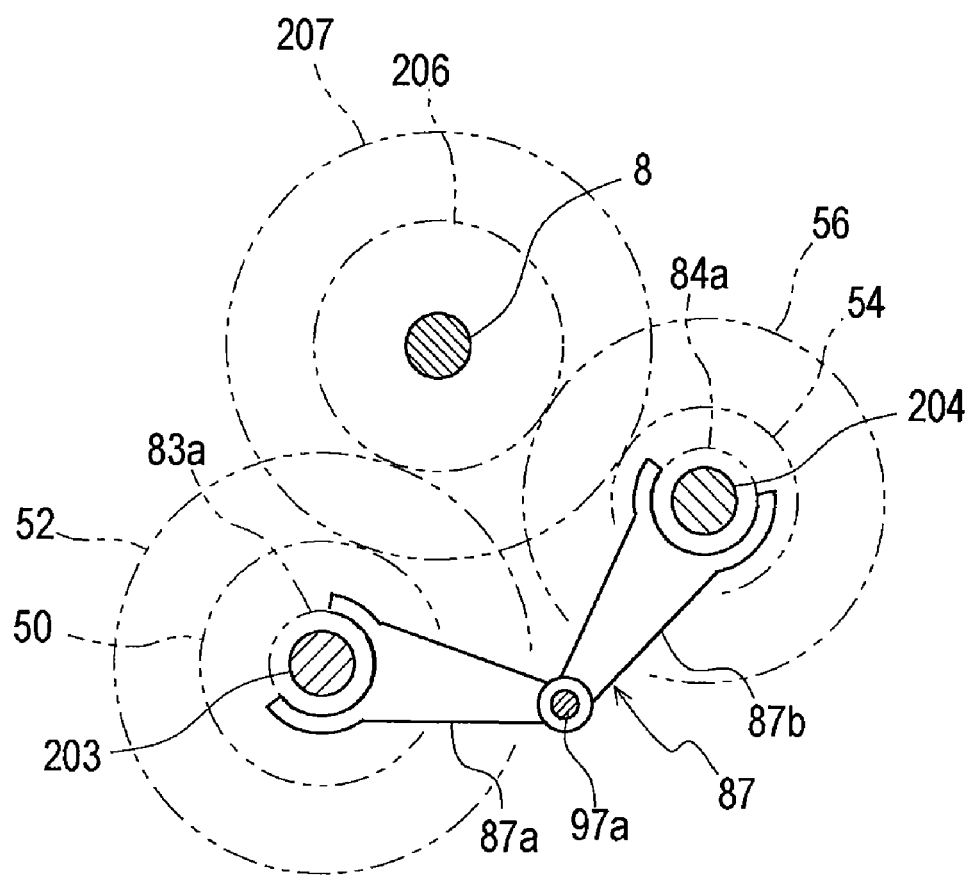
FIG. 12 is a schematic sectional front view of shafts of dual clutch transmission 2A.

An alternative dual clutch transmission 2A provided in a vehicle 1A shown in FIG. 11 will be described with reference to FIGS. 11 and 12. Description of structures with components in vehicle 1A designated by the same reference numerals as those of the above embodiment of vehicle 1 equipped with dual clutch transmission 2 is omitted unless being discussed later because the components are identical to those of vehicle 1 designated by the same reference numerals.

A transmission casing 205 of vehicle 1A incorporates dual clutch transmission 2A, sub transmission 3 driven by dual clutch transmission 2A, and differential gear unit 4 driven by sub transmission 3 so as to drive wheels 12. The distinctive feature of dual clutch transmission 2A is that a pair of clutches 201 and 202 corresponding to respective clutches C1 and C2 are disposed on respective different shafts 203 and 204. In this regard, first clutch output shaft 203, second clutch output shaft 204 and input shaft 8 are fore-and-aft horizontally extended parallel to one another in transmission casing 205 of vehicle 1A, thereby fore-and-aft miniaturizing dual clutch transmission 2A and transmission casing 205. Input shaft 8 is fixedly provided thereon with a low speed drive gear 206 and a high speed drive gear 207, and is relatively rotatably provided thereon with a hollow transmission shaft 208. Gears 209, 210, 211 and 212 are fixed on transmission shaft 208.

A clutch housing 201a is fixed at a front end portion of first clutch output shaft 203, and a hollow first clutch input shaft 214 is extended rearward from clutch housing 201a and is relatively rotatably fitted on shaft 203. Friction elements are provided in clutch housing 201a so as to constitute first clutch 201 interposed between shafts 214 and 203. Similarly, a clutch housing 202a is fixed at a front end portion of second clutch output shaft 204, and a hollow second clutch input shaft 215 is extended rearward from clutch housing 202a and is relatively rotatably fitted on shaft 204. Friction elements are provided in clutch housing 202a so as to constitute second clutch 202 interposed between shafts 215 and 204.

Gears 52 and 50 are relatively rotatably provided on first clutch input shaft 214, gear 52 meshes with gear 206 fixed on input shaft 8 so as to constitute a low speed gear train for odd-numbered forward traveling speeds, and gear 50 meshes with gear 207 fixed on input shaft 8 so as to constitute a high speed gear train for odd-numbered forward traveling speeds and backward traveling speeds. Similarly, gears 56 and 54 are relatively rotatably provided on second clutch input shaft 215, gear 56 meshes with gear 206 so as to constitute a low speed gear train for even-numbered forward traveling speeds, and gear 54 meshes with gear 207 so as to constitute a high speed gear train for even-numbered forward traveling speeds and backward traveling speeds.

Gears 41 and 43 are relatively rotatably provided on first clutch output shaft 203 behind first clutch input shaft 214, gear 41 meshes with gear 210 fixed on transmission shaft 208 so as to constitute a first or fifth forward traveling speed gear train, and gear 43 meshes with gear 211 fixed on transmission shaft 208 so as to constitute a third or seventh forward traveling speed gear train. Similarly, gears 42 and 44 are relatively rotatably provided on second clutch output shaft 204 behind second clutch input shaft 215, gear 42 meshes with gear 210 so as to constitute a second or sixth forward traveling speed gear train, and gear 44 meshes with gear 211 so as to constitute a fourth or eighth forward traveling speed gear train. Gear 57 is relatively rotatably provided on second clutch output shaft 204 behind gears 42 and 44 and meshes with gear 212 fixed on shaft 208 through idle gear 58 on idle gear shaft 79 so as to constitute a backward traveling gear train.

Odd-numbered forward traveling speed shifter unit 181 includes gears 41 and 43, spline hub 81 and clutch slider 81a, and is provided on first clutch output shaft 203. First high/low speed shifter unit 183 includes gears 52 and 50, spline hub 83 and clutch slider 83a, and is provided on first clutch input shaft 214 on shaft 203. Consequently, shifter units 181 and 183 are coaxially aligned on shaft 203. On the other hand, even-numbered forward traveling speed shifter unit 182 includes gears 42 and 44, spline hub 82 and clutch slider 82a. Backward traveling shifter unit 185 includes gear 57, spline hub 89 and clutch slider 89a. Shifter units 182 and 185 are provided on second clutch output shaft 204. Second high/low speed shifter unit 184 includes gears 56 and 54, spline hub 84 and clutch slider 84a, and is provided on second clutch input shaft 215 on shaft 204. Consequently, shifter units 184, 182 and 185 are coaxially aligned on shaft 204 parallel to shifter units 183 and 181 on shaft 203.

Clutch slider 81a is shiftable among first speed position f1 for meshing with gear 41, neutral position N for disengaging from gears 41 and 43 and third speed position f3 for meshing with gear 43. Clutch slider 82a is shiftable among second speed position f2 for meshing with gear 42, neutral position N for disengaging from gears 42 and 44 and fourth speed position f4 for meshing with gear 44. Clutch slider 89a is shiftable between neutral position N for disengaging from gear 57 and backward traveling position r for meshing with gear 57. Clutch sliders 83a and 84a are synchronously shiftable between low speed positions L and high speed positions H. Hydraulic speed gear control system 80 is provided in or on transmission casing 205 so as to control clutch sliders 81a, 82a, 83a, 84a and 89a, similar to those of dual clutch transmission 2. With regard to the synchronicity of clutch sliders 83a and 84a, as shown in FIG. 12, fork member 87 is formed integrally with forks 87a and 87b engaged on respective clutch sliders 83a and 84a, and is provided on piston rod 97a of cylinder 97 so as to be axially movable integrally with piston rod 97a.

In comparison with dual clutch transmission 2, dual clutch transmission 2A is advantageous in reduction of gears in number, because gears 206 and 207 are shared between shifter unit 183 on shaft 214 for odd-numbered forward traveling speeds and shifter units 184 on shaft 215 for even-numbered forward traveling speeds and backward traveling, and because gears 210 and 211 are shared between odd-numbered forward traveling speed shifter unit 181 on shaft 203 and the even-numbered forward traveling speed shifter unit 182 on shaft 204.

Further, in each of dual clutch transmissions 2 and 2A, first high/low speed shifter unit 183 is disposed upstream of odd-numbered forward traveling speed shifter unit 181, and second high/low speed shifter unit 184 is disposed upstream of even-numbered forward traveling speed shifter unit 182 and backward traveling shifter unit 185. However, in dual clutch transmission 2, clutches C1 and C2 are disposed upstream of respective shifter units 183 and 184, while in dual clutch transmission 2A, first clutch 201 is interposed between shifter unit 183 and shifter unit 181, and second clutch 202 is interposed between shifter unit 184 and shifter units 182 and 185. In other words, while each of clutches C1 and C2 in dual clutch transmission 2 is disposed at the utmost upstream side of each speed gear train, each of clutches 201 and 202 in dual clutch transmission 2A is disposed on an intermediate portion of each speed gear train.

The setting patterns of clutch sliders 81a, 82a, 83a, 84a, 89a for selecting respective speed gear trains are similar to those of dual clutch transmission 2 as mentioned above. In this regard, when clutch slider 81a is set at first speed position f1, gears 41 and 210 are drivingly connected to first clutch output shaft 203, and are drivingly connected to either gears 206 and 52 of the low speed gear train or gears 207 and 50 of the high speed gear train through engaged first clutch 201, so as to serve as either the first or fifth forward traveling speed gear train. When clutch slider 81a is set at third speed position f3, gears 43 and 211 are drivingly connected to first clutch output shaft 203, and are drivingly connected to either gears 206 and 52 of the low speed gear train or gears 207 and 50 of the high speed gear train through engaged first clutch 201, so as to serve as either the third or seventh forward traveling speed gear train.

When clutch slider 89a is set at neutral position N and clutch slider 82a is set at second speed position f2, gears 42 and 210 are drivingly connected to second clutch output shaft 204, and are drivingly connected to either gears 206 and 56 of the low speed gear train or gears 207 and 54 of the high speed gear train through engaged second clutch 202, so as to serve as either the second or sixth forward traveling speed gear train. When clutch slider 89a is set at neutral position N and clutch slider 82a is set at fourth speed position f4, gears 44 and 211 are drivingly connected to second clutch output shaft 204, and are drivingly connected to either gears 206 and 56 of the low speed gear train or gears 207 and 54 of the high speed gear train through engaged second clutch 202, so as to serve as either the fourth or eighth forward traveling speed gear train. When clutch slider 82a is set at neutral position N and clutch slider 89a is set at backward traveling position r, gears 57, 58 and 212 are drivingly connected to second clutch output shaft 204, and are drivingly connected to either gears 206 and 56 of the low speed gear train or gears 207 and 54 of the high speed gear train through engaged second clutch 202, so as to serve as either the low or high backward traveling speed gear train.

Gear 209 fixed on transmission shaft 208 meshes with a gear 213 fixed on main transmission output shaft (or sub transmission input shaft) 28 so as to transmit the output power of dual clutch transmission 2A from transmission shaft 208 to sub transmission 3. In this way, dual clutch transmission 2A has only the single output gear train extended from shaft 208 to shaft 28, thereby reducing gears in number in comparison with dual clutch transmission 2 which has the pair of output gear trains, i.e., gears 33 and 34 and gears 35 and 36, extended from respective shafts 31 and 32 to shaft 28.

Figure 13:
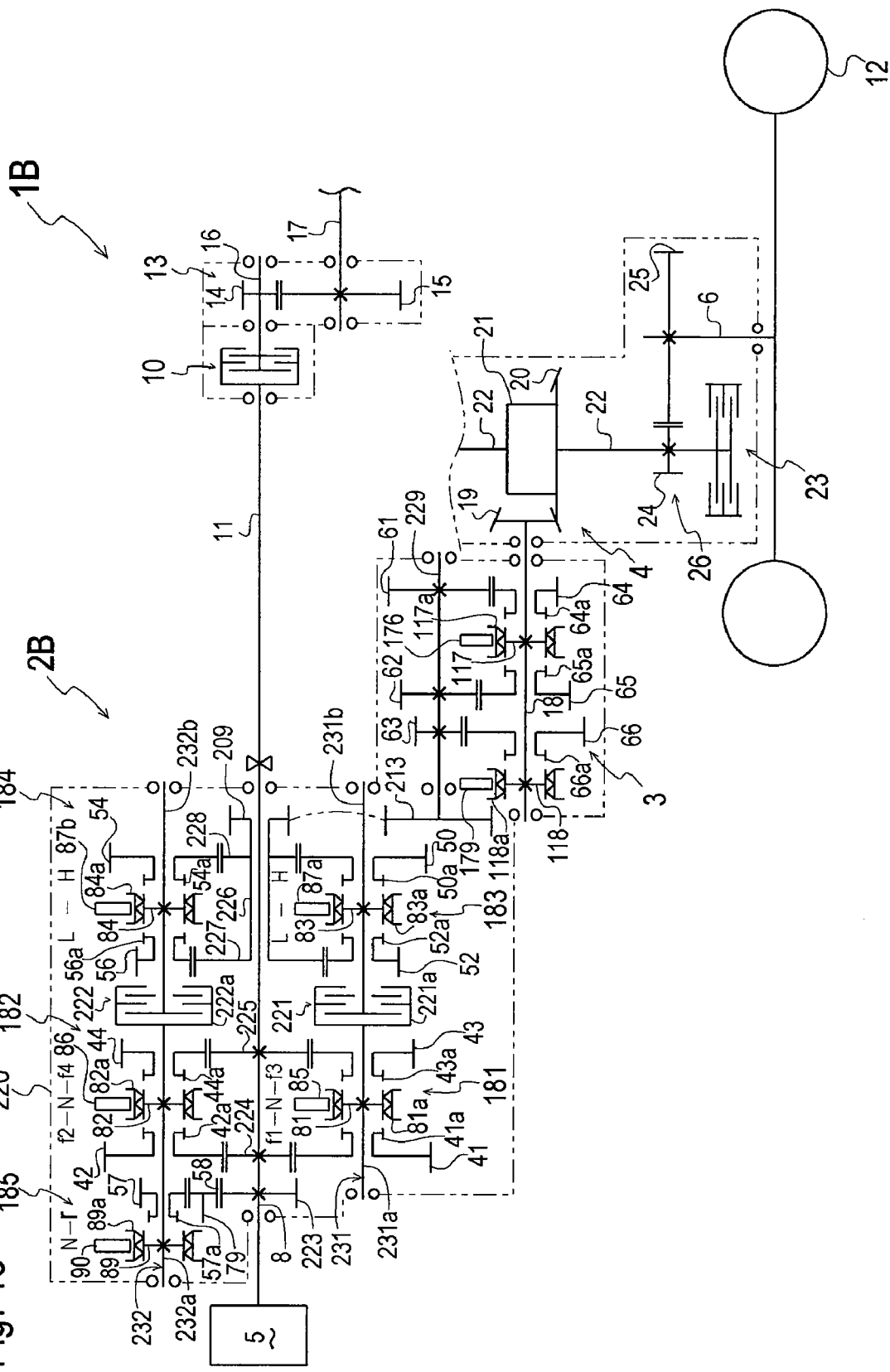
FIG. 13 is a skeleton diagram of a power transmission system of a vehicle 1B equipped with a dual clutch transmission 2B.

An alternative dual clutch transmission 2B provided in a vehicle 1B will be described with reference to FIG. 13. Description of structures with components in vehicle 11B designated by the same reference numerals as those of the above embodiment of vehicle 1A equipped with dual clutch transmission 2A is omitted unless being discussed later because the components are identical to those of vehicle 1A designated by the same reference numerals.

A transmission casing 220 of vehicle 1B incorporates dual clutch transmission 2B, sub transmission 3 driven by dual clutch transmission 2B, and differential gear unit 4 driven by sub transmission 3 so as to drive wheels 12. Similar to dual clutch transmission 2A, dual clutch transmission 2B includes a pair of clutches 221 and 222, corresponding to respective clutches 201 and 202, which are disposed on respective parallel different shafts. A different point of dual clutch transmission 2B from dual clutch transmission 2A is that a first clutch shaft 231 is divided into coaxial front and rear shafts 231a and 231b provided with first clutch 221 therebetween, and a second clutch shaft 232 is divided into coaxial front and rear shafts 232a and 232b provided with second clutch 222 therebetween. Front shafts 231a and 232a serve as input shafts of respective clutches 221 and 222, and rear shafts 231b and 232b serve as output shafts of respective clutches 221 and 222. First and second clutch output shafts 231b and 232b of dual clutch transmission 2B can be shorter than first and second clutch output shafts 203 and 204 of dual clutch transmission 2A so that clutches 221 and 222 can be minimized in capacity for driving respective output shafts 231b and 232b so as to reduce power loss in comparison with clutches 201 and 202 driving respective long output shafts 203 and 204.

Another different point of dual clutch transmission 2B from dual clutch transmission 2A is that shifter units 181, 182 and 185 are disposed upstream of respective shifter units 183 and 184 through respective clutches 221 and 222, while in dual clutch transmission 2A, shifter units 183 and 184 are disposed upstream of respective shifter units 181, 182 and 185 through respective clutches 201 and 202. In this regard, odd-numbered forward traveling speed shifter unit 181, including gears 41 and 43, spline hub 81 and clutch slider 81a, is provided on first clutch input shaft 231a. First high/low speed shifter unit 183, including gears 50 and 52, spline hub 83a and clutch slider 83a, is provided on first clutch output shaft 231b. Even-numbered forward traveling speed shifter unit 182 including gears 42 and 44, spline hug 82 and clutch slider 82a, is provided on second clutch input shaft 232a. Backward traveling shifter unit 185, including gear 57, spline hub 89 and clutch slider 89a, is provided on shaft 232a in front of shifter unit 182. Second high/low speed shifter unit 184, including gears 54 and 56, spline hub 84 and clutch slider 84a, is provided on second clutch output shaft 232b. The gears of respective shifter units 181, 182, 183, 184 and 189 are relatively rotatably fitted on respective shafts 231a, 231b, 232a and 232b, and are adapted to be drivingly connected to respective shafts 231a, 231b, 232a and 232b through the respective clutch sliders and spline hubs. Clutch slider 84a is slidably integrated with clutch slider 83a.

Gears 223, 224 and 225 are fixed on a front portion of input shaft 8, and a transmission shaft 226 is relatively rotatably provided on a rear portion of input shaft 8. Gear 223 meshes with gear 57 through idle gear 58 so that gears 223, 58 and 57 serve as a backward traveling gear train. Gear 224 meshes with both gears 41 and 42, so that gears 224 and 41 serve as the first or fifth forward traveling speed gear train of shifter unit 181, and gears 224 and 42 serve as the second or sixth forward traveling speed gear train of shifter unit 182. Gear 225 meshes with both gears 43 and 44, so that gears 225 and 43 serve as the third or seventh forward traveling speed gear train of shifter unit 181, and gears 225 and 44 serve as the fourth or eighth forward traveling speed gear train of shifter unit 182. A gear 227 is fixed on shaft 226 and meshes with both gears 52 and 56, so that gears 52 and 227 serve as the low speed gear train of shifter unit 183, and gears 56 and 227 serve as the low speed gear train of shifter unit 184. A gear 228 is fixed on shaft 226 and meshes with both gears 50 and 54, so that gears 50 and 228 serve as the high speed gear train of shifter unit 183, and gears 54 and 228 serve as the high speed gear train of shifter unit 184. Since shifter units 181 and 182 share gears 224 and 225, and shifter unit 183 and 184 share gears 227 and 228, dual clutch transmission 2B is also advantageous in reduction of gears in number. Further, gear 209 is fixed on shaft 226 and meshes with gear 213 fixed on a sub transmission input shaft 229 corresponding to shaft 28, and gears 61, 62 and 63 are fixed on shaft 229 so as to serve as speed drive gears of sub transmission 3.

As mentioned above, each of dual clutch transmissions 2, 2A and 2B provides eight forward traveling speeds and two backward traveling speeds, and sub transmission 3 provides three speeds. As a result, each of vehicles 1, 1A and 1B is provided with 24 speeds for forward traveling and is provided with 6 speeds for backward traveling. Both the low and high backward traveling speed gear trains of each of dual clutch transmissions 2, 2A and 2B are adapted to be activated by engaging only one of first and second clutches of the dual clutch transmission. More specifically, in each of above-mentioned dual clutch transmissions 2, 2A and 2B, only second clutch C2, 202 or 222 for activating the even-numbered forward traveling speed gear trains is used for activating the low and high backward traveling speed gear trains.

On the other hand, in each of hereinafter discussed dual clutch transmissions 2C, 2D and 2E, other backward traveling speed gear trains are provided to be activated by engaging first clutch C1, 201 or 221 for activating the odd-numbered forward traveling speed gear trains in addition to the backward traveling speed gear trains to be activated by engaging second clutch C2, 202 or 222.

Alternative dual clutch transmission 2C provided in a vehicle 1C shown in FIG. 14 will be described with reference to FIGS. 14 to 18. Description of structures with components designated by the same reference numerals as those of the above embodiment of vehicle 1 equipped with dual clutch transmission 2 is omitted unless being discussed later because the components are identical to those of vehicle 1 designated by the same reference numerals.

Figure 14:
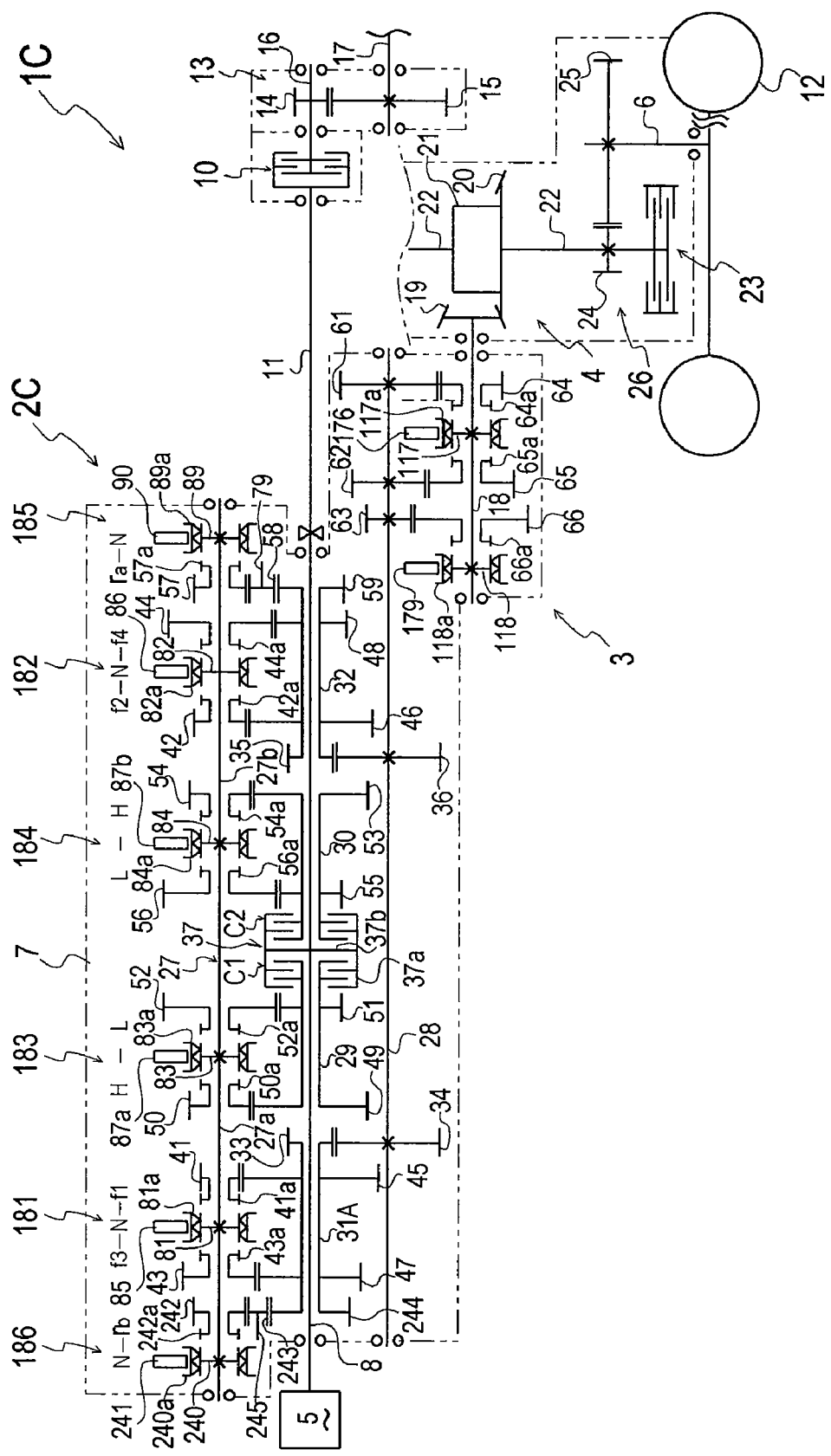
FIG. 14 is a skeleton diagram of a power transmission system of a vehicle 1C equipped with a dual clutch transmission 2C.

Referring to FIG. 14, the different point of dual clutch transmission 2C from dual clutch transmission 2 is that a backward traveling gear train is disposed downstream of first clutch C1 parallel to the odd-numbered forward traveling speed gear trains. In this regard, a gear 242 is relatively rotatably provided on front portion 27a of main transmission shaft 27 in front of shifter unit 181 having gears 43 and 41. A gear 244 is fixed on a front end of a first speed change shaft 31A, corresponding to first speed change shaft 31 of dual clutch transmission 2, on which gears 47 and 45 are fixed. A fore-and-aft horizontal idle gear shaft 245 is supported in transmission casing 7 and an idle gear 243 is provided on idle gear shaft 245. Gears 47 and 45 mesh with each other through idle gear 243, so as to constitute the backward traveling gear train to be activated by engaging first clutch C1.

An even-numbered backward traveling speed shifter unit 186 including gear 242 is configured on front portion 27a of main transmission shaft 27 in front of odd-numbered forward traveling speed shifter unit 181. In shifter unit 186, gear 242 is formed on a front end thereof with a clutch-toothed portion 242a, a spline hub 240 is fixed on front portion 27a of main transmission shaft 27 in front of gear 242, and a clutch slider 240a is relatively unrotatably and axially slidably spline-fitted on spline hub 240 so as to be shiftable between a backward traveling position rb and a neutral position N. Clutch slider 240a set at backward traveling position rb meshes with clutch-toothed portion 242a of gear 242. Clutch slider 240a set at neutral position N does not mesh with clutch-toothed portion 242a. A fork 241 is engaged on clutch slider 240a so as to axially slidably integral with clutch slider 240a. In this regard, backward traveling shifter unit 185 on the downstream of second clutch C2 is referred to as an odd-numbered backward traveling speed shifter unit 185. Backward traveling position r of clutch slider 89a is referred to as a backward traveling position ra.

In this way, shifter units 186, 181, 183, 184, 182 and 185 are coaxially fore-and-aft aligned on main transmission shaft 27 so as to simplify dual clutch transmission 2A and facilitate maintenance of dual clutch transmission 2A.

Referring to FIGS. 14 and 17, gears 55 and 56, shaft 27, gears 57, 58 and 59, shaft 32, gears 35 and 36 and shaft 28 are interlocked with one another in series by setting clutch slider 84a at low speed position L, clutch slider 82a at neutral position N, and clutch slider 89a at backward traveling position ra, so as to serve as a first backward traveling speed gear train for setting a first backward traveling speed R1. Gears 53 and 54, shaft 27, gears 57, 58 and 59, shaft 32, gears 35 and 36 and shaft 28 are interlocked with one another in series by setting clutch slider 84a at high speed position H, clutch slider 82a at neutral position N, and clutch slider 89a at backward traveling position ra, so as to serve as a third backward traveling speed gear train for setting a third backward traveling speed R3. Either the first or third backward traveling speed gear train is drivingly connected to input shaft 8 by engaging second clutch C2.

Referring to FIGS. 14 and 17, gears 51 and 52, shaft 27, gears 242, 245 and 244, shaft 31A, gears 33 and 34 and shaft 28 are interlocked with one another in series by setting clutch slider 83a at low speed position L, clutch slider 81a at neutral position N, and clutch slider 240a at backward traveling position rb, so as to serve as a second backward traveling speed gear train for setting a second backward traveling speed R2. Gears 49 and 50, shaft 27, gears 242, 245 and 244, shaft 31A, gears 33 and 34 and shaft 28 are interlocked with one another in series by setting clutch slider 83a at high speed position H, clutch slider 81a at neutral position N, and clutch slider 240a at backward traveling position rb, so as to serve as a fourth backward traveling speed gear train for setting a fourth backward traveling speed R4. Either the second or fourth backward traveling speed gear train is drivingly connected to input shaft 8 by engaging first clutch C1.

Figure 15:
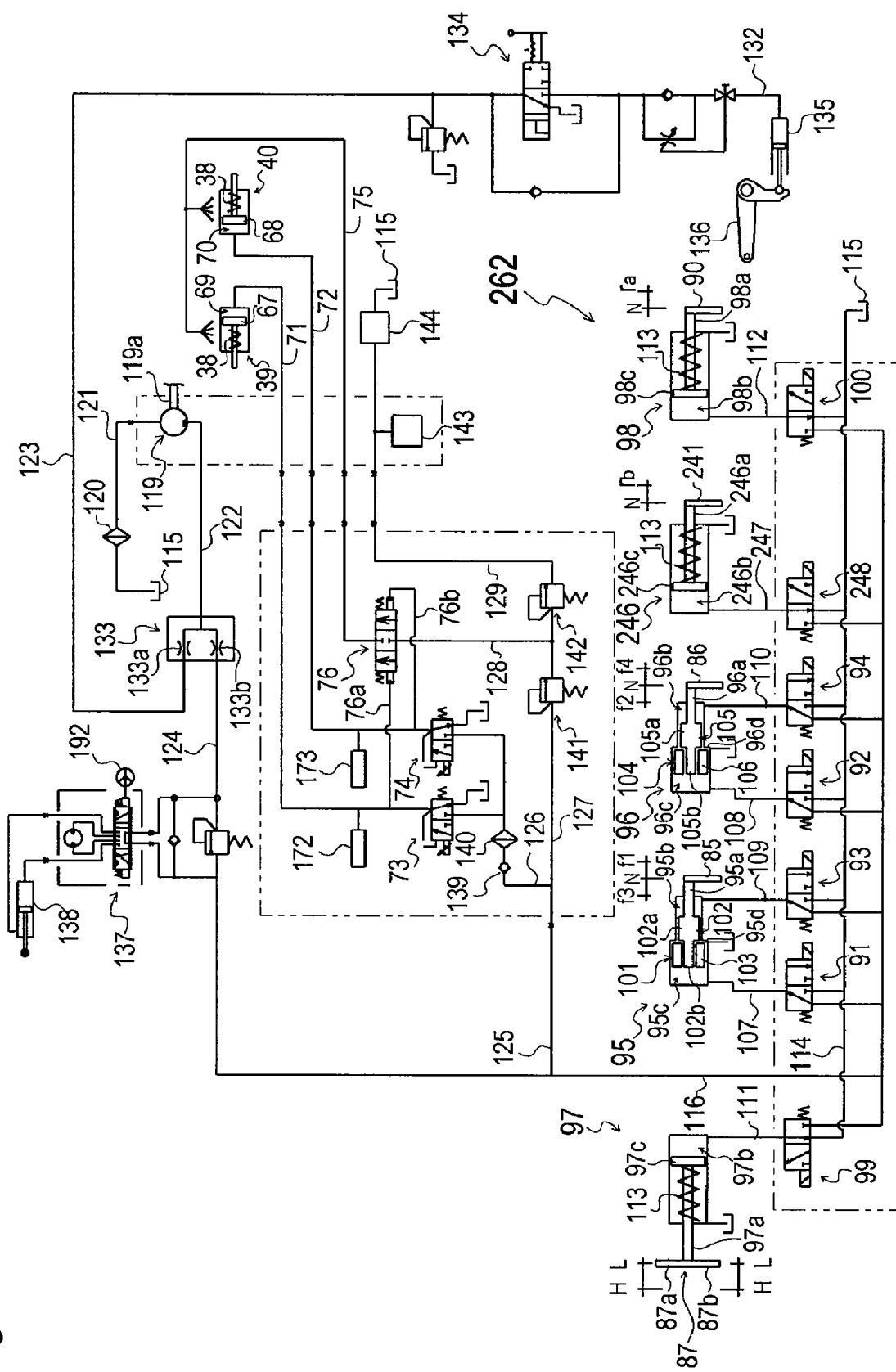
FIG. 15 is a hydraulic circuit diagram for controlling dual clutch transmission 2C and others in vehicle 1C.
Figure 16:
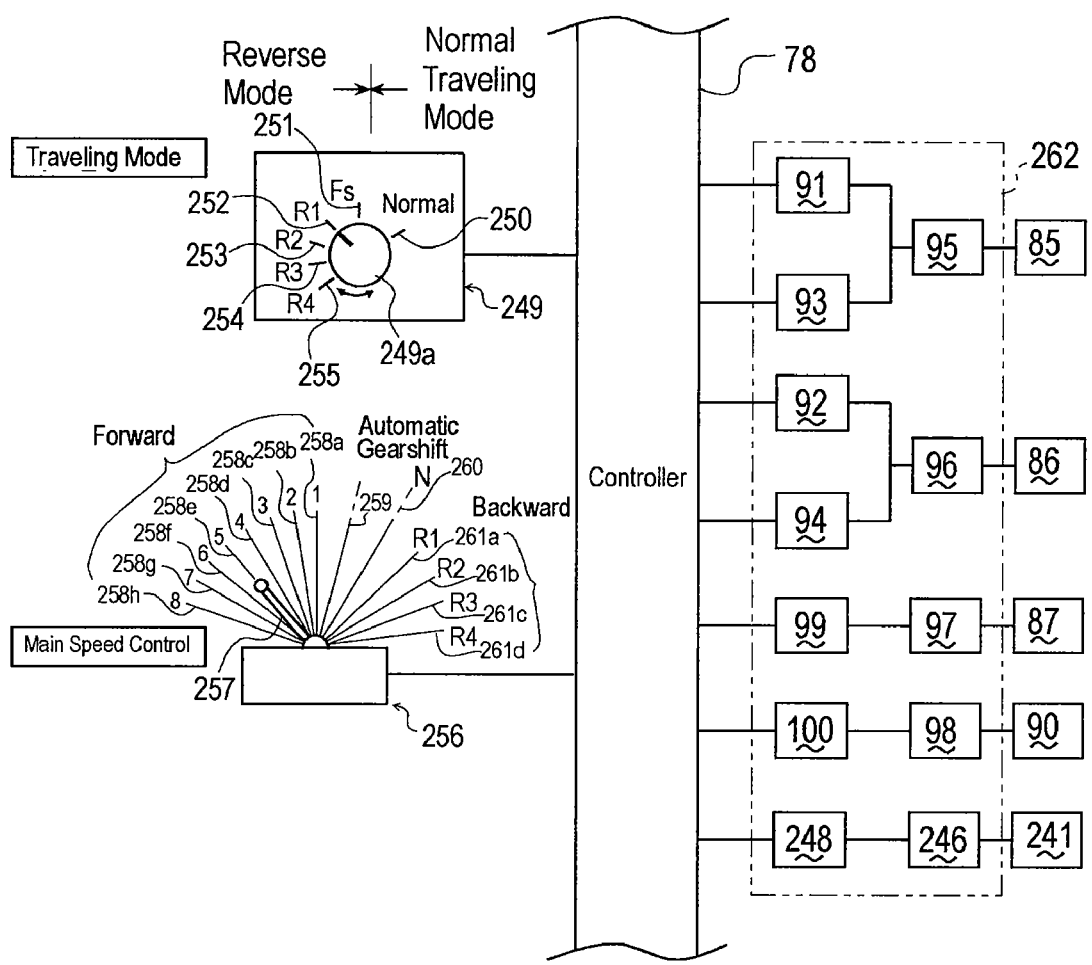
FIG. 16 is a block diagram of a part of an electric control system for controlling dual clutch transmission 2C, showing a traveling mode setting dial 249a and a main speed control lever 257 electrically connected to controller 78.

Referring to FIGS. 15 and 16, a hydraulic speed gear control system 262 corresponds to hydraulic speed gear control system 80 additionally provided with a single-acting fifth hydraulic cylinder 246 serving as an actuator for shift control of fork 241 and clutch slider 240a, and with a solenoid switching valve 248 for controlling a piston 246c in cylinder 246. A piston rod 246a is extended from piston 246c and outward from cylinder 246 so as to be connected to fork 241. In cylinder 246, a spring 113 is wound around piston rod 246a. A space in cylinder 246 opposite to piston rod 246a with respect to piston 246c serves as a fluid chamber 246b fluidly connected to valve 248 through a fluid passage 247. When a solenoid of valve 248 is unexcited, fluid is drained from fluid chamber 246b to tank 115, and spring 113 biases piston 246c, so that piston 246c, fork 241 and clutch slider 240a are set at neutral position N. When the solenoid of valve 248 is excited, fluid is supplied into fluid chamber 246b against spring 113, so that piston 246c, fork 241 and clutch sliders 240a are set at backward traveling position rb. Referring to FIG. 16, valve 248 is electrically connected to controller 78 so as to be controlled by controller 78.

Referring to FIG. 16, operation devices serving as input means for inputting operation signals to controller 78 will be described. FIG. 16 illustrates only the operation devices different from corresponding devices shown in FIG. 3. Other elements electrically connected to controller 78 are omitted in FIG. 16 because they are identical to corresponding elements shown in FIG. 3.

A main speed control lever 257 and a traveling mode setting dial 249a are the operation devices (manipulators) for controlling dual clutch transmission 2C, i.e., for controlling valves 73, 74, 91, 92, 93, 94, 99, 100 and 248. Main speed control lever 257 is shiftable among first to eighth forward traveling speed positions 258a, 258b, 258c, 258d, 258e, 258f, 258g and 258h, an automatic gearshift mode position 259, a neutral position 260, and first to fourth backward traveling speed positions 261a, 261b, 261c and 261d. A lever position sensor 256 detects a position of lever 257, and issues a detection signal to controller 78. Traveling mode setting dial 249a is shiftable among a normal traveling mode position 250, an automatic reverse mode position 251, a first speed reverse mode position 252 and a second speed reverse mode position 253, a third speed reverse mode position 254 and a fourth speed reverse mode position 255. A dial position detection sensor 249 detects a position of dial 249a and issues a detection signal to controller 78. Further, reverser lever 146a omitted in FIG. 16 is provided for forward/backward traveling direction shift of dual clutch transmission 2C set in the reverse mode, and lever position sensor 146 detecting a position of lever 146a is electrically connected to controller 78.

The mode or state variation of dual clutch transmission 2C depending on the operation of levers 257 and 146a and dial 249a will be described while omitting description of the same things as those of dual clutch transmission 2 depending on the operation of levers 77 and 146a and dial 145a. When dual clutch transmission 2C is set in the manual gearshift mode by setting lever 257 at any position other than automatic gearshift mode position 259, controller 78 controls valves 73, 74, 91, 92, 93, 94, 99, 100 and 248 so as to select any one forward or backward traveling speed gear train to be activated or realize the neutral state, in correspondence to the set position of lever 257. The above-mentioned clutch-off control of clutches C1 and C2 is performed for each gearshift in the manual gearshift mode. Either the forward or backward traveling direction is selected depending on whether lever 257 is set at any one of forward traveling speed positions 258a, 258b, 258c, 258d, 258e, 258f, 258g and 258h or any one of backward traveling speed positions 261a, 261b, 261c and 261d.

While dial 249a is set at normal traveling position 250, dual clutch transmission 2C is set in the automatic gearshift mode by setting lever 257 at automatic gearshift mode position 259. In the automatic gearshift mode, the automatic speed shift among first to eighth forward traveling speeds F1, F2, F3, F4, F5, F6, F7 and F8 is performed based on the detections by sensors 159, 160, 171, 167, 168, 172 and 173 and based on a gearshift map such as map 166 memorized in memory 78a, as mentioned above. The cross wave control of clutches C1 and C2 is performed every shift between neighboring odd-numbered and even-numbered forward traveling speeds. FIG. 18 indicates patterns of set positions of the clutch sliders and engagement/disengagement of clutches C1 and C2 for realizing respective forward traveling speeds F1, F2, F3, F4, F5, F6, F7 and F8. The only different point of these patterns in FIG. 18 for the respective forward traveling speeds of dual clutch transmission 2C different from those in FIG. 4 for the respective forward traveling speeds of dual clutch transmission 2 is that clutch slider 240 is set at neutral position N while clutch slider 81a is set at first or second speed position f1 and F3.

For backward traveling of vehicle 1C, any one of backward traveling speeds R1, R2, R3 and R4 is optionally selected in the above-mentioned manual gearshift mode or the later-discussed manual reverse mode, or is automatically selected in the later-discussed automatic reverse mode in correspondence to selected rated forward traveling speed Fs. The automatic gearshift mode is provided for only gearshift of forward traveling speed of dual clutch transmission 2C. However, in the automatic gearshift mode (by setting lever 257 at position 259 and setting dial 249a at position 250), the backward traveling speed may be automatically gearshifted by the cross wave control of clutches C1 and C2 in correspondence to the accelerator position and the vehicle traveling speed similar to the automatic forward traveling speed shift. In this case, the shift of reverser lever 146a between positions 164 and 165 may be used for selecting whether vehicle 1C travels forward or backward. Further, the patterns of positions of the clutch sliders and engagement/disengagement of clutches C1 and C2 indicated in FIG. 18 corresponding to respective backward traveling speeds R1, R2, R3 and R4 are provided for the manual gearshift mode and the automatic and manual reverse modes, however, these may be used for the automatic backward traveling speed shift in the automatic gearshift mode.

Shift operation of clutch sliders 81a, 82a, 83a, 84a, 89a and 240a along with the control of clutches C1 and C2 in the automatic reverse mode set by setting dial 249a at position 251 will be described with reference to FIG. 16 to 18. While dial 249a is set at position 251, main speed control lever 257 is set at any one of forward traveling speed positions 258a, 258b, 258c, 258d, 258e, 258f, 258g and 258h so as to determine one of forward traveling speeds F1, F2, F3, F4, F5, F6, F7 and F8 as rated forward traveling speed Fs. As mentioned above regarding to dual clutch transmission 2, while reverser lever 146a is set at forward traveling position 164, forward traveling speed F is kept to be rated forward traveling speed Fs, and only if traveling load Lo is not less than threshold load Ls (i.e., an overload on engine 5 is detected), the load controlling shift down is performed so as to reduce forward traveling speed F until traveling load Lo becomes less than threshold load Ls.

With regard to the automatic reverse mode, in comparison with dual clutch transmission 2, dual clutch transmission 2C is advantageous in that, when reverser lever 146a is shifted to backward traveling position 165, currently realized forward traveling speed F, which is either rated forward traveling speed Fs or a lower speed as the result of the load controlling shift down, is kept as it is, i.e., it is not further shifted down to cause the delay of F-to-R shift, before start of the cross wave control of clutches C1 and C2 for F-to-R shift, because even-numbered backward traveling speed shifter unit 186 having the gear train to be activated by engaging first clutch C1 is provided in addition to odd-numbered backward traveling speed shifted unit 185 having the gear train to be activated by engaging second clutch C2.

In this regard, referring to FIG. 18, when reverser lever 146a is shifted from position 164 to position 165, odd-numbered backward traveling speed R1 or R3 realized by engaging clutch C2 is selected if currently realized forward traveling speed F is one of the odd-numbered forward traveling speed group realized by engaging clutch C1, and even-numbered backward traveling speed R2 or R4 realized by engaging clutch C1 is selected if currently realized forward traveling speed F is one of the even-numbered forward traveling speed group realized by engaging clutch C2, thereby necessarily realizing the cross wave control of clutches C1 and C2 during the backward-to-forward traveling direction shift in the automatic reverse mode.

First and second backward traveling speeds R1 and R2 realized by setting clutch sliders 83a and 84a at low speed positions L are referred to as low backward traveling speeds of dual clutch transmission 2C, and third and fourth backward traveling speeds R3 and R4 realized by setting clutch sliders 83a and 84a at high speed positions H are referred to as high backward traveling speeds of dual clutch transmission 2C. Further to the selection of either an odd-numbered backward traveling speed or an even-numbered backward traveling speed, referring to FIG. 18, when reverser lever 146a is shifted from forward traveling position 164 to backward traveling position 165, either one of the low backward traveling speeds or one of the high backward traveling speeds is set depending on whether the last realized forward traveling speed F belongs to the low forward traveling speed group (i.e., first to fourth forward traveling speeds F1, F2, F3 and F4) or the high forward traveling speed group (i.e., fifth to eighth forward traveling speeds F5, F6, F7 and F8), thereby preventing clutch sliders 83a and 84a from being shifted, thereby further accelerating F-to-R shift, and thereby substantially equalizing the backward traveling speed to the forward traveling speed so as to prevent discomfort in the traveling direction shift of vehicle 1C in the reverse mode.

When last realized forward traveling speed F before the shift of lever 146a belongs to the low forward traveling speed group, low speed positions L of clutch sliders 83a and 84a are maintained and either clutch slider 89a or 240a is shifted from neutral position N to backward traveling position ra or rb, thereby realizing first or second backward traveling speed R1 or R2. When last realized forward traveling speed F before the shift of lever 146a belongs to the high forward traveling speed group, high speed positions H of clutch sliders 83a and 84a are maintained and either clutch slider 89a or 240a is shifted from neutral position N to backward traveling position ra or rb, thereby realizing third or fourth backward traveling speed R3 or R4.

Consequently, first backward traveling speed R1 is selected if last realized forward traveling speed F is first or third forward traveling speed F1 or F3. Second backward traveling speed R2 is selected if last realized forward traveling speed F is second or fourth forward traveling speed F2 or F4. Third backward traveling speed R3 is selected when last realized forward traveling speed F is fifth or seventh forward traveling speed F5 or F7. Fourth backward traveling speed R4 is selected if last realized forward traveling speed F is sixth or eighth forward traveling speed F6 or F8.

Further, in the automatic reverse mode of dual clutch transmission 2C, the engine cooperation control is also adapted to be performed when starting backward traveling of vehicle 1C, thereby preventing the actual backward vehicle traveling speed from exceeding the forward vehicle traveling speed corresponding to rated forward traveling speed Fs of dual clutch transmission 2C.

As an example of comparison of maximum accelerated vehicle traveling speeds, it is assumed $V(F1)<V(R1)<V(F2)<V(R2)$, and $V(F5)<V(R3)<V(F6)<V(R4)$, as shown in FIG. 18. If last realized forward traveling speed F before the shift of lever 146a to position 165, which is either rated forward traveling speed Fs or a lower forward traveling speed as the result of the load controlling shift down, is first forward traveling speed F1, first backward traveling speed R1 is realized by F-to-R shift, and the engine cooperation control is performed to reduce the acceleration rate of backward traveling vehicle 1C at first backward traveling speed R1. If last realized forward traveling speed F is third forward traveling speed F3, first backward traveling speed R1 is realized by F-to-R shift, and the engine control cooperation is not performed, thereby keeping proper acceleration of backward traveling vehicle 1C at first backward traveling speed R1. Similarly, if last realized forward traveling speed F is any one of second, fifth and sixth forward traveling speeds F2, F5 and F6, the engine cooperation control is performed to reduce the acceleration rate of backward traveling vehicle 1C at corresponding one of second, third and fourth backward traveling speeds R2, R3 and R4. If last realized forward traveling speed F is any one of fourth, seventh and eighth forward traveling speeds F4, F7 and F8, the engine cooperation control is not performed and backward traveling vehicle 1C is properly accelerated at corresponding one of second, third and fourth backward traveling speeds R2, R3 and R4.

The load controlling shift down may also be performed during backward traveling of vehicle 1C. During backward traveling of vehicle 1C, the forward traveling speed gear train corresponding to rated forward traveling speed Fs is selected to be activated. However, if vehicle 1C travels backward at odd-numbered backward traveling speed R1 or R3 and rated forward traveling speed Fs is an even-numbered speed, or if vehicle 1C travels backward at even-numbered backward traveling speed R2 or R4 and rated forward traveling speed Fs is an odd-numbered speed, the forward traveling speed gear train selected during backward traveling of vehicle 1C corresponds to the forward traveling speed lower than rated forward traveling speed Fs by one speed. Therefore, when reverser lever 146a is shifted to position 164, the cross wave control of clutches C1 and C2 is constantly performed for R-to-F shift.

Dual clutch transmission 2C is set in the manual reverse mode by setting dial 249a at one of positions 252, 253, 254 and 255 and setting lever 257 at one of positions 258a, 258b, 258c, 258d, 258e, 259f, 259g and 259h. Position 252 corresponds to first backward traveling speed R1, position 253 corresponds to second backward traveling speed R2, position 254 corresponds to third backward traveling speed R3, and position 255 corresponds to fourth backward traveling speed R4. The load controlling shift down of backward traveling speed, the engine cooperation control and the reselection of backward traveling speed corresponding to reselection of forward traveling speed are adapted to be performed in the manual reverse mode similar to those for vehicle 1 equipped with dual clutch transmission 2. The cross wave control of clutches C1 and C2 is performed for F-to-R shift and R-to-F shift if both the selected forward traveling speed and the selected backward traveling speed are odd-numbered, or are even-numbered, and the clutch-off control of clutches C1 and C2 is performed for F-to-R shift and R-to-F shift if one of the selected forward and backward traveling speeds is odd-numbered and the other is even-numbered. Alternatively, if one of the selected forward and backward traveling speeds is odd-numbered and the other is even-numbered, one may be automatically shifted down by one speed so as to enable the cross wave control of clutches C1 and C2.

Figure 19:
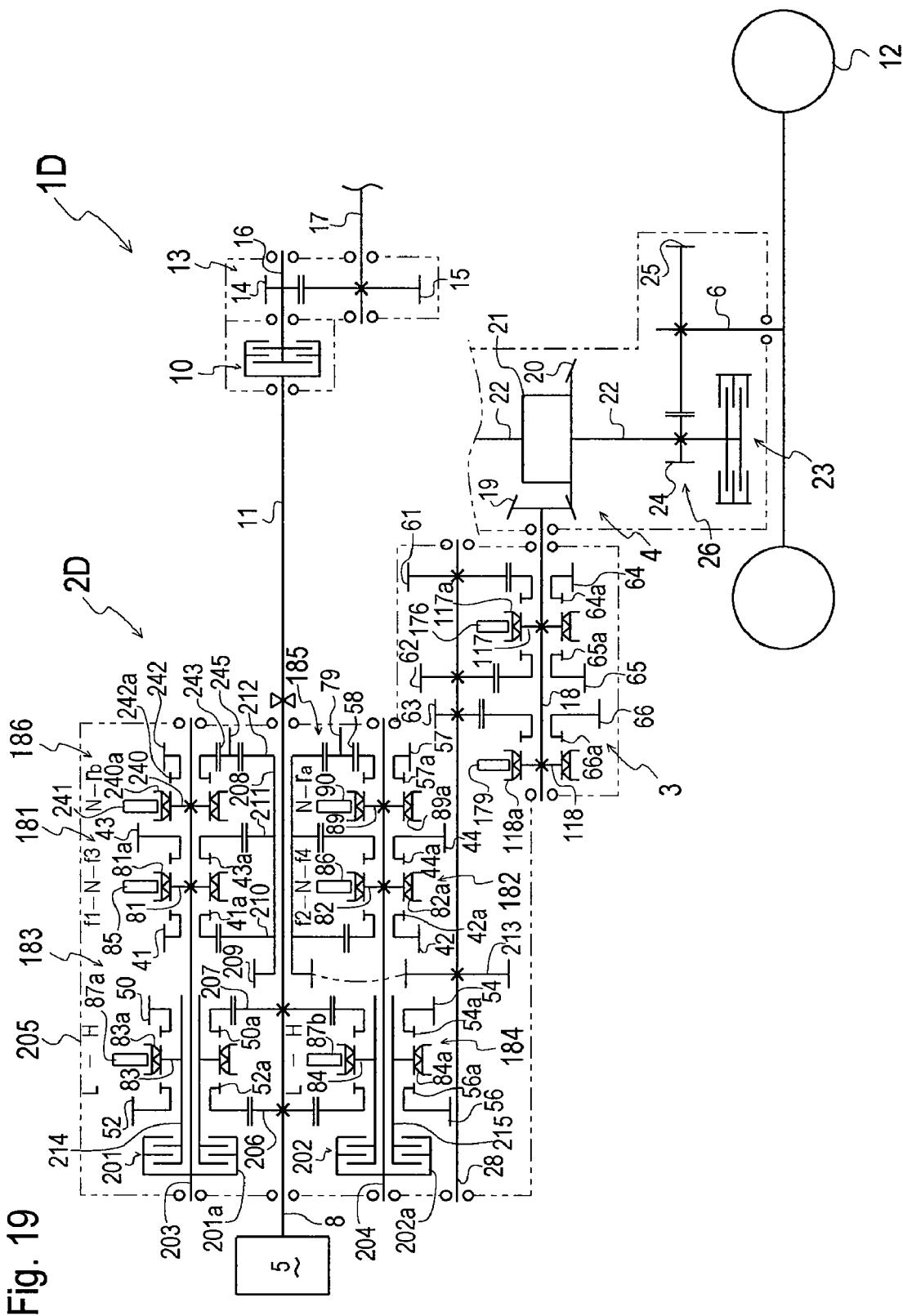
FIG. 19 is a skeleton diagram of a power transmission system of a vehicle 1D equipped with a dual clutch transmission 2D.

An alternative dual clutch transmission 2D provided in a vehicle 1D will be described with reference to FIG. 19. Description of structures with components in vehicle 1D designated by the same reference numerals as those of vehicles 1A and 1C equipped with respective dual clutch transmissions 2A and 2C is omitted unless being discussed later because the components are identical to those of vehicles 1A and 1C designated by the same reference numerals.

Dual clutch transmission 2D corresponds to dual clutch transmission 2A further provided with even-numbered backward traveling speed shifter unit 186, including gear 242, spline hub 240 and clutch slider 240a, on first clutch output shaft 203 behind odd-numbered forward traveling speed shifter unit 181. Gear 212 on transmission shaft 208 meshes with gear 57 of odd-numbered backward traveling speed shifter unit 185 through idle gear 58, and also meshes with gear 242 of shifter unit 186 through idle gear 243. Since backward traveling speed shifter units 185 and 186 shares gear 212, no additional gear is provided on shaft 208 in comparison with dual clutch transmission 2A.

In addition to the above-mentioned setting patterns of clutch sliders 81a, 82a, 83a, 84a and 89a in dual clutch transmission 2A for selecting respective speed gear trains, dual clutch transmission 2D is provided with the following shift patterns of clutch slider 240a. When clutch slider 81a is set at either first or third speed position f1 or f3 so as to realize one of odd-numbered forward traveling speeds F1, F3, F5 and F7, clutch slider 240a is set at neutral position N. When clutch slider 81a is set at neutral position N and clutch slider 240a is set at backward traveling position rb, gears 242, 243 and 212 are drivingly connected to first clutch output shaft 203, and are drivingly connected to gears 206 and 52 of the low speed gear train by setting clutch slider 83a at low speed position L so as to serve as the second backward traveling speed gear corresponding to second backward traveling speed R2, or are drivingly connected to gears 207 and 50 of the high speed gear train by setting clutch slider 83a at high speed position H so as to serve as the fourth backward traveling speed gear train corresponding to fourth backward traveling speed R4. In this regard, in dual clutch transmission 2D, gears 57, 58 and 212, drivingly connected to second clutch output shaft 203 through clutch slider 89a set at backward traveling position ra, are drivingly connected to gears 206 and 56 through engaged second clutch 202 by setting clutch slider 84a at low speed position L so as to serve as the first backward traveling speed gear train corresponding to first backward traveling speed R1, or are drivingly connected to gears 206 and 56 through engaged second clutch 202 by setting clutch slider 84a at high speed position H so as to serve as the third backward traveling speed gear train corresponding to third backward traveling speed R3.

Figure 20:
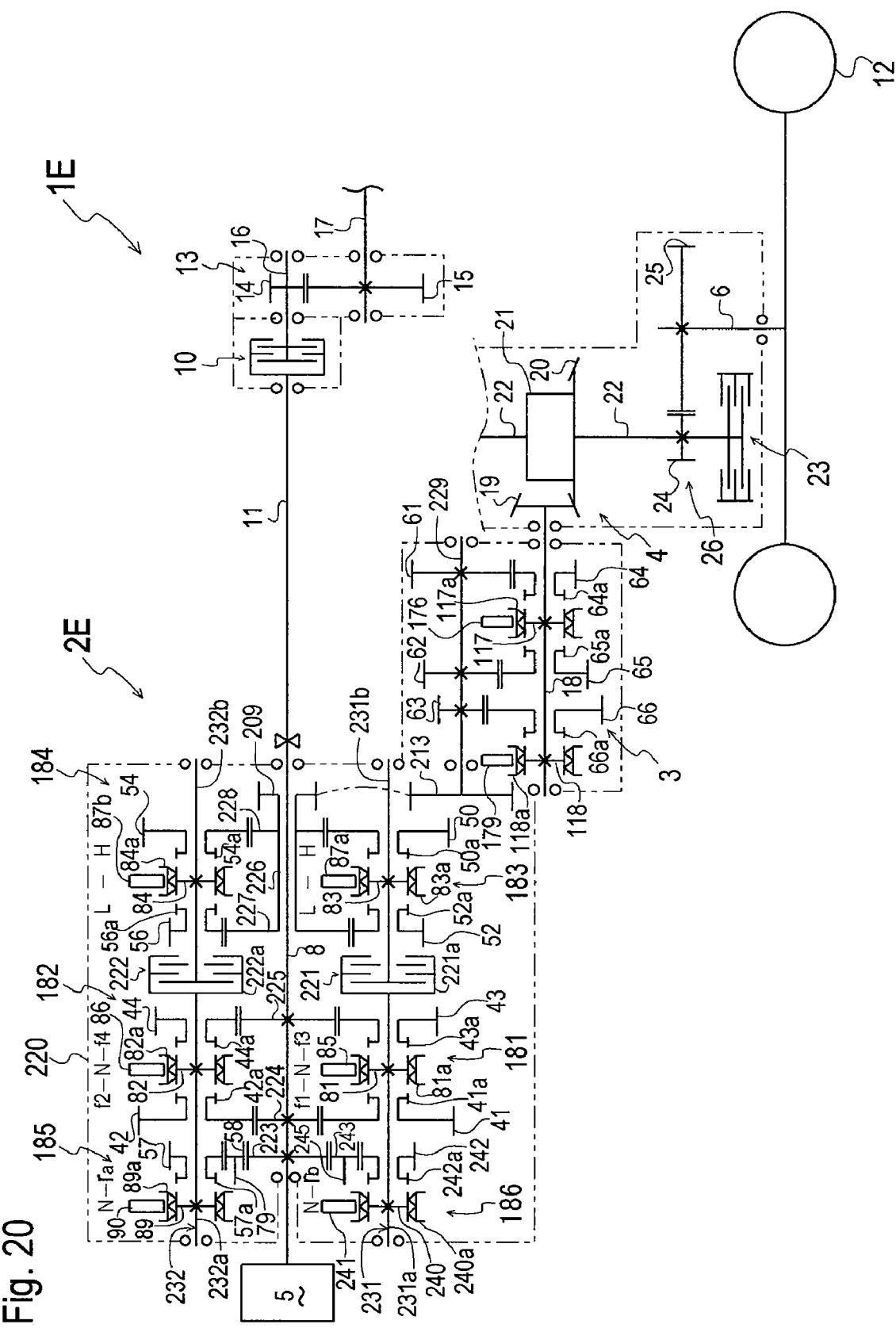
FIG. 20 is a skeleton diagram of a power transmission system of a vehicle 1E equipped with a dual clutch transmission 2E.

An alternative dual clutch transmission 2E provided in a vehicle 1E will be described with reference to FIG. 20. Description of structures with components in vehicle 1E designated by the same reference numerals as those of the above embodiment of vehicle 1B and 1D equipped with respective dual clutch transmissions 2B and 2D is omitted unless being discussed later because the components are identical to those of vehicles 1B and 1D designated by the same reference numerals.

Dual clutch transmission 2E corresponds to dual clutch transmission 2B further provided with even-numbered backward traveling speed shifter unit 186, including gear 242, spline hub 240 and clutch slider 240a, on first clutch input shaft 231a in front of odd-numbered forward traveling speed shifter unit 181. Gear 223 on input shaft 8 meshes with gear 57 of odd-numbered backward traveling speed shifter unit 185 through idle gear 58, and also meshes with gear 242 of shifter unit 186 through idle gear 243. Since backward traveling speed shifter units 185 and 186 shares gear 223, no additional gear is provided on input shaft 8 in comparison with dual clutch transmission 2B.

In this way, even-numbered backward traveling speed shifter unit 186, odd-numbered forward traveling speed shifter unit 181, first clutch 221 and first high/low speed shifter unit 183 are coaxially aligned on shaft 231, while odd-numbered backward traveling speed shifter unit 185, even-numbered forward traveling speed shifter unit 182, second clutch 222 and second high/low speed shifter unit 184 are coaxially aligned on shaft 232 parallel to shaft 231 with shifter units 186, 181 and 183 and clutch 221 thereon.

Gears 223, 243 ad 242 serve as an even-numbered (i.e., second or fourth) backward traveling speed gear train, while gears 223, 58 and 57 serve as an odd-numbered (i.e., first or third) backward traveling speed gear train. While clutch slider 81a is set at neutral position N, gears 223, 243 and 242 extended from input shaft 8 are drivingly connected to first clutch input shaft 231a by setting clutch slider 240a at backward traveling position rb, are drivingly connected to first clutch output shaft 231b by engaging first clutch 221, and serve as either the second or fourth backward traveling speed gear train depending on whether clutch slider 83a is set at low speed position L or high speed position H. While clutch slider 82a is set at neutral position N, gears 223, 58 and 57 extended from input shaft 8 are drivingly connected to second clutch input shaft 232a by setting clutch slider 89a at backward traveling position ra, are drivingly connected to second clutch output shaft 232b by engaging second clutch 222, and serve as either the first or third backward traveling speed gear train depending on whether clutch slider 84a is set at low speed position L or high speed position H.

As mentioned above, each of dual clutch transmissions 2C, 2D and 2E provides eight forward traveling speeds and four backward traveling speeds, and sub transmission 3 provides three speeds. As a result, each of vehicles 1C, 1D and 1E is provided with 24 speeds for forward traveling and is provided with 12 speeds for backward traveling.

Incidentally, in each of FIGS. 1, 11, 13, 14, 19 and 20 illustrating skeleton diagrams of the respective vehicles, a part incorporating the dual clutch transmission and sub transmission 3, a part incorporating differential gear unit 4, and a part incorporating the PTO gears appear being separated from one another, however, actually, these parts are integrated as each of transmission casings 7, 205 and 220.

It is further understood by those skilled in the art that the foregoing description is a preferred embodiment of the disclosed apparatus and that various changes and modifications may be made in the invention without departing from the scope thereof defined by the following claims.

What is claimed is:

1. A dual clutch transmission comprising:
an odd-numbered forward traveling speed drive train group including at least one odd-numbered forward traveling speed drive train for setting an odd-numbered forward traveling speed;
an even-numbered forward traveling speed drive train group including at least one even-numbered forward traveling speed drive train for setting an even-numbered forward traveling speed;
a plurality of backward traveling speed drive trains for setting respective backward traveling speeds;
a first clutch adapted to be engaged so as to activate the odd-numbered forward traveling speed drive train group;
a second clutch adapted to be engaged so as to activate the even-numbered forward traveling speed drive train group, wherein at least one of the first and second clutches is adapted to be engaged so as to activate at least one of the plurality of backward traveling speed drive trains;
a reverse mode setting means for setting a reverse mode; and
a reverser operation means for shifting a forward/backward traveling direction of a vehicle, the reverser operation means being shiftable between a forward traveling position and a backward traveling position,
wherein, while the reverse mode is set by the reverse mode setting means and the reverser operation means is shifted between the forward traveling position and the backward traveling position, the first and second clutches are alternately engaged/disengaged for a forward/backward traveling speed shift between the backward traveling speed set by the at least one backward traveling speed drive train and a forward traveling speed set by any one forward traveling speed drive train of the odd-numbered or even-numbered forward traveling speed drive train group activated by engaging the first or second clutch which is different from the first or second clutch adapted to be engaged for activating the at least one backward traveling speed drive train so that, during the alternate engagement/disengagement shift of the first and second clutches, an engagement action of one of the first and second clutches overlaps a disengagement action of the other of the first and second clutches.

2. The dual clutch transmission according to claim 1, wherein the first and second clutches are disposed upstream of the odd-numbered forward traveling speed drive train group, the even-numbered forward traveling speed drive train group and the plurality of backward traveling speed drive trains.

3. The dual clutch transmission according to claim 1, wherein the at least one odd-numbered forward traveling speed drive train is a first forward traveling speed drive train for setting the lowest forward traveling speed,
wherein the at least one backward traveling speed drive train is adapted to be activated by engaging the second clutch, and
wherein, when the reverse mode is set, a speed shift between the lowest forward traveling speed and the backward traveling speed set by the at least one backward traveling speed drive train is the forward/backward traveling speed shift realized by the alternate engagement/disengagement shift of the first and second clutches.

4. The dual clutch transmission according to claim 1, wherein all the plurality of backward traveling speed drive trains are adapted to be activated by engaging one of the first and second clutches, and
wherein the forward/backward traveling speed shift realized by the alternate engagement/disengagement shift of the first and second clutches is a speed shift between a backward traveling speed set by one of all the plurality of backward traveling speed drive trains and a forward traveling speed set by one forward traveling speed drive train activated by engaging the first or second clutch which is different from the first or second clutch adapted to be engaged for activating all the backward traveling speed drive trains.

5. The dual clutch transmission according to claim 1, wherein the at least one backward traveling speed drive train is a first backward traveling speed drive train adapted to be activated by engaging the second clutch,
wherein another of the plurality of backward traveling speed drive trains is a second backward traveling speed drive train adapted to be activated by engaging the first clutch, and
wherein the forward/backward traveling speed shift realized by the alternate engagement/disengagement shift of the first and second clutches is a speed shift between the odd-numbered forward traveling speed set by the at least one odd-numbered forward traveling speed drive train and a backward traveling speed set by the first backward traveling speed drive train, or between the even-numbered forward traveling speed set by the at least one even-numbered forward traveling speed drive train and a backward traveling speed set by the second backward traveling speed drive train.

6. The dual clutch transmission according to claim 1, wherein all the forward traveling speed drive trains belonging to the odd-numbered and even-numbered forward traveling speed drive train groups are classified between a low forward traveling speed drive train group and a high forward traveling speed drive train group,
wherein at least one of the plurality of backward traveling speed drive trains is a low backward traveling speed drive train corresponding to the low forward traveling speed drive train group, and at least one of the plurality of backward traveling speed drive trains is a high backward traveling speed drive train corresponding to the high forward traveling speed drive train group,
wherein, when the reverser operation means is shifted between the forward traveling position and the backward traveling position, either a low forward/backward traveling speed shift between a forward traveling speed set by one forward traveling speed drive train belonging to the low forward traveling speed drive train group and a backward traveling speed set by the low backward traveling speed drive train or a high forward/backward traveling speed shift between a forward traveling speed set by one forward traveling speed drive train belonging to the high forward traveling speed drive train group and a backward traveling speed set by the high backward traveling speed drive train is realized, and wherein at least one speed shift, which is either the low forward/backward traveling speed shift or the high forward/backward traveling speed shift, is the forward/backward traveling speed shift realized the alternate engagement/disengagement shift of the first and second clutches.

7. The dual clutch transmission according to claim 6, wherein each forward traveling speed drive train belonging to the high forward traveling speed drive train group has a deceleration ratio not more than an average of deceleration ratios of all the forward traveling speed drive trains, and wherein each forward traveling speed drive train belonging to the low forward traveling speed drive train group has a deceleration ratio not less than the average.

8. The dual clutch transmission according to claim 6, wherein the at least one odd-numbered forward traveling speed drive train is a first forward traveling speed drive train for setting the lowest forward traveling speed, wherein the low backward traveling speed drive train is adapted to be activated by engaging the second clutch, and wherein, when the reverse mode is set, a speed shift between the lowest forward traveling speed and the backward traveling speed set by the low backward traveling speed drive train is the forward/backward traveling speed shift realized by the alternate engagement/disengagement shift of the first and second clutches.

9. The dual clutch transmission according to claim 6, further comprising:

a first high/low speed selection means for the odd-numbered forward traveling speed drive train group, the first high/low speed selection means being shiftable between a high speed position and a low speed position, wherein each odd-numbered forward traveling speed drive train of the odd-numbered forward traveling speed drive train group serves as a high odd-numbered forward traveling speed drive train by setting the first high/low speed selection means at the high speed position, and also serves as a low odd-numbered forward traveling speed drive train by setting the first high/low speed selection means at the low speed position;

a second high/low speed selection means for the even-numbered forward traveling speed drive train group, the second high/low speed selection means being shiftable between a high speed position and a low speed position, wherein each even-numbered forward traveling speed drive train of the even-numbered forward traveling speed drive train group serves as a high even-numbered forward traveling speed drive train by setting the second high/low speed selection means at the high speed position, and also serves as a low even-numbered forward traveling speed drive train by setting the second high/low speed selection means at the low speed position, and wherein the high and low odd-numbered forward speed drive trains and the high and low even-numbered forward traveling speed drive trains are classified between the high forward traveling speed drive train group and the low forward traveling speed drive train group; and a common backward traveling drive train part shared between the high backward traveling speed drive train and the low backward traveling speed drive train, wherein the common backward traveling drive train part serves as either the high backward traveling speed drive train or the low backward traveling speed drive train depending on whether one of the first and second high/low speed selection means is shifted to the high speed position or to the low speed position.

10. The dual clutch transmission according to claim 9, wherein the first and second high/low speed selection means are synchronously interlocked with each other so that the first and second high/low speed selection means are simultaneously shifted to the respective high speed positions, and are simultaneously shifted to the respective low speed positions.

11. The dual clutch transmission according to claim 1, further comprising:

a rated forward traveling speed setting means for setting a rated forward traveling speed which is set by any one forward traveling speed drive train of the odd-numbered and even-numbered forward traveling speed drive train groups, wherein, when the first or second clutch to be engaged for activating the forward traveling speed drive train for setting the rated forward traveling speed set by the rated forward traveling speed setting means is different from the first or second clutch to be engaged for activating the at least one backward traveling speed drive train, the forward/backward traveling speed shift by the alternate engagement/disengagement shift of the first and second clutches is performed between the rated forward traveling speed and the backward traveling speed set by the at least one backward traveling speed drive train, and wherein, when the first or second clutch to be engaged for activating the forward traveling speed drive train for setting the rated forward traveling speed set by the rated forward traveling speed setting means is the same as the first or second clutch to be engaged for activating the at least one backward traveling speed drive train, the rated forward traveling speed is shifted down to a lower forward traveling speed by one speed before the first and second clutches are operated for the forward/backward traveling speed shift, and the forward/backward traveling speed shift by the alternate engagement/disengagement shift of the first and second clutches is performed between the lower forward traveling speed and the backward traveling speed set by the at least one backward traveling speed drive train.

12. The dual clutch transmission according to claim 11, a vehicle equipped with the dual clutch transmission is further equipped with a prime mover for driving the dual clutch transmission and with an accelerator operation means for controlling an output speed of the prime mover, and wherein, when the reverser operation means is shifted from the forward traveling position to the backward traveling position, the prime mover is controlled so that a maximum accelerated backward vehicle traveling speed when setting the backward traveling speed set by the at least one backward traveling speed drive train and when setting a maximum output rotary speed of the prime mover by operating the accelerator operation means becomes not more than a maximum accelerated forward vehicle traveling speed when setting the rated forward traveling speed and when setting a maximum output rotary speed of the prime mover by operating the accelerator operation means.

13. The dual clutch transmission according to claim 11, wherein, when an overload on a prime mover driving the dual clutch transmission is detected during forward traveling of a vehicle equipped with the dual clutch transmission, the rated forward traveling speed is shifted down to a lower forward traveling speed one speed by one speed until the overload is eliminated, wherein, when the first or second clutch to be engaged for activating a forward traveling speed drive train for setting the lower forward traveling speed is different from the first or second clutch to be engaged for activating the at least one backward traveling speed drive train, the forward/backward traveling speed shift by the alternate engagement/disengagement shift of the first and second clutches is performed between the lower forward traveling speed and the backward traveling speed set by the at least one backward traveling speed drive train, and wherein, when the first or second clutch to be engaged for activating the forward traveling speed drive train for setting the lower forward traveling speed is the same as the first or second clutch to be engaged for activating the at least one backward traveling speed drive train, the lower forward traveling speed is shifted down to a further lower forward traveling speed by one speed before the first and second clutches are operated for the forward/backward traveling speed shift, and the forward/backward traveling speed shift by the alternate engagement/disengagement shift of the first and second clutches is performed between the further lower forward traveling speed and the backward traveling speed set by the at least one backward traveling speed drive train.

14. The dual clutch transmission according to claim 11, wherein the at least one odd-numbered forward traveling speed drive train is a first forward traveling speed drive train for setting the lowest forward traveling speed, wherein the at least one backward traveling speed drive train is adapted to be activated by engaging the second clutch, and wherein, when the reverse mode is set, a speed shift between the lowest forward traveling speed and the backward traveling speed set by the at least one backward traveling speed drive train is the forward/backward traveling speed shift realized by the alternate engagement/disengagement shift of the first and second clutches.

15. The dual clutch transmission according to claim 1, further comprising:

a manual forward traveling speed selection operation means for manually selecting any one of all the forward traveling speeds; and a manual backward traveling speed selection operation means for manually selecting any one of all the backward traveling speeds, wherein, when a forward traveling speed is manually selected by the forward traveling speed selection operation means and a backward traveling speed is manually selected by the backward traveling speed selection operation means, and when the reverser operation means is shifted between the forward traveling position and the backward traveling position, a forward/backward traveling speed shift between the selected forward traveling speed and the selected backward traveling speed is realizing by engagement/disengagement of at least one of the first and second clutches, and wherein, if the first or second clutch to be engaged for activating the selected backward traveling speed is different from the first or second clutch to be engaged for activating the selected forward traveling speed, the alternate engagement/engagement shift of the first and second clutches is performed for the forward/backward traveling speed shift between the selected forward traveling speed and the selected backward traveling speed.

16. The dual clutch transmission according to claim 15, wherein a vehicle equipped with the dual clutch transmission is further equipped with a prime mover for driving the dual clutch transmission and with an accelerator operation means for controlling an output speed of the prime mover, and wherein, when the reverser operation means is shifted from the forward traveling position to the backward traveling position, the prime mover is controlled so that a maximum accelerated backward vehicle traveling speed when setting the backward traveling speed selected by the backward traveling speed selection operation means and when setting a maximum output rotary speed of the prime mover by operating the accelerator operation means becomes not more than a maximum accelerated forward vehicle traveling speed when setting the forward traveling speed selected by the forward traveling speed selection operation means and when setting a maximum output rotary speed of the prime mover by operating the accelerator operation means.

17. The dual clutch transmission according to claim 15, wherein, when an overload on a prime mover driving the dual clutch transmission is detected during backward traveling of a vehicle equipped with the dual clutch transmission, the backward traveling speed selected by the forward traveling selection operation means is shifted down to a lower backward traveling speed.

18. The dual clutch transmission according to claim 15, wherein, when another forward traveling speed is manually reselected by the forward traveling speed selection operation means, one of all the backward traveling speeds is automatically reselected to correspond to the reselected forward traveling speed, and wherein, the forward/backward traveling speed shift by the alternate engagement/disengagement shift of the first and second clutches is performed between the reselected forward traveling speed and the reselected backward traveling speed.

* * * * *